US008171640B2

(12) United States Patent
Colson et al.

(10) Patent No.: US 8,171,640 B2
(45) Date of Patent: *May 8, 2012

(54) APPARATUS AND METHOD FOR MAKING A WINDOW COVERING HAVING OPERABLE VANES

(75) Inventors: Wendell B. Colson, Weston, MA (US); Daniel M. Fogarty, Framington, MA (US); Kevin M. Dann, Denver, CO (US); David P. Hartman, Framingham, MA (US); Joseph E. Kovach, Brighton, CO (US)

(73) Assignee: Hunter Douglas Inc., Pearl River, NY (US)

( * ) Notice: Subject to any disclaimer, the term of this patent is extended or adjusted under 35 U.S.C. 154(b) by 1252 days.

This patent is subject to a terminal disclaimer.

(21) Appl. No.: 11/573,231

(22) PCT Filed: Aug. 19, 2005

(86) PCT No.: PCT/US2005/029593
§ 371 (c)(1),
(2), (4) Date: Feb. 5, 2007

(87) PCT Pub. No.: WO2006/023751
PCT Pub. Date: Mar. 2, 2006

(65) Prior Publication Data
US 2008/0066277 A1    Mar. 20, 2008

Related U.S. Application Data

(60) Provisional application No. 60/603,375, filed on Aug. 20, 2004.

(51) Int. Cl.
*B23P 17/00* (2006.01)

(52) U.S. Cl. .............. 29/897; 29/897.3; 29/525.01
(58) Field of Classification Search ............. 29/897, 29/897.3, 897.31, 897.312, 897.32, 525.01
See application file for complete search history.

(56) References Cited

U.S. PATENT DOCUMENTS

| 1,958,695 A | 5/1934 | Claus |
| 2,267,869 A | 12/1941 | Loehr |
| RE22,311 E | 5/1943 | Roy |
| 2,350,200 A | 5/1944 | Starr |
| 2,874,612 A | 2/1959 | Luboshez |
| 3,190,086 A | 6/1965 | Pia-Maria Klein |
| 3,222,689 A | 12/1965 | Efron et al. |
| D208,350 S | 8/1967 | Cheris |
| 3,566,499 A | 3/1971 | James |
| 4,282,919 A | 8/1981 | Teno |
| 5,205,334 A | 4/1993 | Judkins |

(Continued)

FOREIGN PATENT DOCUMENTS
EP    0 482 794 B1    5/1994
(Continued)

*Primary Examiner* — Derris Banks
*Assistant Examiner* — Azm Parvez
(74) *Attorney, Agent, or Firm* — Dorsey & Whitney LLP

(57) ABSTRACT

An apparatus and associated method for manufacturing a window covering 50 for an architectural opening. The apparatus includes a support structure handling assembly 92, an operating element handling assembly 94, and a vane handling assembly 96. The handling assemblies process the respective materials to an assembly station 100 to attach one portion of a vane 54 to the operating elements 56, and another portion of the vane 54 to the support structure 52, allowing movement of one portion of the vane 54 relative to other portion of the vane.

21 Claims, 53 Drawing Sheets

U.S. PATENT DOCUMENTS

| | | | |
|---|---|---|---|
| 5,228,936 A | 7/1993 | Goodhue | |
| 5,231,708 A | 8/1993 | Hansen | |
| 5,313,999 A | 5/1994 | Colson et al. | |
| 5,355,555 A | 10/1994 | Zarelius | |
| 5,490,553 A | 2/1996 | Colson et al. | |
| 5,503,210 A | 4/1996 | Colson et al. | |
| 5,547,006 A | 8/1996 | Auger | |
| 5,558,925 A | 9/1996 | Fritzman | |
| 5,645,504 A | 7/1997 | Westhoff | |
| 5,649,583 A | 7/1997 | Hsu | |
| 5,714,034 A | 2/1998 | Goodhue | |
| 5,733,632 A | 3/1998 | Marusak | |
| 5,787,951 A * | 8/1998 | Tonomura et al. | 160/84.01 |
| 5,855,235 A | 1/1999 | Colson et al. | |
| 5,918,655 A | 7/1999 | Corey | |
| 6,006,812 A | 12/1999 | Corey | |
| 6,112,797 A | 9/2000 | Colson et al. | |
| 6,223,802 B1 | 5/2001 | Colson | |
| D443,455 S | 6/2001 | Hynniman | |
| 6,289,964 B1 | 9/2001 | Colson et al. | |
| 6,345,486 B1 | 2/2002 | Colson et al. | |
| 6,484,786 B1 | 11/2002 | Ruggles et al. | |
| D468,950 S | 1/2003 | Judkins | |
| 6,572,725 B2 | 6/2003 | Goodhue | |
| 6,595,262 B2 | 7/2003 | Chen | |
| 6,688,373 B2 | 2/2004 | Corey et al. | |
| 6,740,389 B2 | 5/2004 | Yu | |
| 6,792,994 B2 * | 9/2004 | Lin | 160/84.03 |
| 6,932,138 B2 | 8/2005 | Yu et al. | |
| 6,978,821 B2 | 12/2005 | Welfonder | |
| D515,345 S | 2/2006 | Herhold et al. | |
| 7,111,659 B2 | 9/2006 | Harper et al. | |
| 7,117,917 B2 | 10/2006 | Allsopp | |
| 7,147,029 B2 | 12/2006 | Kovach et al. | |
| 7,191,816 B2 | 3/2007 | Colson et al. | |
| 7,207,370 B2 | 4/2007 | Snyder et al. | |
| 7,237,591 B2 | 7/2007 | Snyder et al. | |
| 7,311,131 B2 | 12/2007 | Nien et al. | |
| 7,337,822 B2 | 3/2008 | Snyder et al. | |
| D568,082 S | 5/2008 | Bohlen | |
| 7,500,505 B2 | 3/2009 | Smith et al. | |
| 7,549,455 B2 | 6/2009 | Harper et al. | |
| 7,578,334 B2 | 8/2009 | Smith et al. | |
| 7,588,068 B2 * | 9/2009 | Colson et al. | 160/121.1 |
| D605,885 S | 12/2009 | Judkins | |
| 7,637,301 B2 | 12/2009 | Forst Randle | |
| 2004/0079492 A1 | 4/2004 | Lin | |
| 2005/155722 A1 | 7/2005 | Colson et al. | |
| 2006/0191646 A1 | 8/2006 | Harper et al. | |
| 2008/0168637 A1 | 7/2008 | Ballard, Jr. et al. | |
| 2009/0321024 A1 | 12/2009 | Harper et al. | |
| 2010/0059186 A1 | 3/2010 | Colson et al. | |

FOREIGN PATENT DOCUMENTS

| | | |
|---|---|---|
| EP | 0 654 577 B1 | 3/1999 |
| GB | 1 494 842 | 12/1977 |
| JP | 07-039449 | 2/1995 |
| WO | WO 85/02760 | 7/1985 |
| WO | WO 94/29559 | 12/1994 |
| WO | WO 2005/019584 A2 | 3/2005 |
| WO | WO 2005/019584 A3 | 3/2005 |
| WO | WO 2005/062875 A2 | 7/2005 |
| WO | WO 2005/081948 A2 | 9/2005 |
| WO | WO 2005/081948 A3 | 9/2005 |
| WO | WO 2006/023751 A2 | 3/2006 |
| WO | WO 2006/098853 A2 | 9/2006 |

* cited by examiner

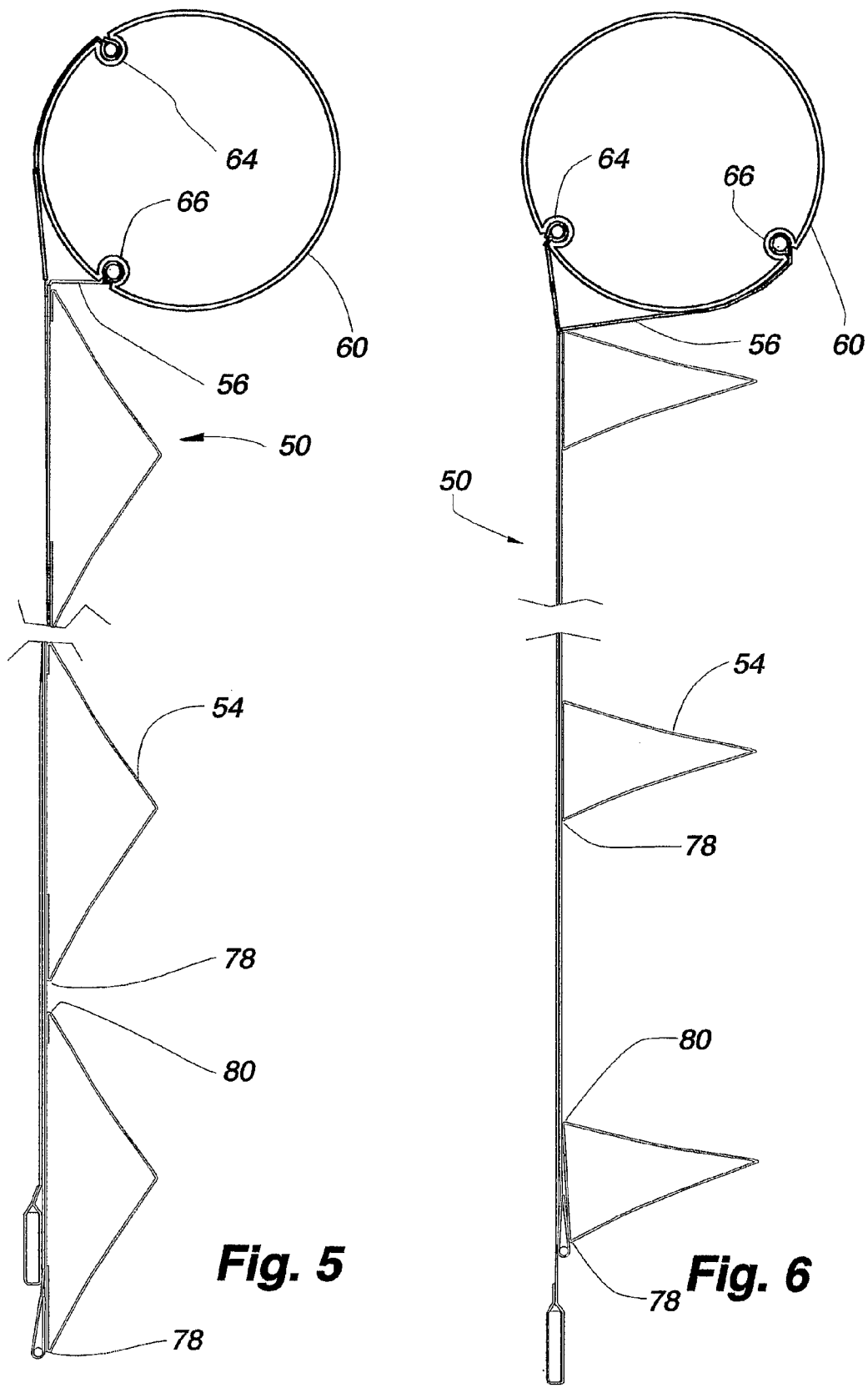

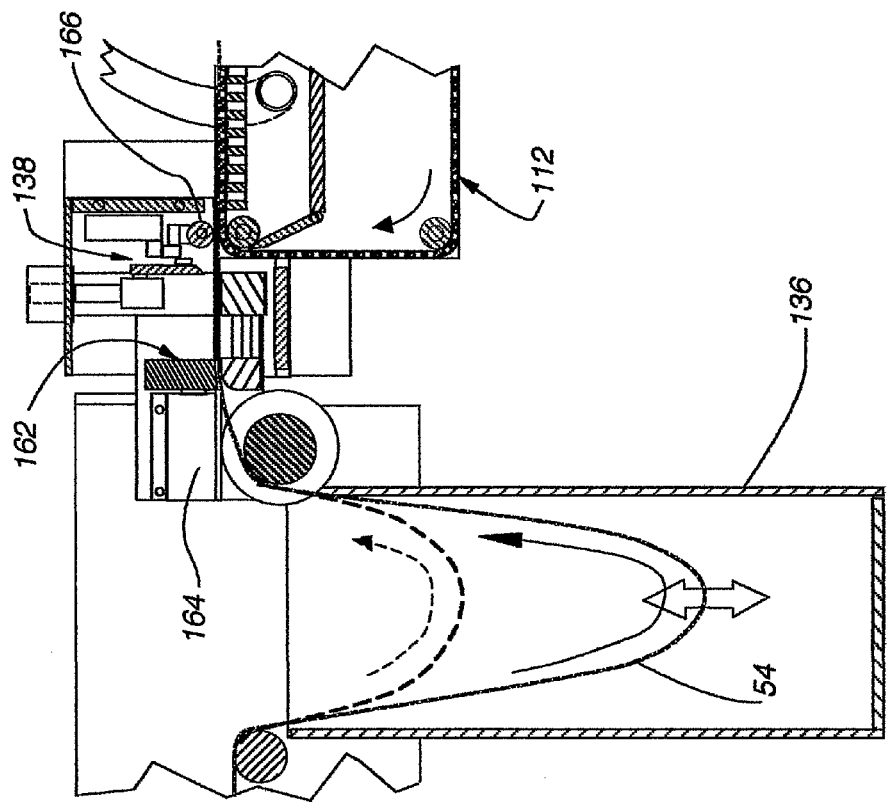
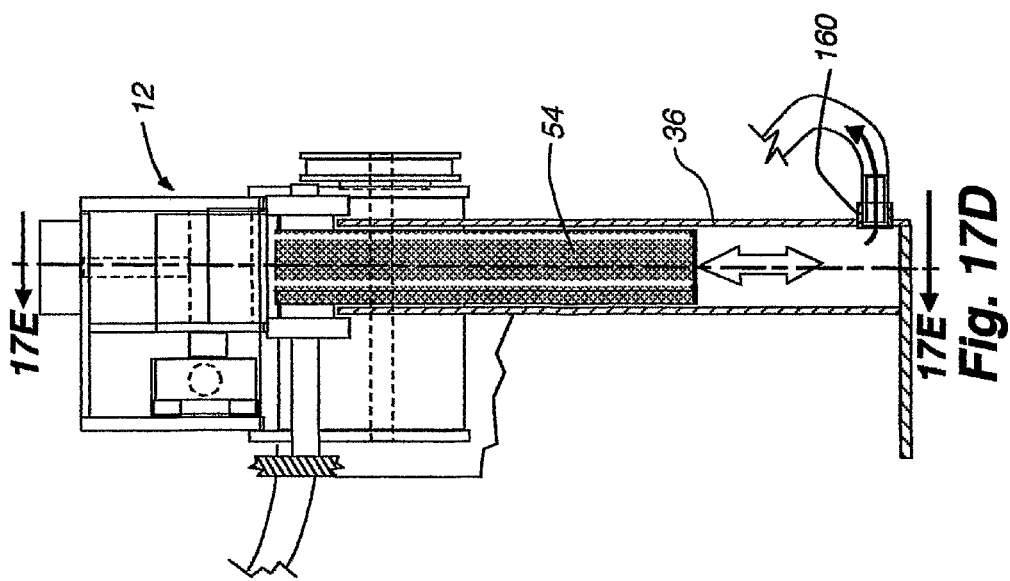

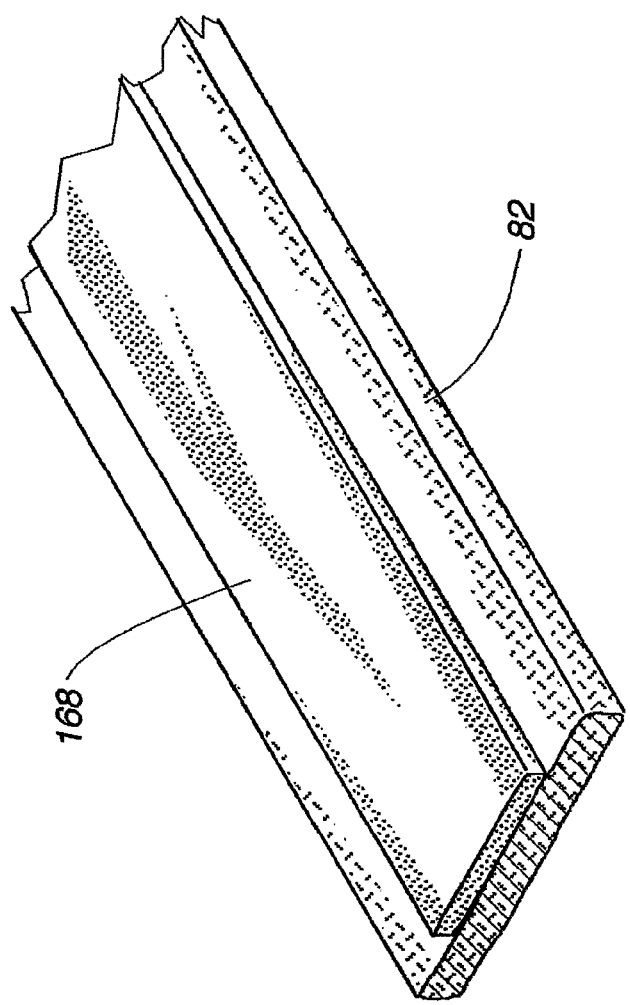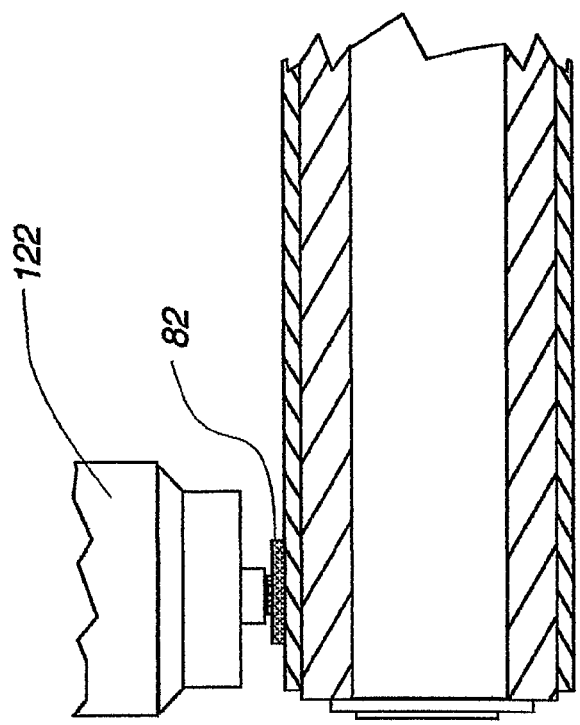
Fig. 18B
Fig. 18A

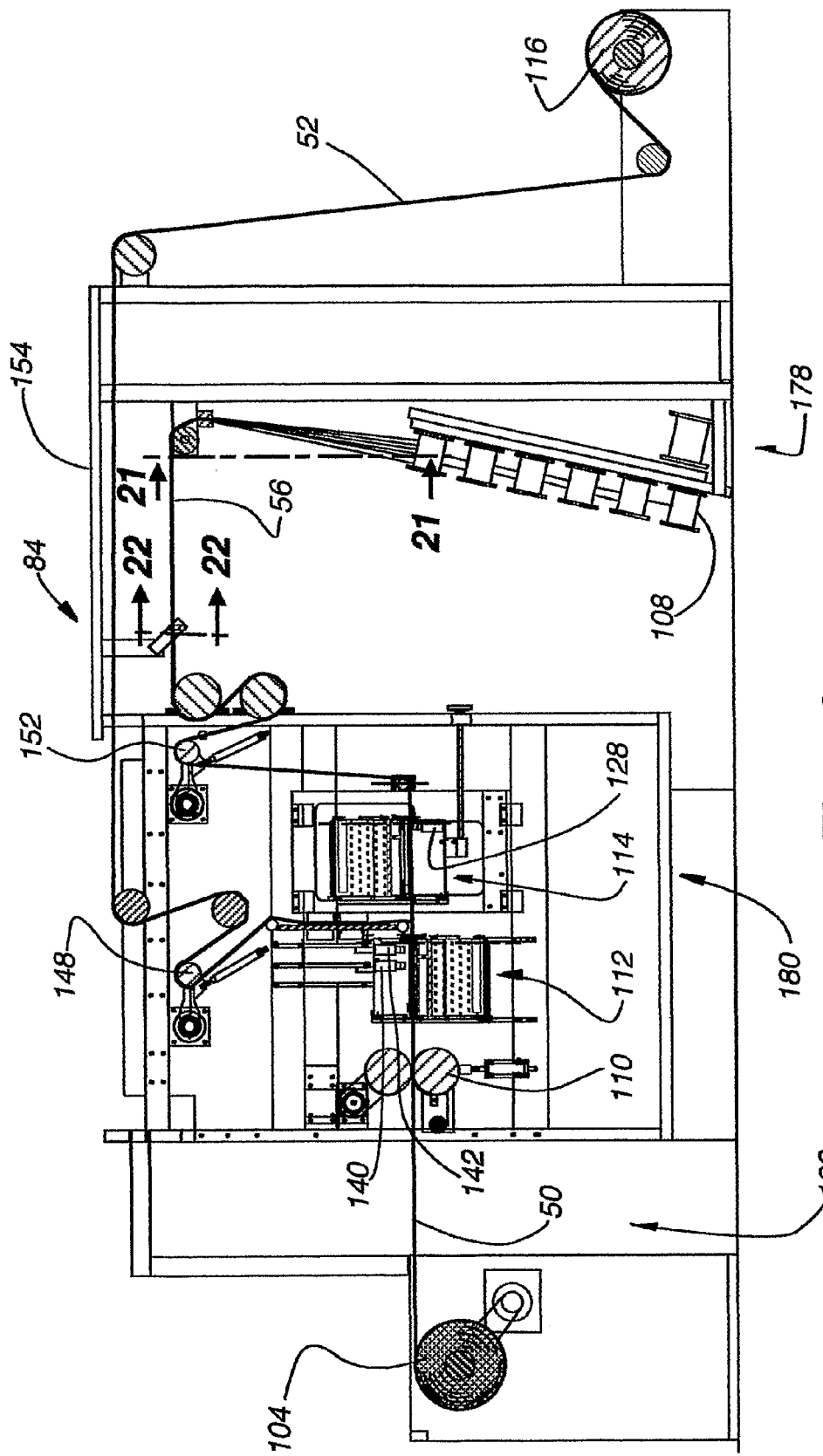

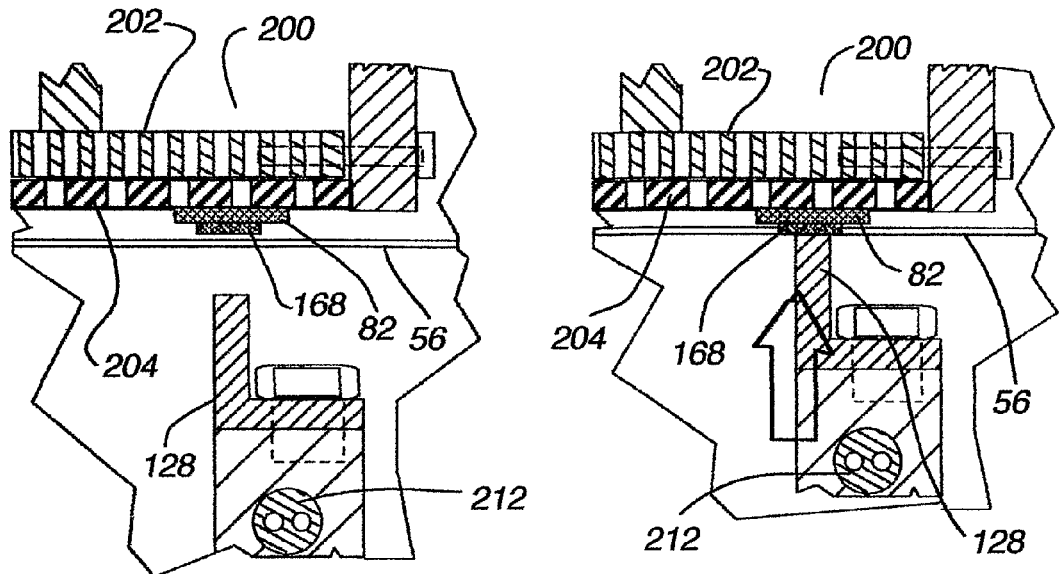
Fig. 25C
Fig. 25E
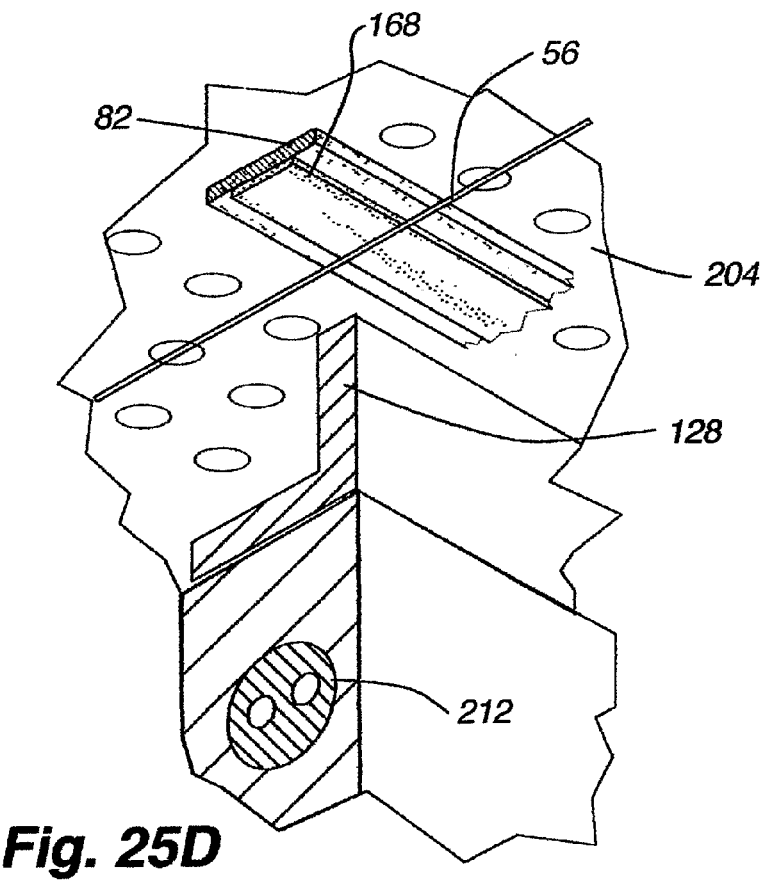
Fig. 25D

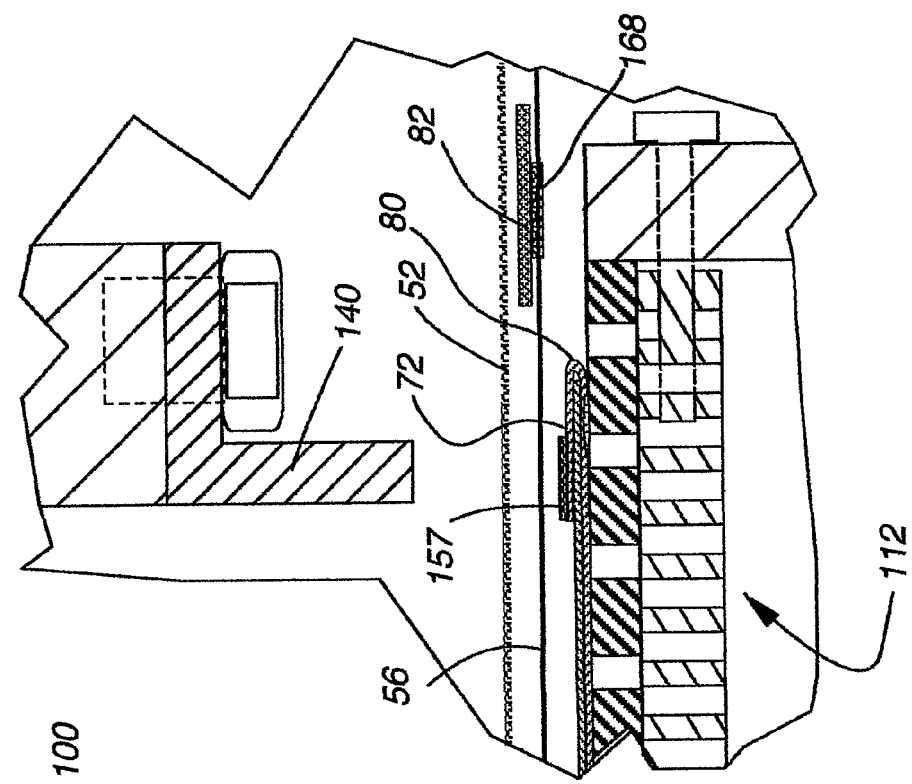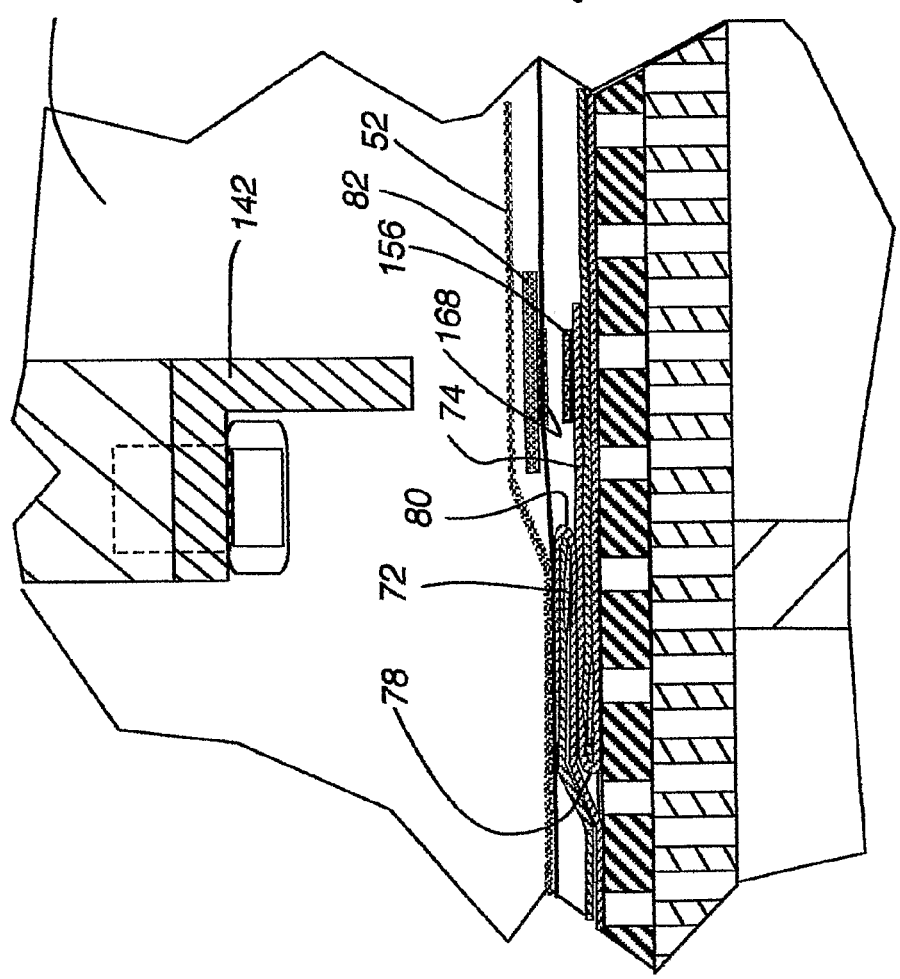
Fig. 27C

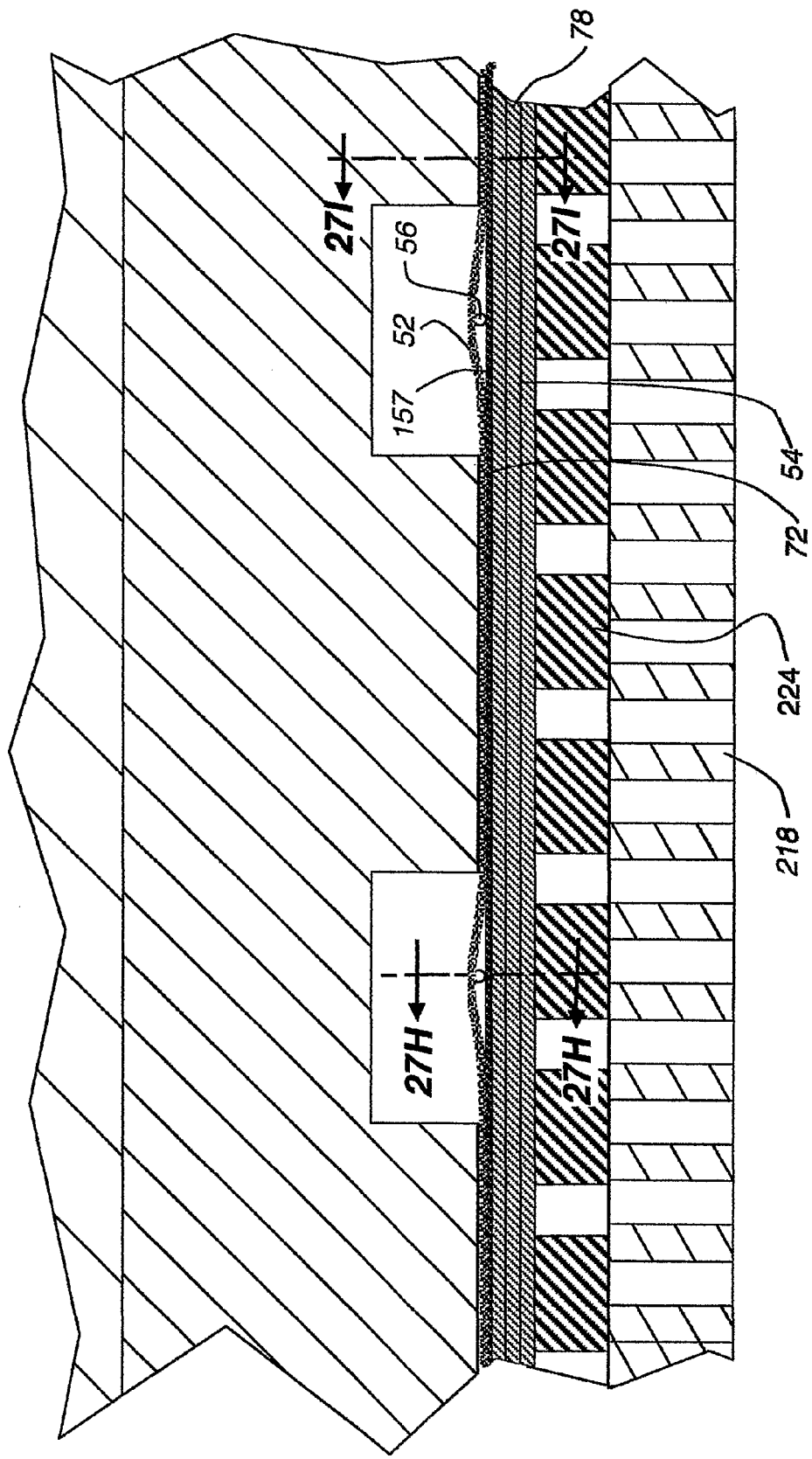

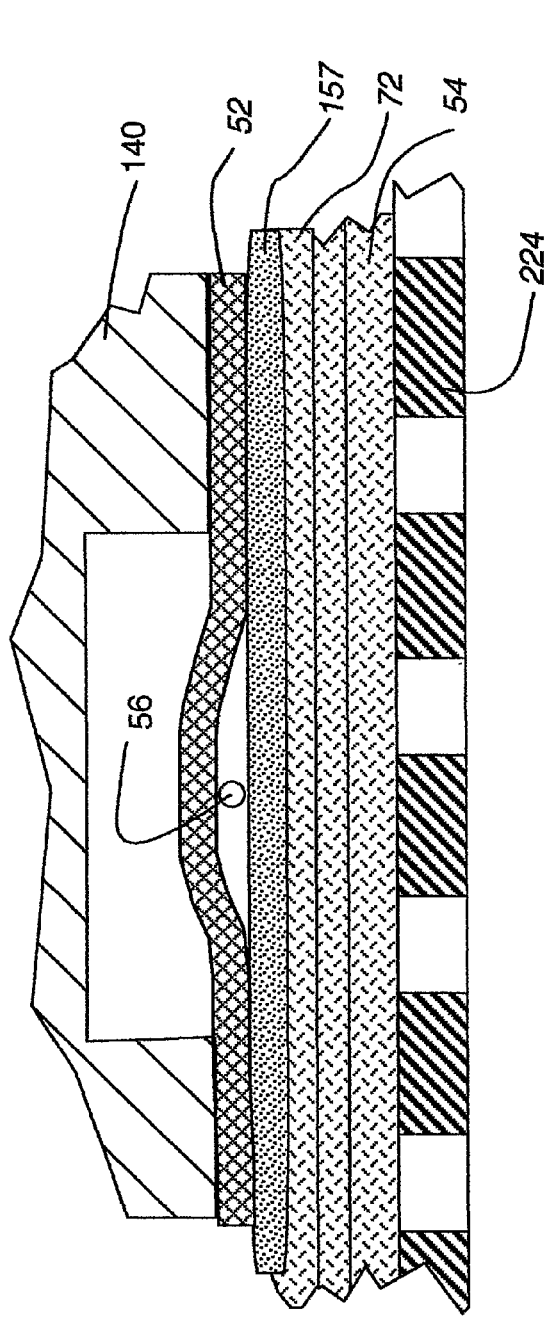
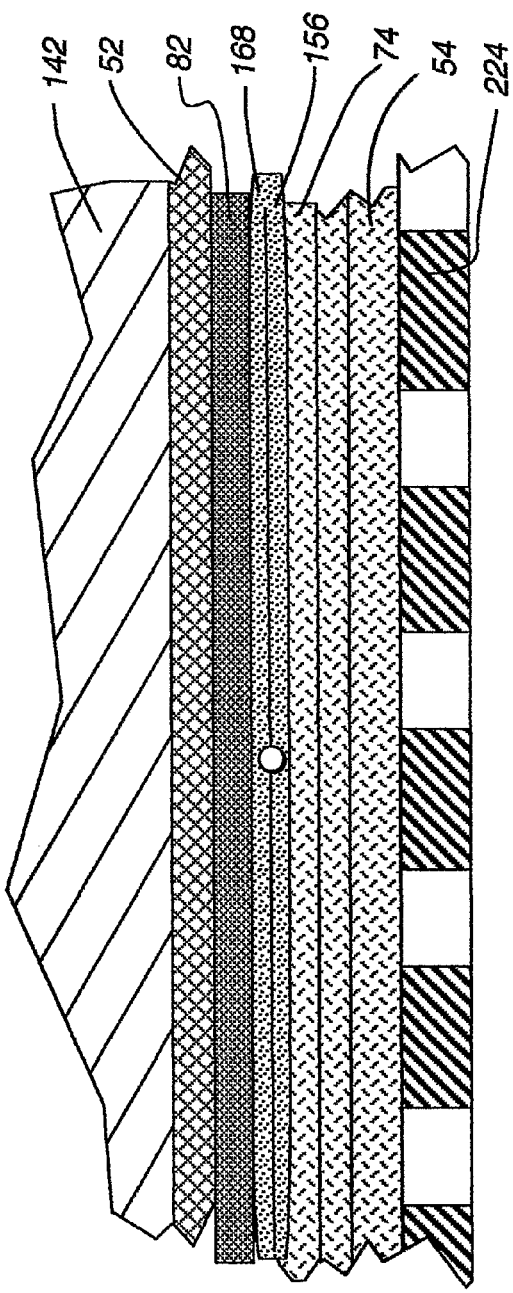

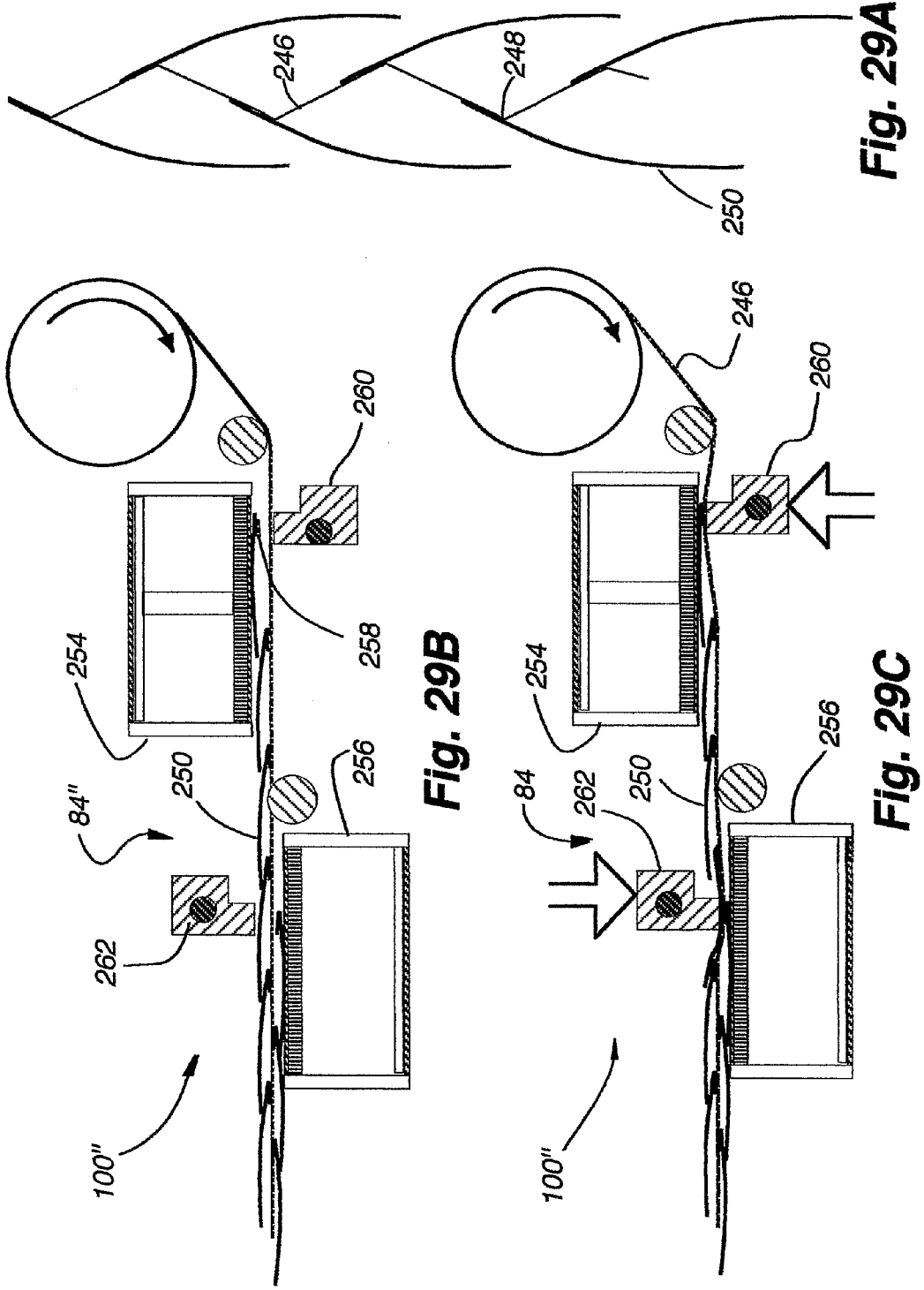

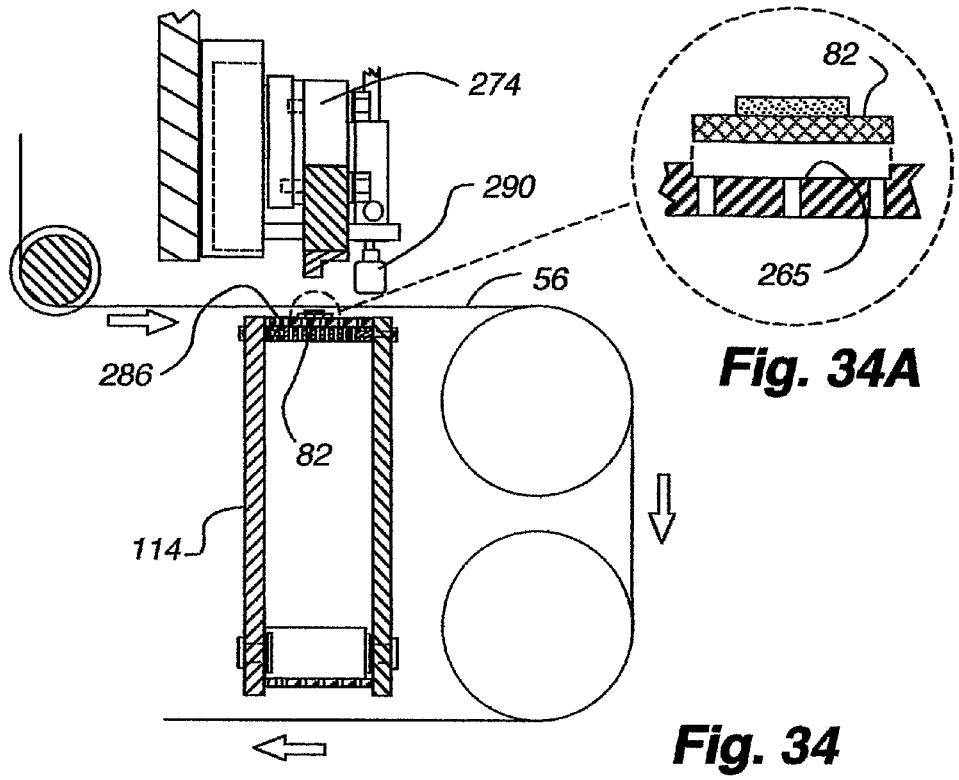
Fig. 34A
Fig. 34
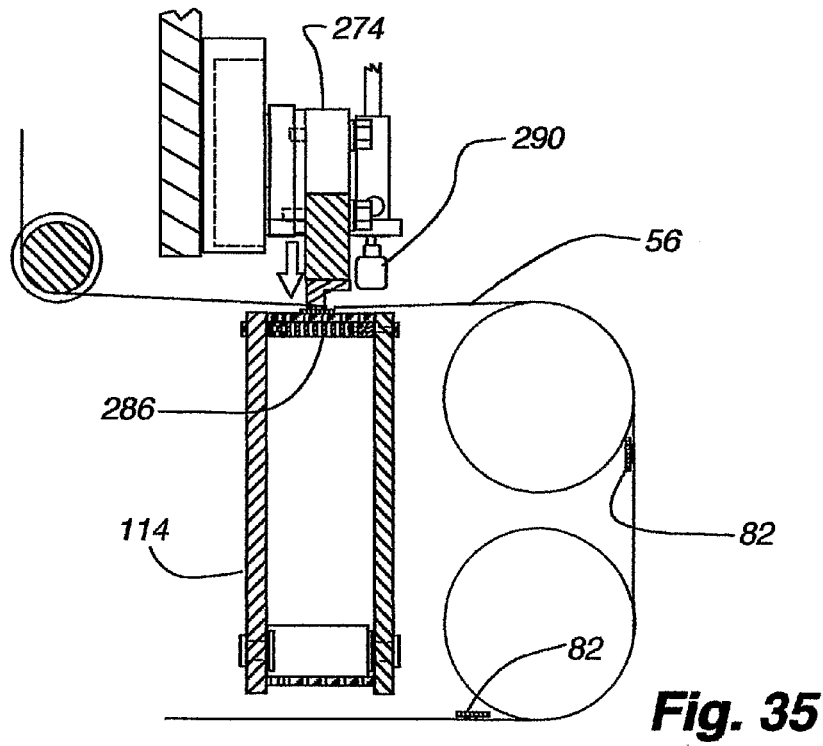
Fig. 35

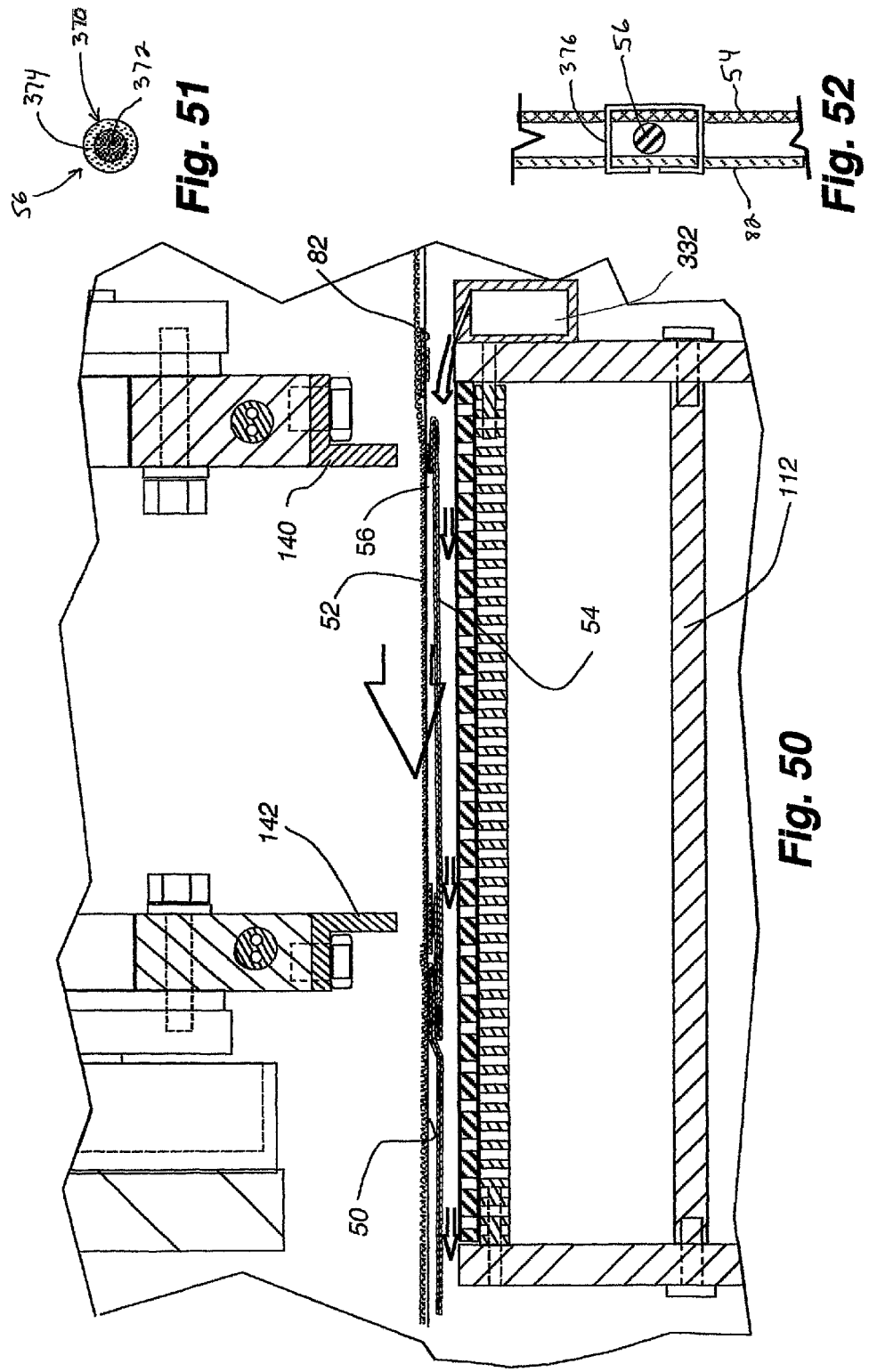

APPARATUS AND METHOD FOR MAKING A WINDOW COVERING HAVING OPERABLE VANES

CROSS REFERENCE TO RELATED APPLICATIONS

This application claims priority to U.S. provisional patent application No. 60/603,375, filed on Aug. 20, 2004 and entitled APPARATUS AND METHOD FOR MAKING A WINDOW COVERING HAVING OPERABLE VANES, which has a common assignee with the instant application, and which is incorporated by reference as if fully described herein.

This application is also related to U.S. application Ser. No. 11/102,500, filed on Apr. 8, 2005 and entitled RETRACTABLE SHADE WITH COLLAPSIBLE VANES, which is a continuation-in-part of U.S. application Ser. No. 11/077,953, filed on Mar. 11, 2005 and entitled RETRACTABLE SHADE WITH COLLAPSIBLE VANES, which is a continuation-in-part of PCT International Application No. PCT/US2004/27197 (Publ. No. WO 2005/019584A2), filed on Aug. 20, 2004 and entitled RETRACTABLE SHADE WITH COLLAPSIBLE VANES, which PCT International application claims priority to U.S. provisional patent application No. 60/497,020, filed on Aug. 20, 2003 and entitled RETRACTABLE SHADE WITH COLLAPSIBLE VANES; all of which have a common assignee with the instant application, and all of which are incorporated by reference as if fully described herein.

This application is further related to PCT International Application No. PCT/US2004/043043 (Publ. No. WO 2005/062875 A2), filed on Dec. 21, 2004 and entitled RETRACTABLE SHADE FOR COVERINGS FOR ARCHITECTURAL OPENINGS, which claims the subject matter of U.S. provisional patent application No. 60/571,605, filed on May 13, 2004, and entitled RETRACTABLE SHADE FOR COVERINGS FOR ARCHITECTURAL OPENINGS and U.S. Provisional Application No. 60/531,874, filed on Dec. 22, 2003, and entitled RETRACTABLE SHADE FOR COVERINGS FOR ARCHITECTURAL OPENINGS; all of which have a common assignee with the instant application, and all of which are incorporated by reference as if fully described herein.

FIELD OF THE INVENTION

The present invention relates generally to coverings for architectural openings, and more specifically to the apparatus and methods associated with the manufacture of such coverings.

BACKGROUND OF THE INVENTION

Coverings for architectural openings such as windows, doors, archways and the like have assumed numerous forms for many years. Early forms of such coverings consisted primarily of fabric draped across the architectural opening, and in many instances the fabric was not movable between extended and retracted positions relative to the opening.

Retractable coverings for architectural openings have evolved into many different forms, which include roller shades in which a piece of flexible material can be extended from a wrapped condition on a roller to an extended position across the architectural opening, and vice versa. Other popular forms of retractable coverings for an architectural opening include Venetian blinds, vertical blinds, cellular shades and various variations on these basic designs.

Typically, current manufacturing equipment and methods for making window coverings have not proven sufficient to handle more than one material flowing co-extensively, with the insertion of one or more lateral components for operable assembly of all components to allow relative movement between at least two of the assembled parts.

Additionally, typically a unique machine and method are designed for each different design of window coverings. This creates undesirable expenses, increases the risk of significant capital investment in an unsuccessful product, and leads to lengthy start-up times for manufacturing new products. Research and development efforts are also thwarted at least in part due to the lack of flexibility in easily modifying existing manufacturing equipment to build new designs.

It is to satisfy the need for flexible manufacturing equipment designs and associated methods that the present invention has been developed.

BRIEF SUMMARY OF THE INVENTION

The apparatus and method of the present invention were developed to address the need for window covering manufacturing equipment and methods that are both effective in manufacturing a particular window covering design and may also be readily transformable into other configurations to manufacture different window covering designs.

In the instant invention, the apparatus includes handling assemblies for bringing one or more support structures together, as well as handling assemblies for integrating vanes, operating elements, and other structural features together for assembly in a few steps. These handling assemblies may be capable of adjustment and reconfiguration in order to handle more or fewer support structures and other structural features depending on the design of the window coverings.

In one example, a method of making a covering for an architectural opening includes providing a support structure having at least one operating element extending along at least a part of the length of the support structure, the operating element being movable relative to the support structure, operably attaching an upper portion of at least one vane to the support structure, operably attaching a lower portion of the at least one vane to the at least one operating element, wherein the lower portion moves relative to the upper portion by moving the at least one operating element.

In another example, a method of manufacturing a covering for an architectural opening includes moving a first material, moving a second material along with the first material, the second material exposing at least a portion of the first material, providing a third material adjacent the first and second materials, attaching a first portion of the third material to the second material, attaching a second portion of the third material to the exposed portion of the first material, and wherein movement of the second material relative to the first material causes the first portion of the third material to move relative to the second portion of the third material.

Another example of the method of the present invention for making a window covering for an architectural opening includes moving a support structure along its length, moving at least one operating element adjacent to and along with the support structure, inserting a vane to extend laterally across the support structure, attaching a first portion of the vane to the support structure around the at least one operating element, and attaching a second portion of the vane to the at least one operating element, wherein the first portion is above the second portion when the window covering is in use.

An example of an apparatus for making a window covering includes a support structure handling assembly for handling a support structure, an operating element handling assembly for handling at least one operating element, a vane handling assembly for handling at least one vane having an upper portion and a lower portion, and an assembly station. In the assembly station, the operating element assembly positions the at least one operating element along the support structure, the vane handling assembly laterally positions the vane across the support structure, and the assembly station attaches the lower portion of the at least one vane to the at least one operating element, and attaches the upper portion of the vane to the support structure and not the at least one operating element.

A further example of the present inventive method includes moving a first material along its length, moving a second material along its length and at least partially coextensively with the first material, the first material and second material being spaced apart; inserting a vane having an upper portion and a lower portion between the first and second materials, attaching the upper portion to one of the first or second material, and attaching the lower portion to the other of the first or second material.

Another example of a method for making a window covering for an architectural opening includes moving a first pleated material, having creases, along its length, positioning a first vane having an upper portion along one side of the material, positioning a second vane having an upper portion along the other side of the material, attaching the upper portion of the first vane to the one side of the material adjacent a crease, and attaching the upper portion of the second vane to the other side of the material adjacent a crease.

A further example of an apparatus for making a window covering includes a support structure handling assembly for handling a support structure, an operating element handling assembly for handling at least one operating element, a vane handling assembly for handling at least one vane having an first portion and a second portion, means for operably attaching the support structure to a first portion of the vane, and means for operably attaching said at least one operating element to a second portion of the vane.

Other aspects, features and details of the present invention can be more completely understood by reference to the following detailed description of the various embodiments, taken in conjunction with the appended claims and drawings.

BRIEF DESCRIPTION OF THE DRAWINGS

The features and advantages of the present invention will be more readily apparent from the following detailed description, illustrated by way of example in the drawing figures, wherein:

FIG. 5 shows the retractable shade with collapsible vanes with the vanes in a partially collapsed position.

FIG. 6 is an end view of the retractable shade with collapsible vanes with the vanes in the fully collapsed position.

FIG. 17D is a section taken along line 17D-17D of FIG. 16.

FIG. 17E is a section taken along line 17E-17E of FIG. 16D.

FIG. 18A is a section taken along line 18A-18A of FIG. 16.

FIG. 18B is a representational perspective view of a length of tape having adhesive applied in a process such as that shown in FIG. 18A.

FIG. 19 is a section taken along line 19-19 of FIG. 12.

FIG. 25C is a partial enlarged view of FIG. 25A.

FIG. 25D is a lower perspective view of FIG. 25A showing the relationship of the melt bar, the tape and the operating element.

FIG. 25E is a partial enlarged view of FIG. 25B showing the melt bar in engagement with the operating elements and the tape.

FIG. 27C is an enlarged partial view of FIG. 27A.

FIG. 27E is a section taken along line 27E-27E of FIG. 27D.

FIG. 27J is a section taken along line 27J-27J of FIG. 27H.

FIG. 27K is a section taken along line 27K-27K of FIG. 27G.

FIG. 29A is a simplified view of a window covering having a pleated support sheet with vanes extending off either side of the pleated support sheet.

FIG. 29B is a schematic view of an embodiment of the apparatus disclosed herein for manufacturing the window covering shown in FIG. 29A.

FIG. 29C is a schematic view of the apparatus shown in FIG. 29B showing the melt bar in engagement with the vane for assembling the window covering shown in FIG. 29A.

FIG. 34 is a representative section taken along the line 34-34 of FIG. 33, and shows one position of the push rod and bonding bar structure used for attaching the operating element to the tape.

FIG. 34A is an enlarged cross-section view of a vacuum belt of the tape vacuum conveyor illustrated in FIG. 34.

FIG. 35 is a representative section similar to FIG. 34, and shows one position of the push rod and bonding bar structure used for attaching the operating element to the tape.

FIG. 50 is a section similar to FIG. 49, and shows the sandwiched materials after the bonding step takes place.

FIG. 51 is a representational section of a bi-component filament for use as an alternative operating element.

FIG. 52 is a representational section of a staple being used to attach the vane to the operating element, in this case with a backer also, as an alternative bonding structure.

DETAILED DESCRIPTION OF THE INVENTION

The invention described herein relates to the apparatus and method associated with the manufacturing of a panel for covering an architectural opening, one embodiment of the panel being a retractable shade with operable vanes. The vanes are operable by being collapsible, rotatable, collectable, or having other type of individual or collective movement. To better understand the features of the apparatus and the methods involved in its use, the first section of this application addresses the structure of one embodiment of retractable shade with collapsible vanes. The second section addresses the apparatus and associated method used for manufacturing the retractable shade. It is contemplated that the apparatus may be configured to make other types of shades.

The retractable shade 50 in the instant embodiment is shown in various operable positions in FIGS. 1A through 1E. It includes a support sheer 52, a plurality of vanes 54 connected to the support sheer, and operating elements 56 for moving the vanes between the closed and opened positions. The support sheer in this instant embodiment is in the form of a flexible sheet of sheer fabric. The support sheer, or sheet, in one embodiment, is of rectangular configuration having top and bottom edges and left and right side edges, with a weighted bottom rail being secured to the bottom edge of the support sheer.

Figure 1C:
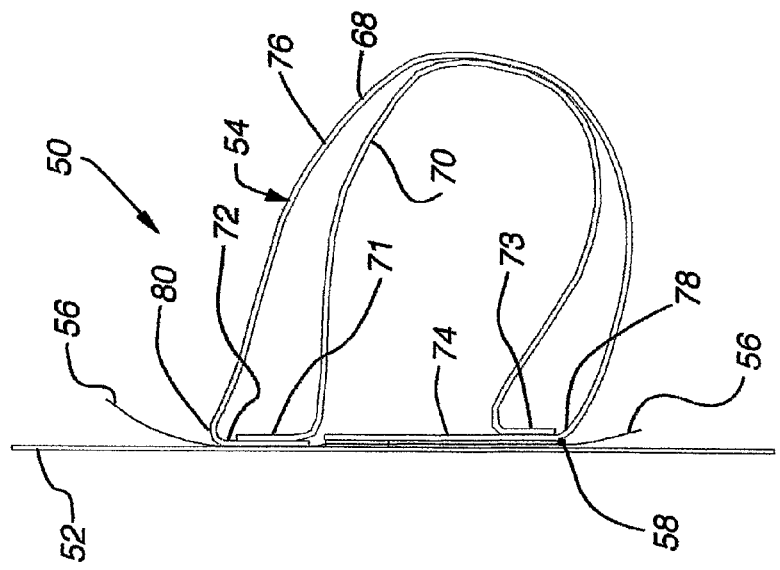
FIGS. 1A through 1E are views of a retractable shade with collapsible vane as manufactured by the apparatus and associated method described herein.
Figure 1B:
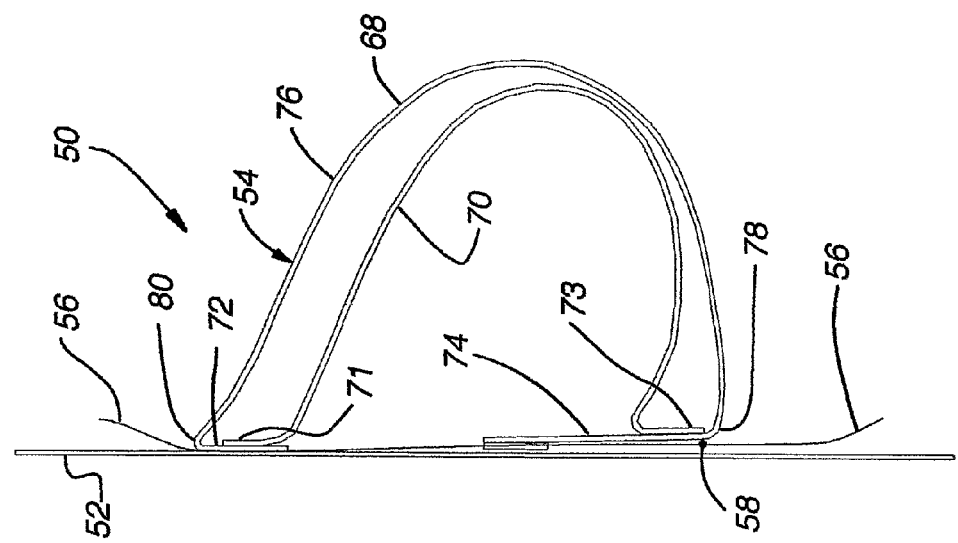
Figure 1A:
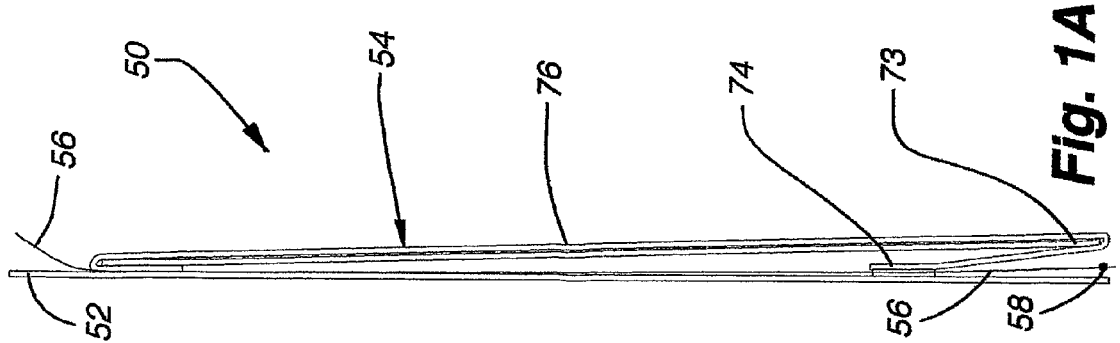
Figure 1D:
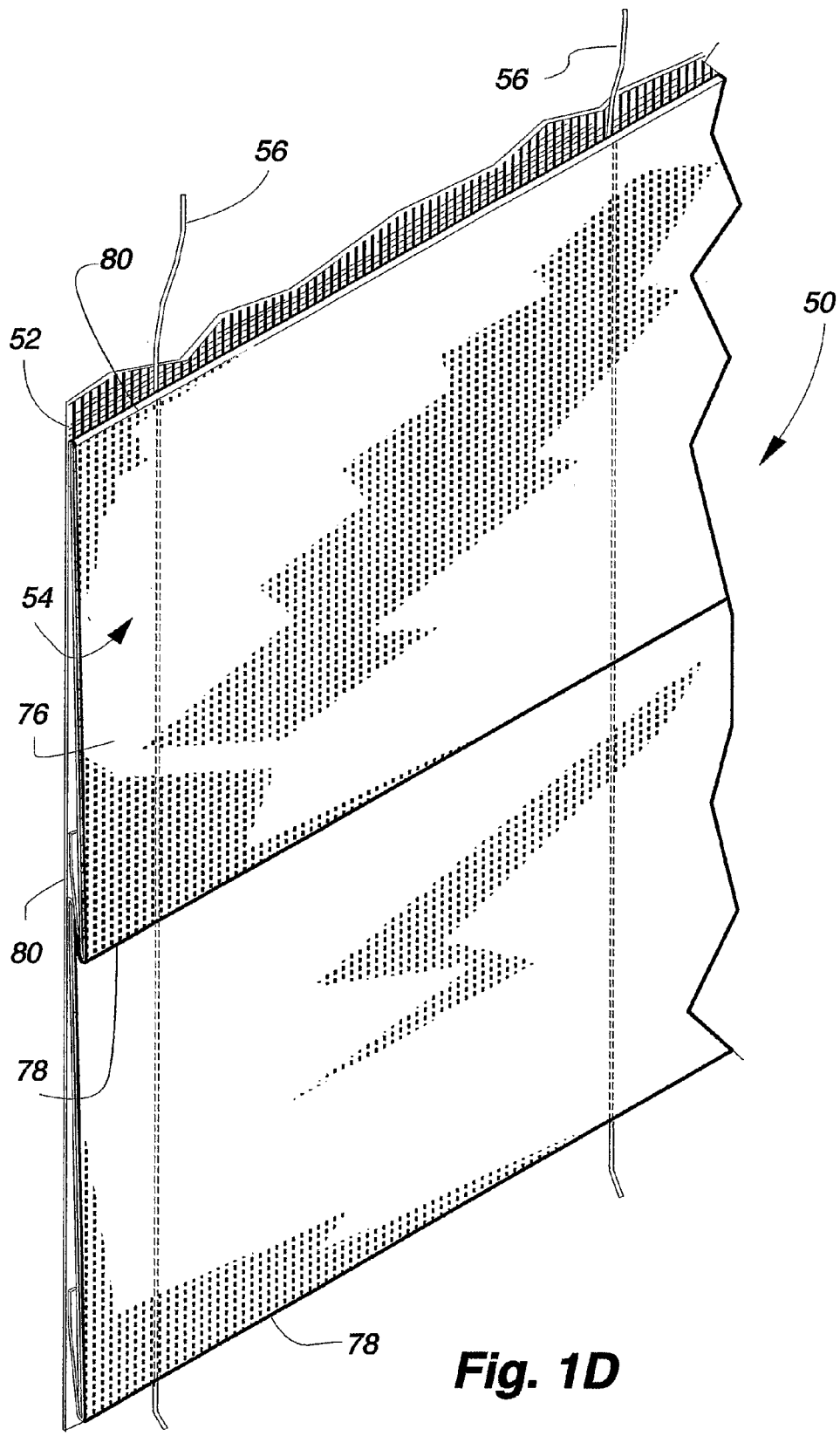
Figure 1E:
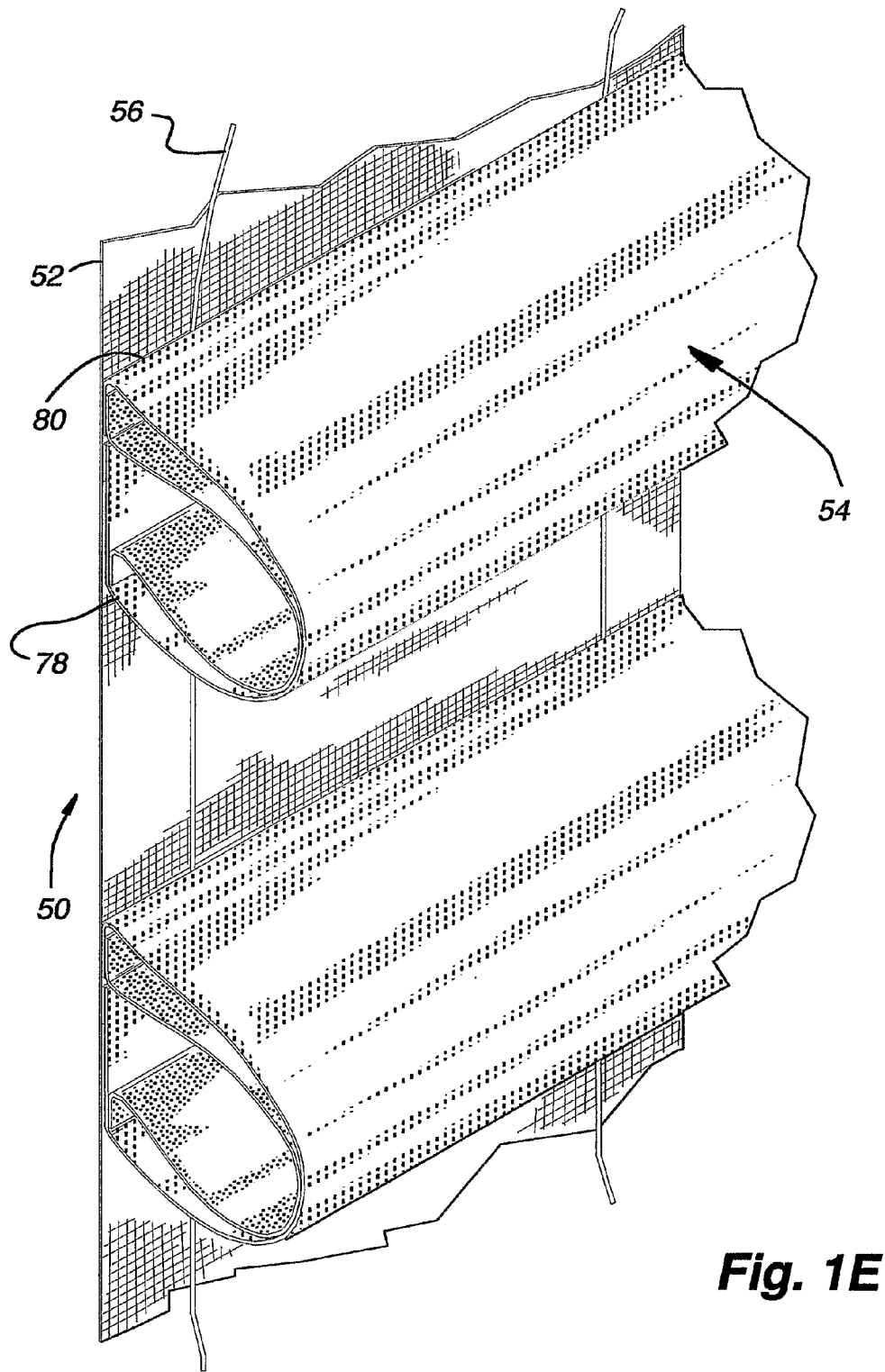

As shown in FIGS. 1A through 1E, the retractable shade 50 with collapsible vanes 54 can move from a first or closed position as shown in FIG. 1A, to a collapsed or open position, as shown in FIG. 1C or 1E. FIG. 1B shows an intermediate position in the transition from the first position to the final position. FIG. 1C shows the vane 54 in a fully collapsed position. The nodules 58 on the operating elements 56 are included here to show the movement of the operating elements relative to the support sheer. FIG. 1D shows a perspective view of a section of a shade 50 of the present invention, showing two adjacent vanes attached to a support sheer 52, with the operating elements 56 (cords) extending along the length of the sheer 52 and transverse to the vanes 54. FIG. 1E shows the vanes in the open or retracted positions upon actuation of the operating elements.

Figure 2:
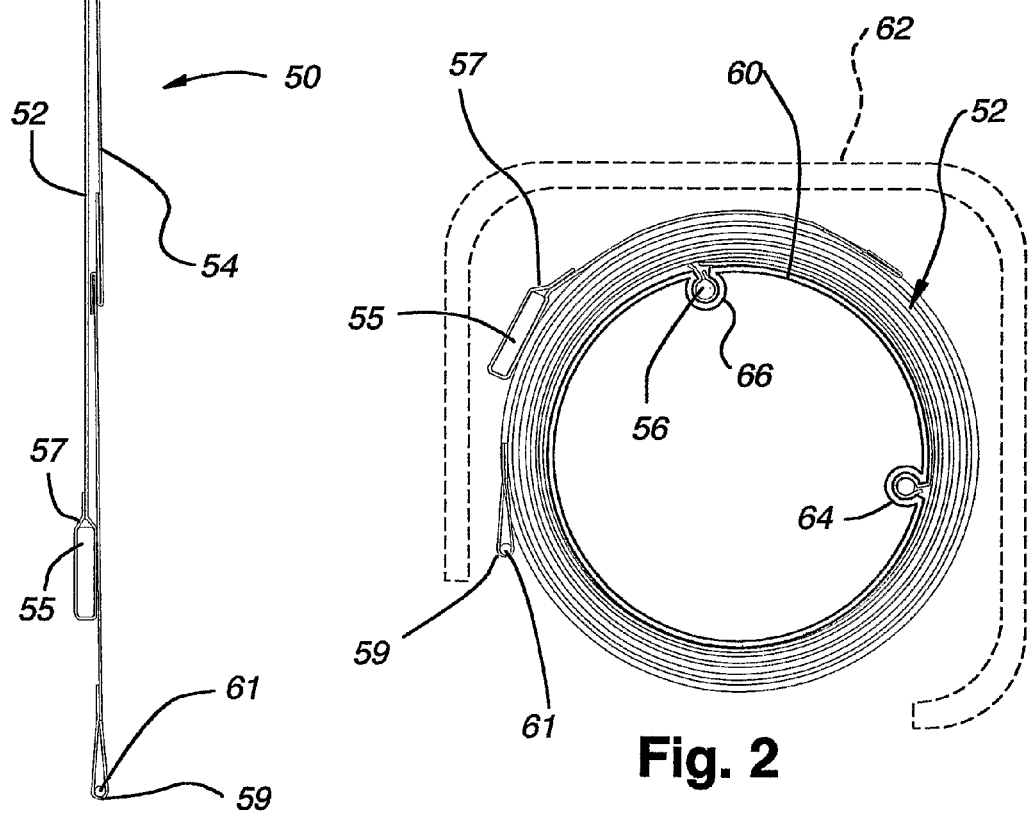
FIG. 2 is an end view of a retractable shade with collapsible vanes showing the shade entirely collected around a take-up cylinder.

In one embodiment, as shown in FIG. 2, the support sheer 52 is suspended along its top edge from the generally cylindrical roller 60 disposed in a head rail 62 for the shade 50, with the roller being mounted for selective reversible rotative movement about a horizontal central axis in a conventional manner. As seen in FIG. 2, the roller is provided with first 64 and second 66 identical circumferentially spaced axially extending grooves which open through the periphery of the roller with the first groove supporting the top edge of the support sheer 52. The top edge of the support sheer may be hemmed so a rod can be inserted through the hem and longitudinally positioned in the groove where it is retained by a pair of lips defined in the periphery of the roller where the groove opens through the periphery. The lips are spaced at a smaller distance apart than the diameter of the rod so that the rod and the hemmed top edge of the support sheer are confined within the groove 64. Alternatively, a poly strip may be used to wedge the top edge of the fabric into the groove 64, without the need for a hemmed structure as described above.

Figure 3:
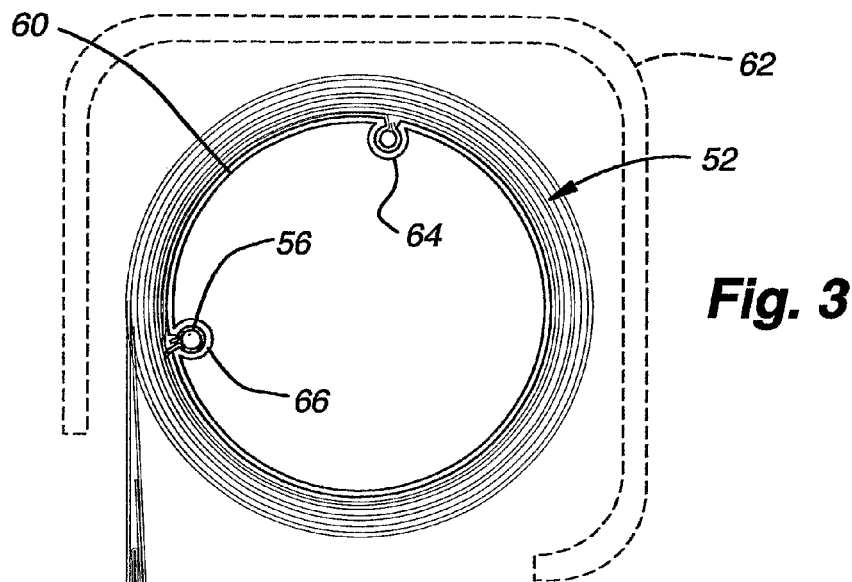
FIG. 3 is an end view of a retractable shade with collapsible vanes showing the shade partially collected around a take-up cylinder.

The bottom edge of the support sheer 52 may be weighted, such as with a rod 55 received within a hemmed pocket 57, such as that shown in FIG. 3. The weight may also be provided by a structural bottom rail attached to the bottom of the support sheer 52. The weight may not be at the bottom edge of the support sheer 52, but may instead be generally in the middle of the length of the support sheer, or in a lower portion of the support sheer 52. FIG. 3 also shows the bottom edge 59 of the bottom-most vane 54 may include a weight attached thereto, such as a rod positioned in a hemmed section, or other type of weight, to help pull the operating elements downwardly and cause the lower edge of the vane to lower more readily. Since the operating elements are attached to the bottom portion of the vane 54, if the bottom portion of the bottom-most vane is weighted, the weight will assist in pulling the operating elements 56 downwardly when desired by the user.

This overall structure allows the shade 50 to be retracted around and unwound from the roller as the roller is rotated.

The retractable shade disclosed herein also includes a plurality of flexible, vertically extending operating elements 56 (see FIGS. 5 and 6) which are horizontally spaced across the width of the panel, with the upper ends of the operating elements being secured to the roller in a second groove 66. This attachment to the second groove is made by tying the upper ends of each flexible operating element 56 to a rod that is inserted in the second groove 66 and retained therein as described with respect to the first groove 64. The operating elements act on the vanes 54 as is described in more detail below.

The structure from which the shade is suspended, retracted and activated from may take on forms other than the cylinder in a headrail as described above. Also, the shade may be wrapped around the cylinder in a different direction so as to hang from the other side of the cylinder as desired.

As shown in FIGS. 1D and 1E, the plurality of elongated vanes 54 are suspended generally horizontally across a front face of the support sheer 52 at vertically spaced locations. Each vane 54 is a generally rectangular configuration, although other configurations are contemplated, and is made with a flexible material, and has a front portion 68 and a rear portion 70, as best shown in FIGS. 1B and 1C. The rear portion 70 is optional, and may be made of a variety of material or fabric, and may be light transmissive or light blocking. The front portion and rear portion of each vane are attached together to form a unitary structure. The top edge of the front portion is folded rearwardly and downwardly to form a top tab 72. The bottom edge of the front portion is folded rearwardly and upwardly to form a bottom tab 74. The top edge 71 of the rear portion 70 is attached to the inside edge of the upper tab 72 and the bottom edge 73 of the rear portion 70 is attached to the inside edge of the lower tab 74, as best shown in FIGS. 1B and 1C. As shown in FIGS. 1 and 1B, the bottom edge 73 of the rear portion 70 is attached a short distance away from the terminal edge of the bottom tab 74. This relative location is variable based on the desired actuation and aesthetics of the vane 54 as it moves from its closed to open position, and can be changed as desired for any desired configuration.

The front 68 and rear 70 portions combine to form the vane structure 54. While described above as being rectangular, the vanes may be of any desired shape able to have the functionality described herein. The vane structure is effectively a tube with bending properties to achieve the desired aesthetic effect when in the closed and open positions. Each vane structure 54 defines a top and bottom longitudinal edge having a rearwardly facing portion. In this example, such rearwardly facing portion is contiguous with the top 72 and bottom 74 tabs formed by the front portion 68. The rearwardly facing portion 72 at the top edge and rearwardly facing portion 74 at the bottom edge of each vane structure both serve as the general attachment locations to the support sheer, as is described in greater detail below.

The vanes 54 are operably attached to the support sheer 52 along the inwardly positioned upper 72 and lower 74 tabs in a manner to be described hereafter. The exposed or front face 76 of each vane, between the tabs, has a length such that each vane 54 overlaps the adjacent underlying vane when the covering is in the closed position. See FIGS. 1A and 1D. In the closed position, each vane 54 is substantially flat and generally parallel with the support sheer 52. It is contemplated that in some embodiments an overlap is not required, and some exposed support sheer 52 could be seen between adjacent vanes 54, depending on the dimension of each vane 54 and the desired aesthetic look. Such variations in the final structure are contemplated by the apparatus and associated method as disclosed herein. Each flexible operating element 56 hangs vertically substantially the entire height of the sheer 52 and is secured at spaced locations along its length to the bottom tab 74 of each vane so that if the operating elements are lifted, the lower edge of each vane is lifted synchronously toward the upper tab of each respective vane 54 so as to define a gap or open space between the vanes through which vision and/or light are permitted. As will be appreciated, since each vane 54 is made of a flexible material, and generally bends along its longitudinal center when in an open position, movement of the bottom edge 78 toward the top edge 80 causes the vane to fold or expand forwardly as seen, for example, in FIGS. 1B and 1C. During this transition from a closed to open position, the vane 54 in cross section passes from being generally planar as shown in FIG. 1A in the closed position, to arcuate in the open position as shown in FIG. 1C.

The flexible operating elements 56 are shown as monofilament cords but can assume other various forms, including but not limited to strips of fabric or other materials, cords of synthetic or natural fibers or the like. The operating elements may have a variety of cross sections, including circular, oval, rectangular, square or other geometric shapes, and may even be irregular. The operating elements 56 need not be attached to every vane 54, but instead may be attached to any vane that is desired to be movable between an open and closed position. The examples of the operating elements provided here as well as elsewhere herein are considered means for operating in the context of this description and the appended claims.

The vanes themselves may also be made of any suitable material, including but not limited to woven or nonwoven fabrics, vinyls, metal hinged plate, or other such materials. Each vane 54 may also have a different configuration, such as being made of a single layer or multiple layers of material, or the flexibility of the material can vary from flexible and pliable to semi-rigid having creases or hinges to allow the vane to bend or change configurations efficiently during operation and movement from the closed to open position. The examples of the vanes provided here as well as elsewhere herein are considered vane means for operating in the context of this description and the appended claims.

The support sheer 52 may be any flexible or pliable sheet of other materials of various structures and levels of transparencies (from opaque to clear), and may be woven or non-woven, and made of natural and/or manmade materials. The support sheer may be characterized as a backing for the shade structure. The support sheer may also be one or more support strips not continuous across the width of the shade. Such support strips may be monofilament cords, natural cords, strings or strips, or other type of discrete structure. The support strips may be equally or unequally spaced across the width of the vane. The support sheer may also be made of strips of material attached or joined together, horizontally extending and/or vertically extending. The individual strips of material may be joined together along their side edges, or may overlap one another. The support sheer may also be sections of horizontally extending substantially rigid material (slats) operably attached together, such as slats operably, such as pivotally, attached or connected together. "Together" in this context includes adjacent to one another or spaced apart from one another. The slats can be made of plastic, wood, metal or other suitable materials. The above-referenced support sheer, also referred to as support structure or backing, as well as other examples provided herein, are considered means for supporting in the context of this description and the appended claims.

In operation of the window covering or shade described herein, the upper tab 72 of each vane 54 is connected to a support sheer 52 across the width of the support sheer. The operating elements 56 extend between the support sheer 52 and the upper tab 72 of each vane and, where the operating elements 56 extend between these two elements, the upper tab 72 of the vane and the support sheer 52 are not attached together to allow the operating element to move relatively between the two. The operating elements 56 are attached to the lower tab 74 of each vane 54, and the lower tab 74 of each vane 54 is not attached to the support sheer 52, such that when the operating elements are pulled upwardly, the lower tab 74 of each vane is pulled towards the upper tab 72 of each vane 54 to move the vanes 54 from the collectively closed position to the collectively open position, as shown in the transition from FIG. 1A to FIG. 1C and from FIG. 1D to FIG. 1E.

The upper tab 72 of each vane 54 is connected to the support sheer by an adhesive, glue, or other means (collectively referred to as adhesive herein) which fixedly attaches the two structures together. In the manufacturing process, the adhesive is not activated at the locations where the operating element 56 passes between the upper tab 74 of the vane 54 and the support sheer 52, thus allowing the operating element 56 to move freely relative to the upper tab 72 of the vane 54 and the support sheer 52.

Figure 25A:
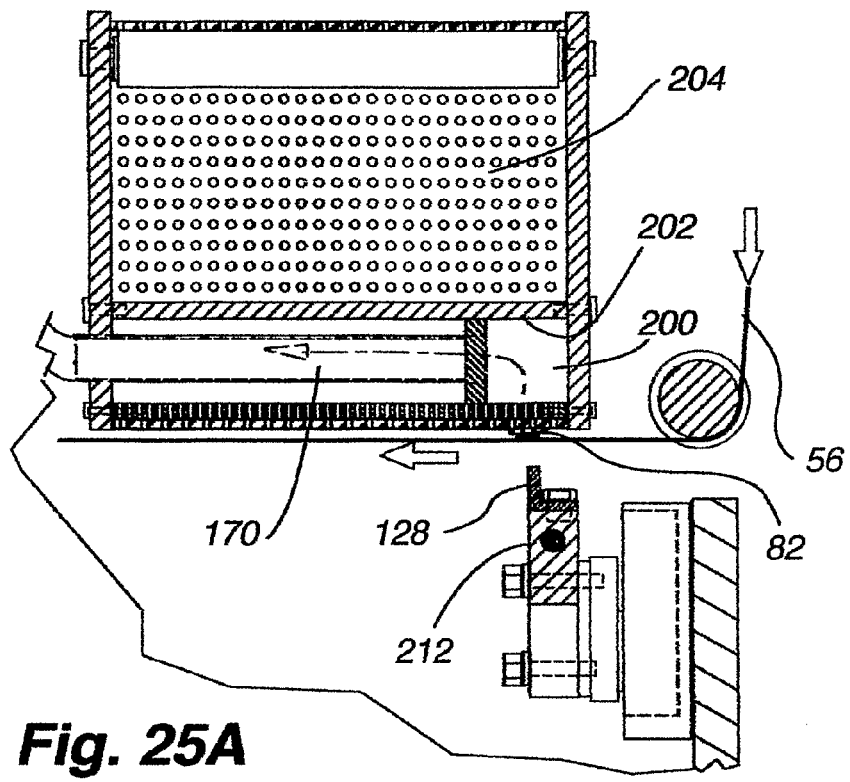
FIG. 25A is a section taken along the line 25A-25A of FIG. 24.
Figure 25B:
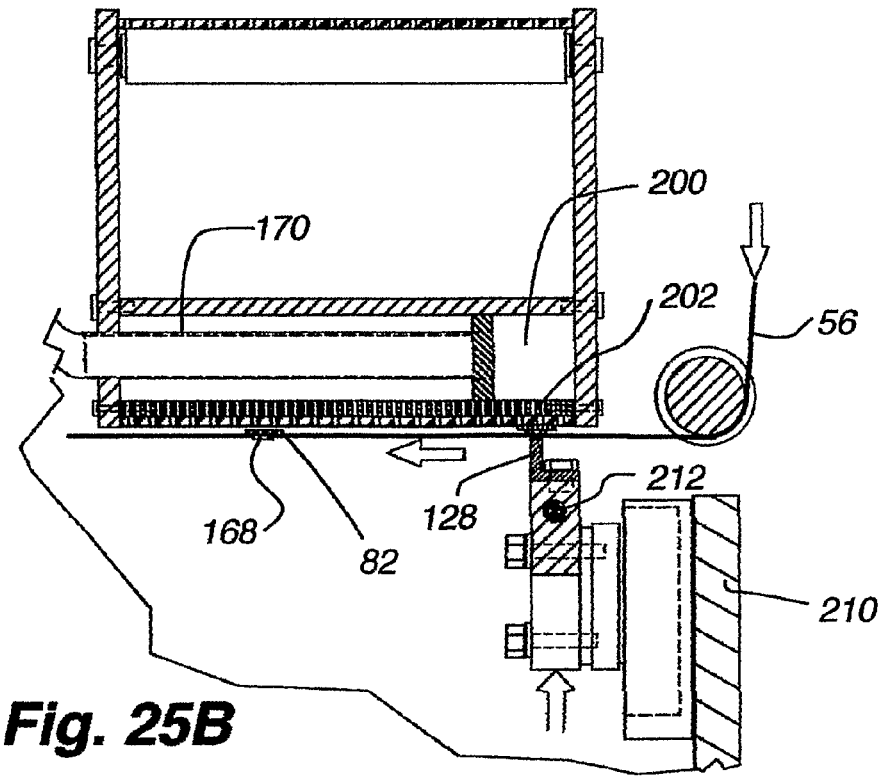
FIG. 25B is a section similar to FIG. 25A with the melt bar engaging the operating elements and the tape.
Figure 25F:
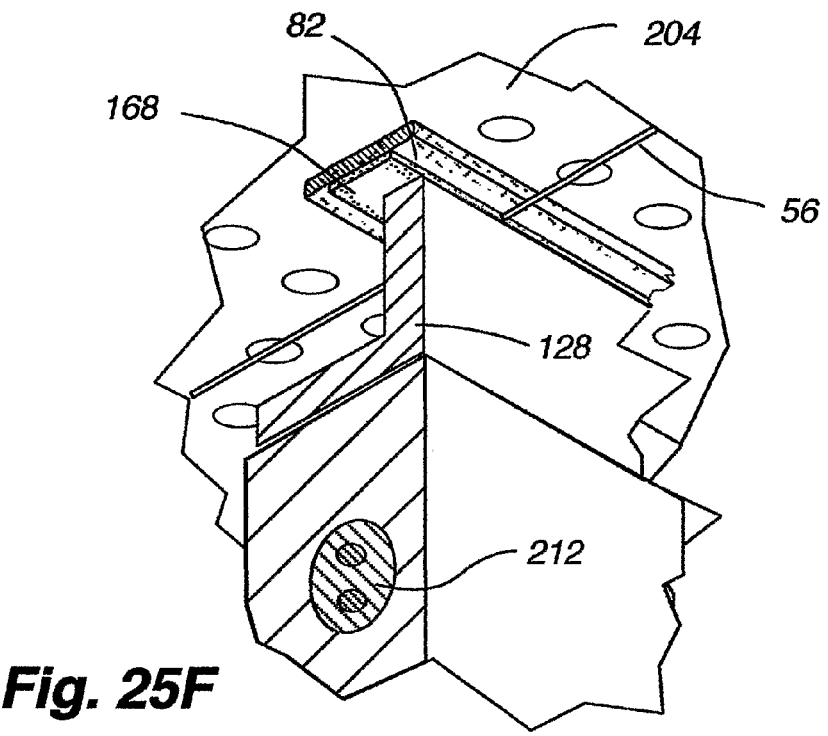
FIG. 25F is a lower perspective view of FIG. 25E.
Figure 25G:
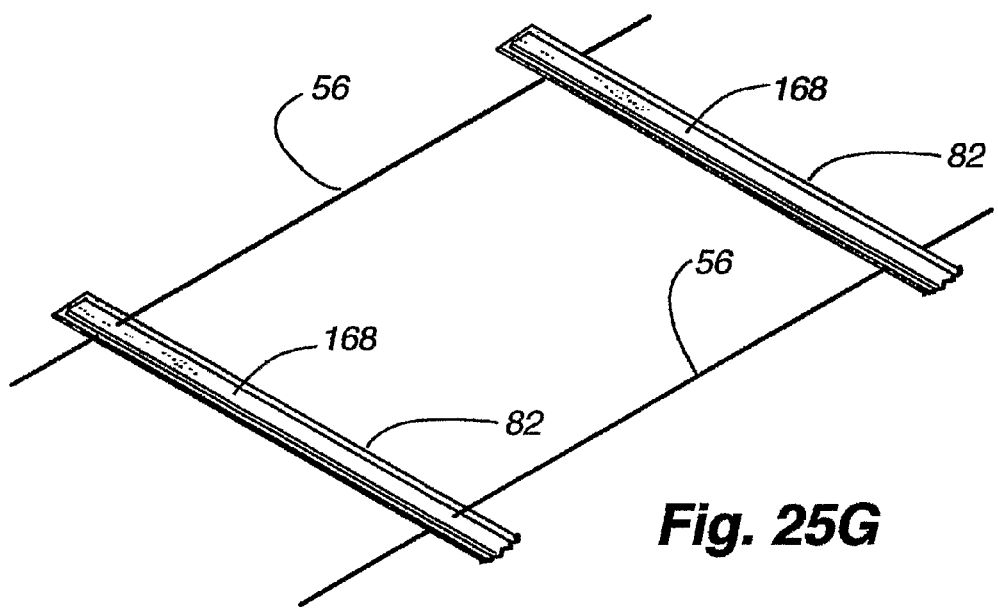
FIG. 25G shows two lengths of the tape attached with two operating elements.

The lower tab 74 of each vane 54 is connected to each operating element 56 with an attachment strip or tape 82 (see FIG. 25G). The attachment strip 82, or tape, is a backing or blocking material upon which adhesive is applied. The adhesive side of the tape 82 is pressed against the operating elements 56 to adhere the operating elements to the tape 82. The tape 82 is impervious to the adhesive so that it keeps the adhesive from flowing through the tape 82 and attaching to the support sheer 52 in later processing steps. In this way, the operating elements 56 are attached to the lower tab 74 of the vane 54, yet the lower tab 74 of the vane 54 is not attached to the support sheer 52, which allows the bottom edge 78 of the vane 54 to move up and down with respect to the support sheer 52 upon operation of the operating elements 56. The adhesive that is used to hold the tape 82 to the operating elements 56 is also used to attach the combination of tape 82 and operating elements 56 to the lower tab 74 of the vane 54. Additional adhesive or other adhesives may be utilized.

In the particular embodiment of the retractable shade 50 with collapsible vanes 54 described herein, the upper (or top) tab 72 has a smaller height than the lower (or bottom) tab 74. See FIGS. 1B and 1C. The bottom edge 78 of the bottom tab 74 in the closed position of the retractable shade 50 overlaps the top edge 80 of the immediately adjacent underlying vane (see FIG. 1D). In this manner, when the shade 50 is in the closed position, vision and/or light through the shade is minimized (based on the underlying opacity of the sheet material and the vane material). As noted above, the vanes 54 may be spaced apart from one another when in the closed position depending on the desired aesthetic in any particular design configuration.

The operation of the shade is probably best illustrated in FIGS. 2 through 6. In this example, the vanes 54 are made of a single layer of material and have a crease formed therein for an angular cross-sectional profile. In FIG. 2, the shade is shown fully retracted and completely wrapped around the roller 60 with the lower edge of the panel being positioned along the backside of the roller. As the roller 60 is rotated in a counterclockwise direction, as viewed in FIGS. 2 through 6, the shade 50 in its closed position drops by gravity with each vane 54 being substantially flat and overlapping the next adjacent lower vane. The shade 50 remains in this generally flat, closed orientation through the position shown in FIG. 3, and until it reaches the nearly full and extended position of FIG. 4, at which point the attachment groove 64 of the support sheer to the roller 60 is at the top of the roller and the attachment groove 66 of the operating element 56 is at the rear of the roller. Further counterclockwise rotational movement of the roller 60 to the position of FIG. 5 shows the operating elements 56 being pulled upwardly relative to the support sheer 52 by the forward movement of the second groove 66 in which the operating elements are anchored. As the operating elements 56 are lifted relative to the support sheer 52, they simultaneously lift the lower edge 78 of each vane 54 causing the vane to bend, fold or buckle outwardly with the lower edge 78 of each vane 54 being separated from the upper edge 80 of the next adjacent lower vane. Continued counterclockwise rotation of the roller 60 to the position of FIG. 6, which is the limit of its counterclockwise rotation, causes the second groove 66 to be disposed near the front of the roller, having lifted the bottom edge 78 of each vane 54 as far as it will be lifted so the shade is in the fully open positions with the gaps between the vanes 54 maximized.

Figure 4:
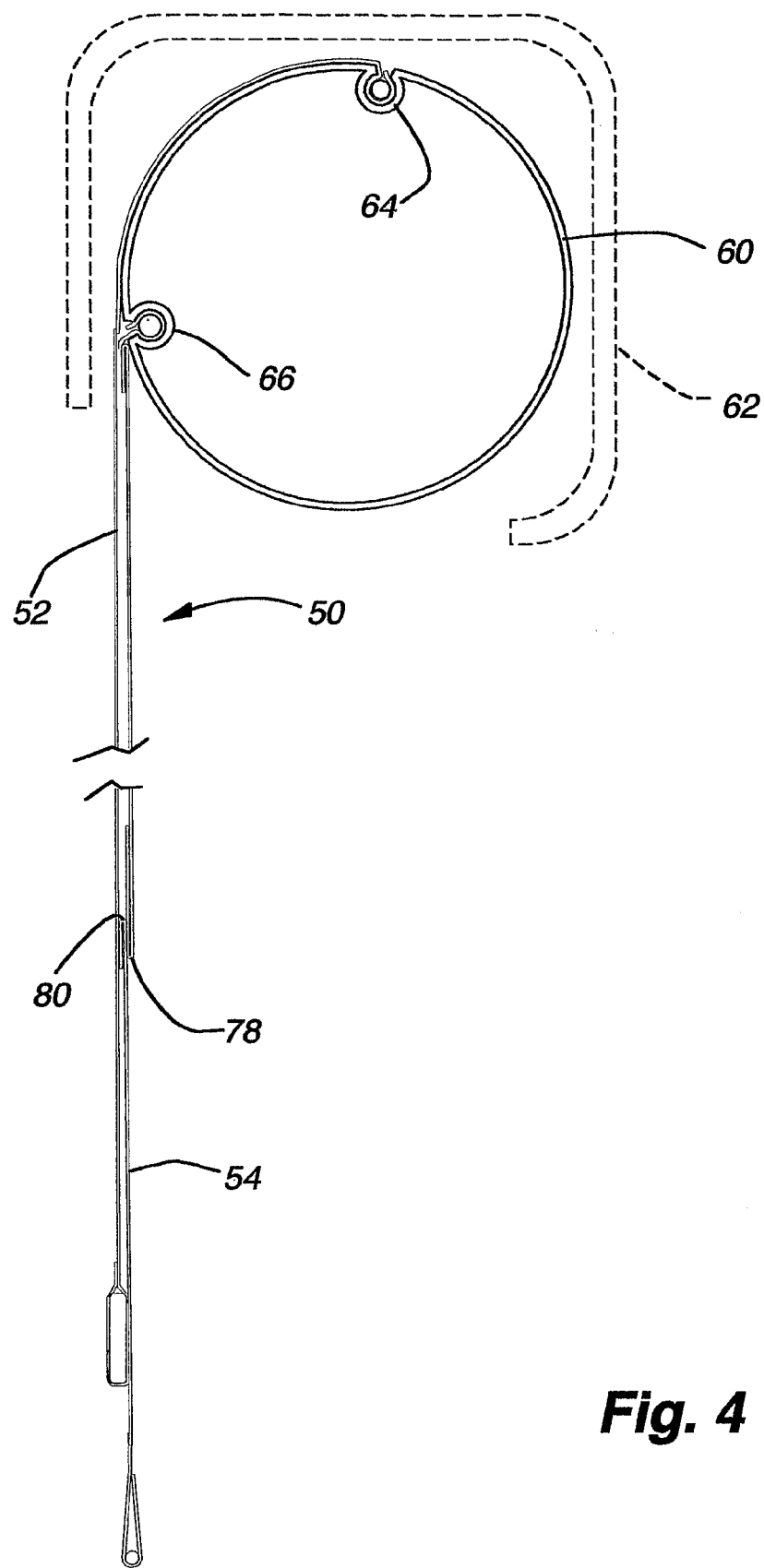
FIG. 4 is similar to FIG. 3 with the shade shown in the extended position.

In a reverse rotation of the roller 60, i.e., in a clockwise direction from the position of FIG. 6, the second groove 66 will initially move to the position of FIG. 5 allowing the lower edge 78 of each vane 54 to drop by gravity to the position of FIG. 4 where the vanes are entirely closed and in a substantially coplanar relationship with the support sheer. Continued clockwise rotation causes the shade 50 in its closed condition to be wrapped around the roller 60 until it again resumes the retracted position of FIG. 2.

It will be appreciated from the above that the shade can be fully retracted, as is illustrated in FIG. 2, or lowered with the vanes 54 in their fully closed position in the desired degree until the shade is fully extended as shown in FIG. 4, but the vanes 54 are closed. Further rotation of the roller 60 causes the vanes 54 themselves to retract and create gaps between adjacent vanes through which vision and/or light is allowed through the panel. As will be appreciated, in this embodiment the vanes can only be opened when the panel is fully extended, even though with the vanes closed, the degree of extension of the shade 50 across the architectural opening can be to any desired degree. It is contemplated that a different actuation system that allows more independent actuation of the operating elements may allow the vanes to be actuated when the shade is only partially deployed.

Figure 7:
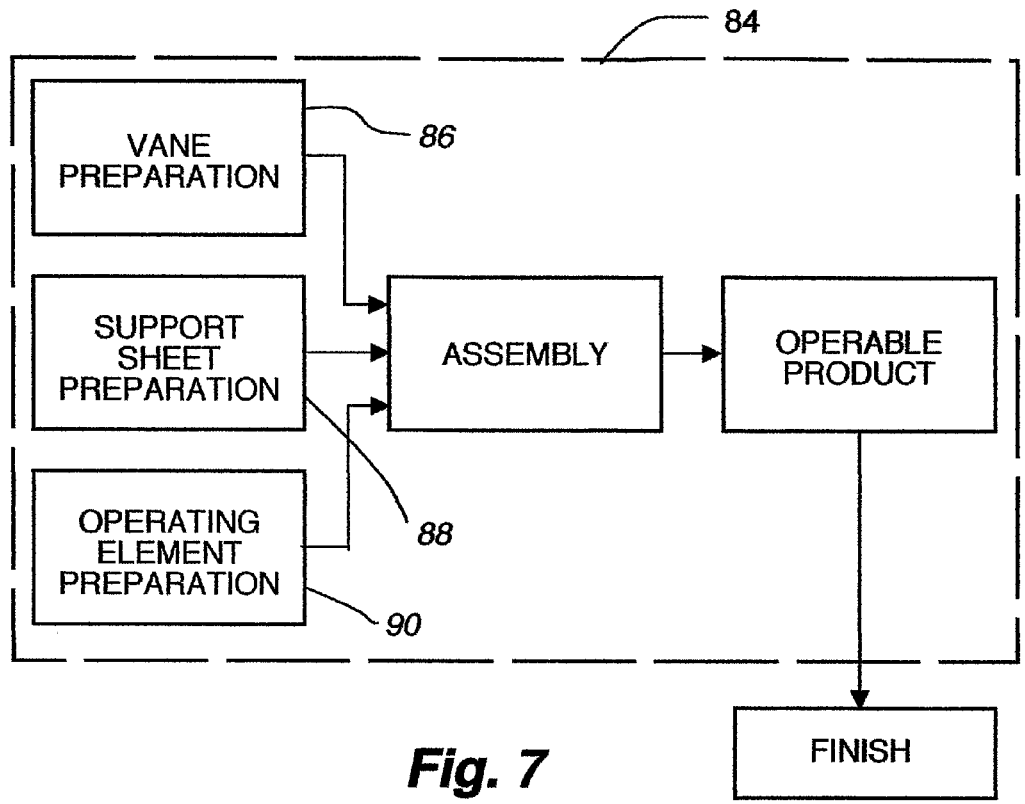
FIG. 7 is a block diagram of the basic operational steps of the apparatus.
Figure 8:
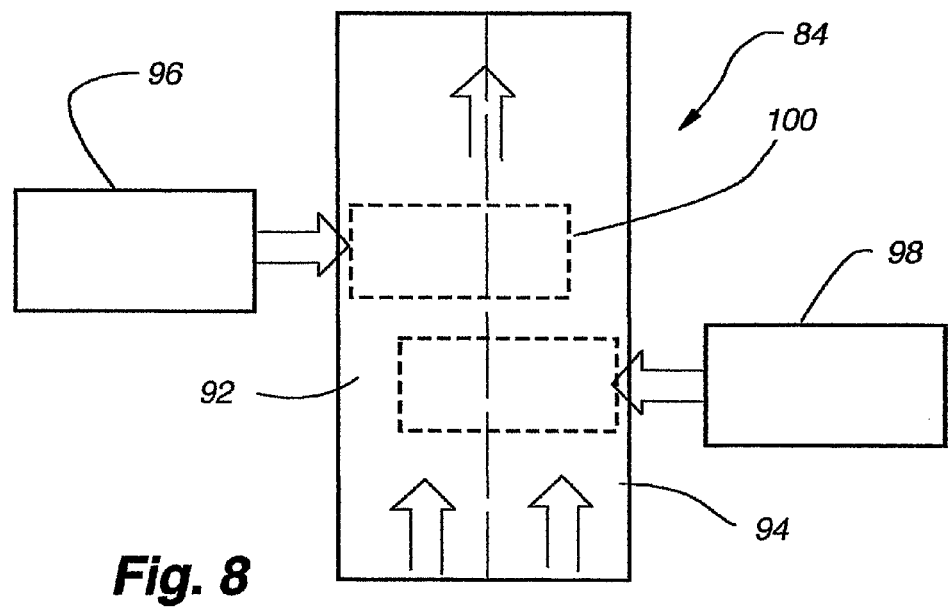
FIG. 8 is a schematic view of the apparatus of the present invention.

An apparatus 84 and associated method of assembling the retractable shade with collapsible vanes as described above, is described hereafter. As shown schematically in FIG. 7, the apparatus and associated method effectively employ a vane preparation section 86, a support sheet preparation section 88, and an operating element preparation section 90 to facilitate all three being assembled into the operable product, which is then finished into final product form in a conventional manner. The apparatus for performing the method of assembly is shown schematically in FIG. 8, and has a support sheer transport assembly 92, an operating element transport assembly 94, a vane transport assembly 96, and a tape transport assembly 98. All four of these assemblies converge to the attachment assembly 100 where the vane 54 and operating elements 56 are operably attached to the support sheer 52. The instant embodiment of the apparatus 84 performing the method of the present invention is a cross-shaped structure with a support sheer transfer assembly 92 and the operating element transport assembly 94 extending from bottom to top in FIG. 8. In general, the support sheer 52 and operating elements 56 both move along the length and direction of movement of the support sheer through the apparatus 84. The vane transport assembly 96 sits off to one side of the support sheer transport assembly 92, and the tape transport assembly 98 sits off to the opposite side of the support sheer transport assembly 92 from the vane transport assembly 96. The vane transport assembly 96 and the tape transport assembly 98 each operate to prepare the vane 54 and tape 82 for adherence to the support sheer 52, and also facilitate the movement of the appropriate length of vane 54 and tape 82 transverse to the length (e.g., across the width of) of the support sheer 52, as will be described in greater detail below. It should be understood that the vane transport assembly 96 and tape transport assembly 98 could be positioned on the same side as the other, above or below one another, and multiple such stations can be positioned along the length of the support sheer transport assembly 92, depending on the particular design of the shade 50 being built in the apparatus 84. In FIG. 8, the support sheer transport assembly 92 and operating element transport assembly 94 are shown side by side. This is a convenience of representation. As will be further described below, the operating element flow is below the support sheer flow, as necessary for the particular attachment structure described herein. The attachment assembly 100 is shown in FIG. 8 coextensive and adjacent the location of introduction of the vane 54, and downstream of the introduction of the tape 82 to the support sheer transport assembly 92. This position may also vary depending on the particular design of the shade 50 being produced. At the attachment assembly 100, the apparatus 84 attaches the vane 54 to the support sheer 52 and the combination tape 82 and operating element 56 to the vane 54, as is also described in greater detail below.

Figure 9:
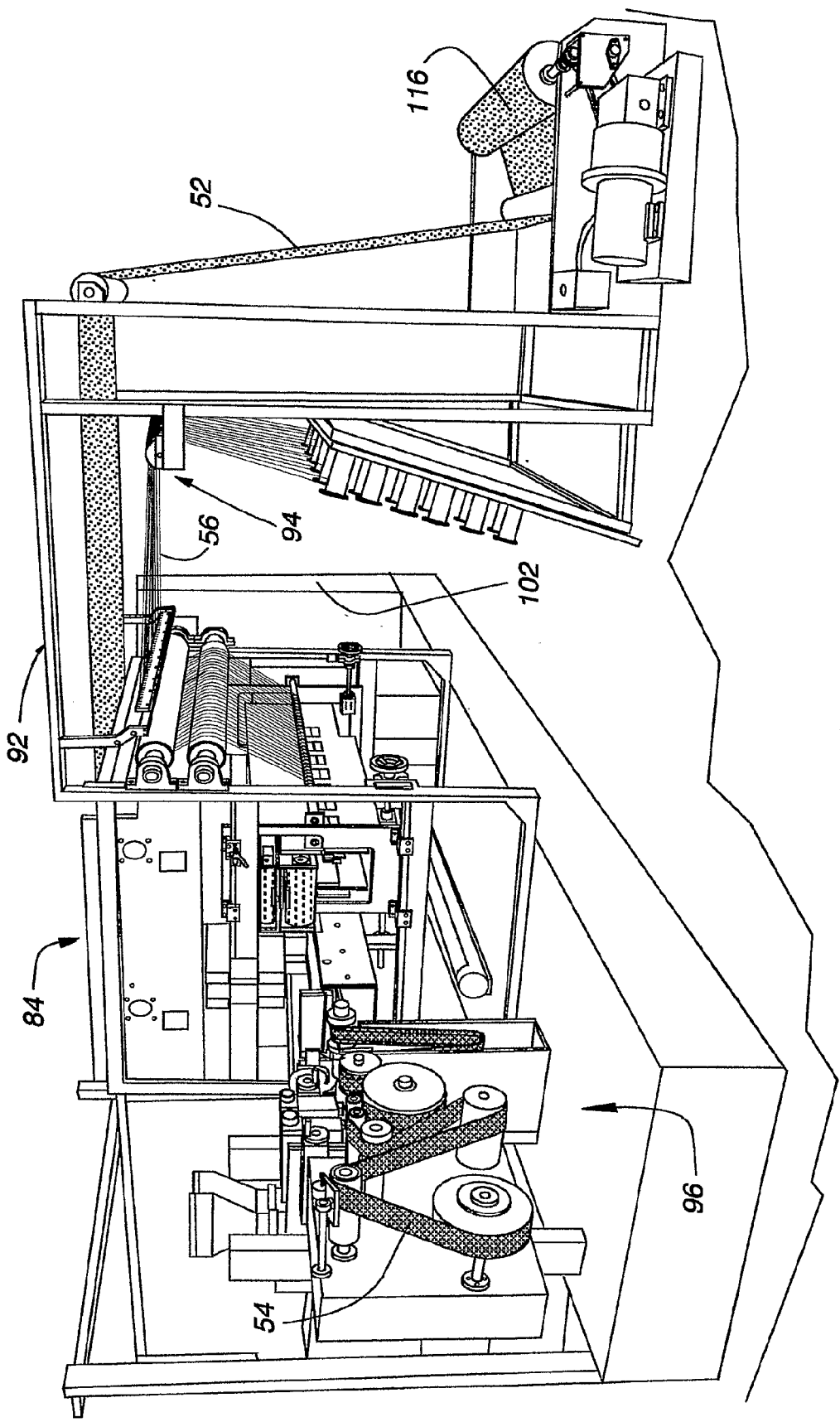
FIG. 9 is a perspective view of the apparatus of the present invention, showing the vane handling assembly, the support structure handling assembly, and the operating element handling assembly.
Figure 10:
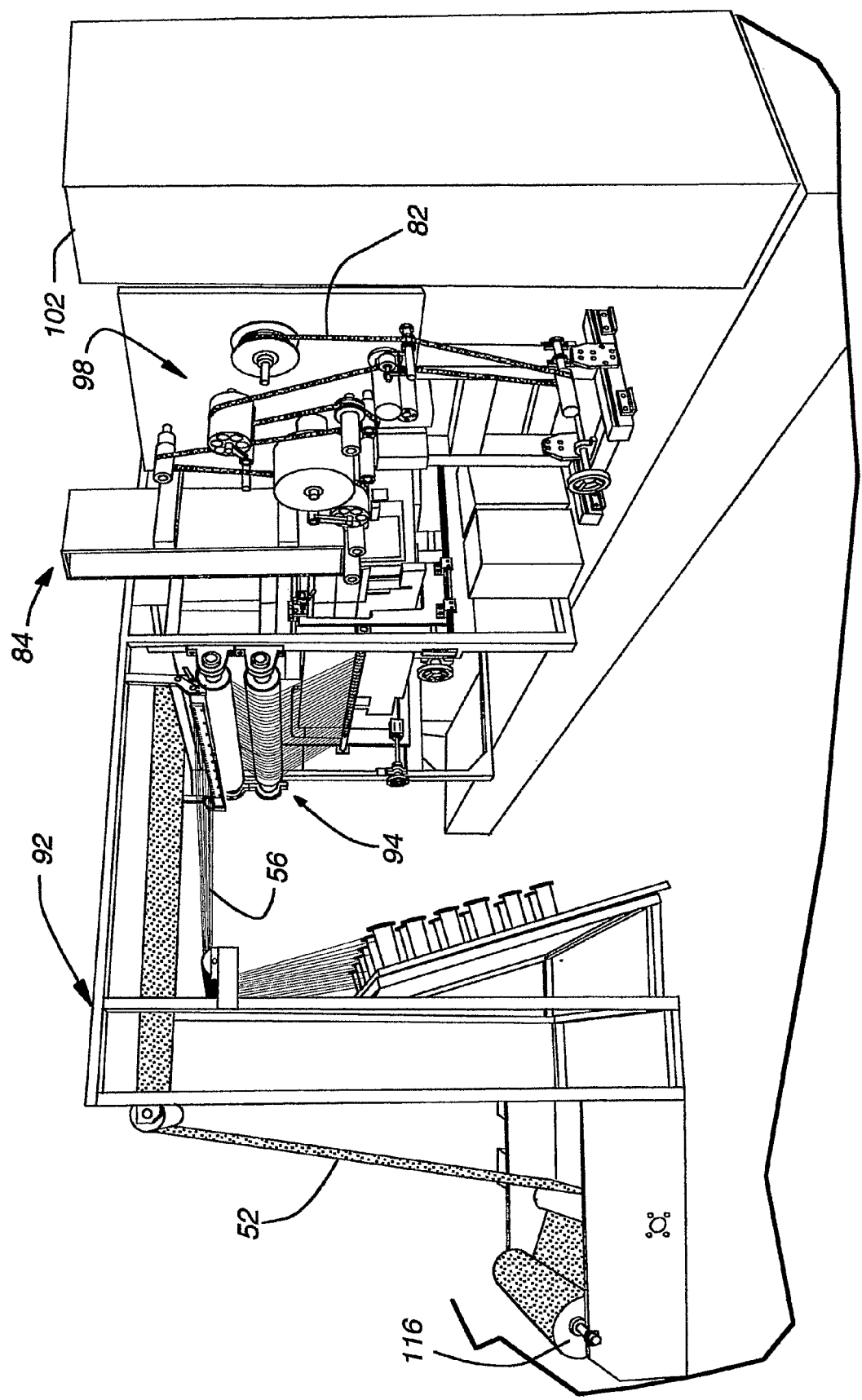
FIG. 10 is a perspective view of the apparatus shown in FIG. 9 from the opposite side, showing the tape handling assembly, the support structure handling assembly, and the operating element handling assembly.

In FIGS. 9 and 10, an assembly apparatus 84 is shown, including the support sheer transport assembly 92, the operating elements transport assembly 94, the vane transport assembly 96, and the tape transport assembly 98. The support sheer transport assembly 92 is shown with the support sheer 52 being unrolled from the rolled bolt material and drawn through the apparatus by a nip roller (not shown). The operating element transport assembly 94 is shown below the support sheer transport assembly 92 and facilitates the spacing and tensioning of the operating elements 56 for transport into the apparatus 84 and attachment to the tape 82, which will be described in more detail below. The vane transport assembly 96 extracts the prepared vane 54 from a supply roll and applies adhesive to the tabs 72 and 74 on the vane 54, and transports the proper length of the vane 54 across the support sheer 52 in preparation for the attachment process. The tape transport assembly 98 is shown on the side of the apparatus opposite the vane transport assembly 96, and is better seen in FIG. 10. The tape transport assembly 98 applies adhesive to one side of the tape 82 and then facilitates the extension of the proper length of tape across the support sheer 52 for operable attachment to the operating elements 56, and then to the bottom tab 74 of the vane 54.

The operation of the apparatus 84, including the operation of the various transport assemblies and attachment station, are controlled by various automated components in the control tower 102 shown adjacent the tape transport assembly 98 in FIGS. 9 and 10. The automated components include, but are not limited to, microprocessors, memory, logic controllers, programmable logic units, software, and other known systems and components to allow the control of the various timing and operation steps performed by the apparatus. The controller unit controls the advancement of the support sheer 52 and the operating element 56, the insertion of the vane 54 and tape 82, and the application of the adhesives, as well as the attachment step for adhering the tape 54 to the operating elements 56, and the vane 54 to the support sheer 52 and tape 82, among other aspects of the apparatus.

Figure 11:
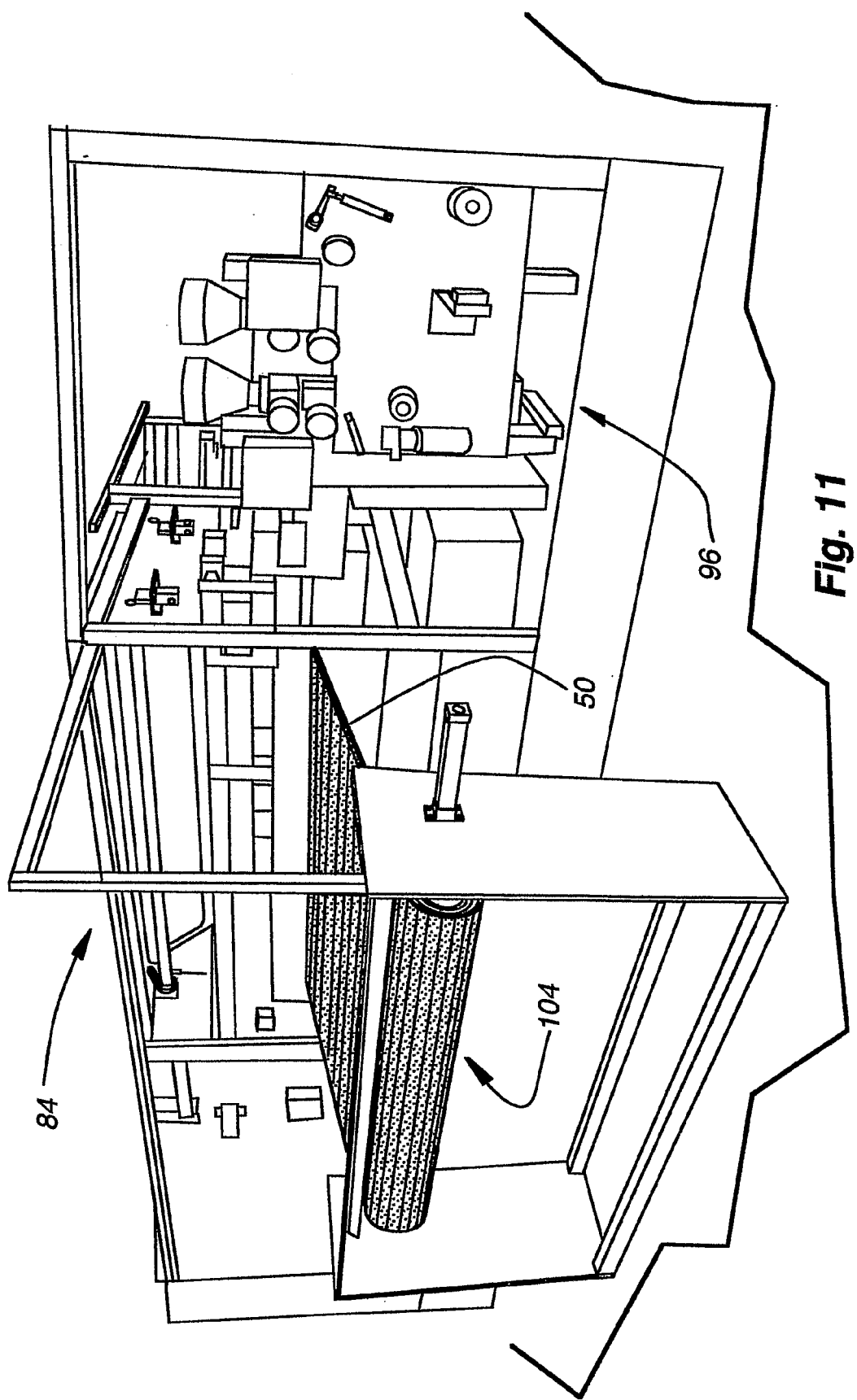
FIG. 11 is a perspective view of the apparatus of the present invention, taken from the output side thereof, where the assembled shade is extracted from the apparatus.

FIG. 11 shows the output side of the apparatus 84 where the completed shade structure 50 is extracted from the apparatus and rolled on a receiving roller 104 in order to be taken to the finishing process where the shade 50 is cut to its final length and width and the head rail, roller and bottom weights are all installed and the product readied for sale.

Figure 12:
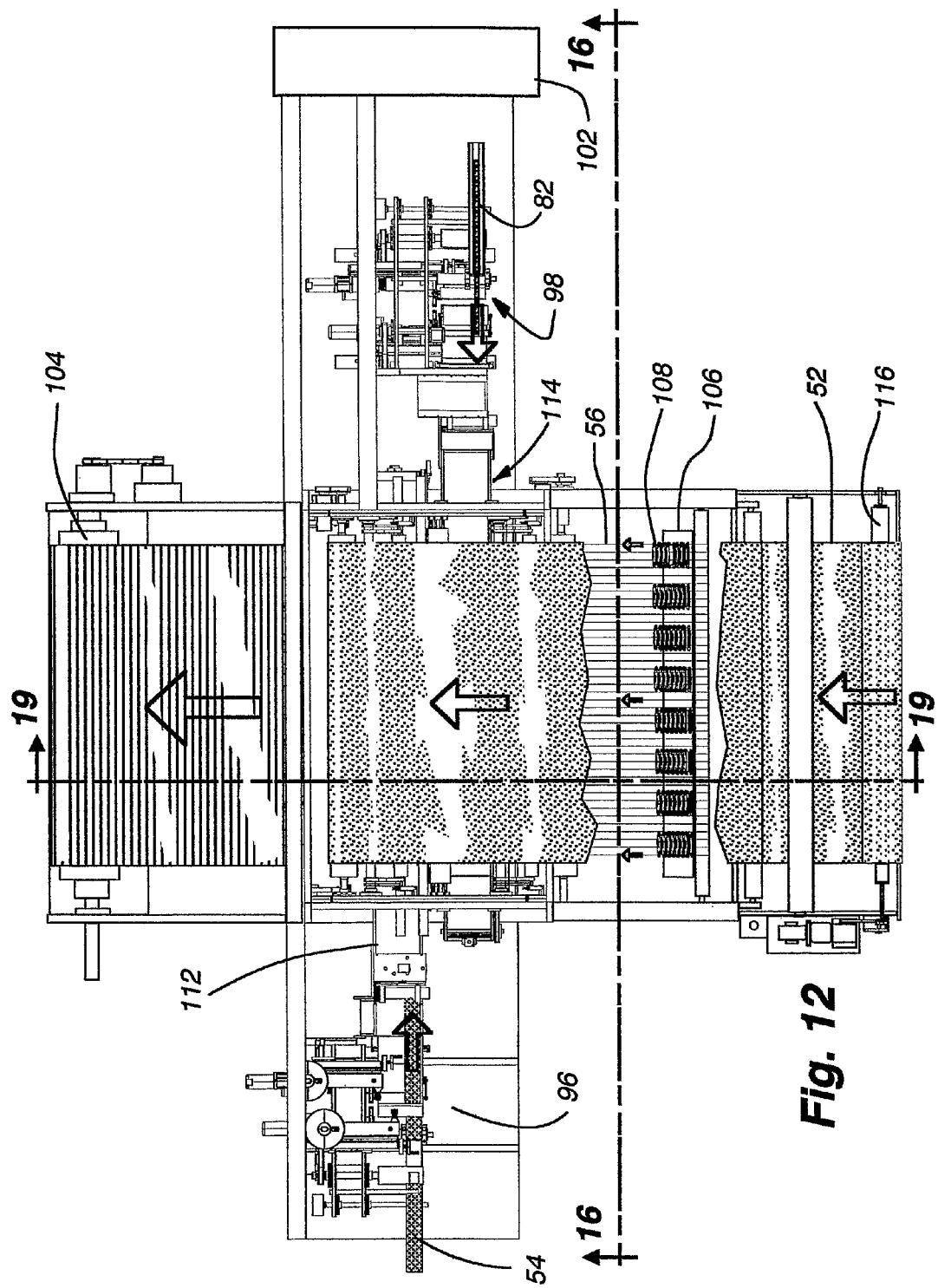
FIG. 12 is a top plan view of the apparatus of the present invention.

FIG. 12 shows a top view of the apparatus 84 in its current embodiment and is a more detailed representation of the schematic shown in FIG. 8. The source roll 116 of the support sheer material 52 is shown at the bottom of FIG. 12 with the support sheer material being drawn into the apparatus 84 by a set of nip rollers 110 (see FIG. 15). Below the overarching movement of the support sheer 52, the operating elements 56, in this embodiment shown as monofilament line, are taken from a plurality of spools 108 on a supply rack 106 and drawn into the apparatus through spacing elements that help ensure the proper width spacing of the operating elements 56. The operating elements 56 are drawn through the apparatus by nip rollers (see FIG. 15). The vane transport assembly 96 is shown extending off to one side of the support sheer 52 and shows the vane material 54 being initially handled and then extended transversely across the support sheer 52 by a conveyor assembly 112 as will be described in greater detail below. Similarly, on the opposite side of the support sheer transport assembly 92 from the vane transport assembly 96, the tape transfer assembly 98 is shown. The tape transport assembly 98 initially processes the tape 82 and uses a conveyor assembly 114 to transport the proper length of the tape 82 transversely across the length of the support sheer material 52. This will also be described in greater detail below. FIG. 12 shows the incoming support sheer material 52 and incoming plurality of operating elements 56 along with the lateral disposition of the vane 54 from one side and the tape 82 from the other side for individual processing in the apparatus to attach all the elements together to form the retractable shade 50 with collapsible vanes. The completed product is shown coming out of the apparatus at the top, and received onto the receiving roll 104 for further processing into the finished product.

Figure 13:
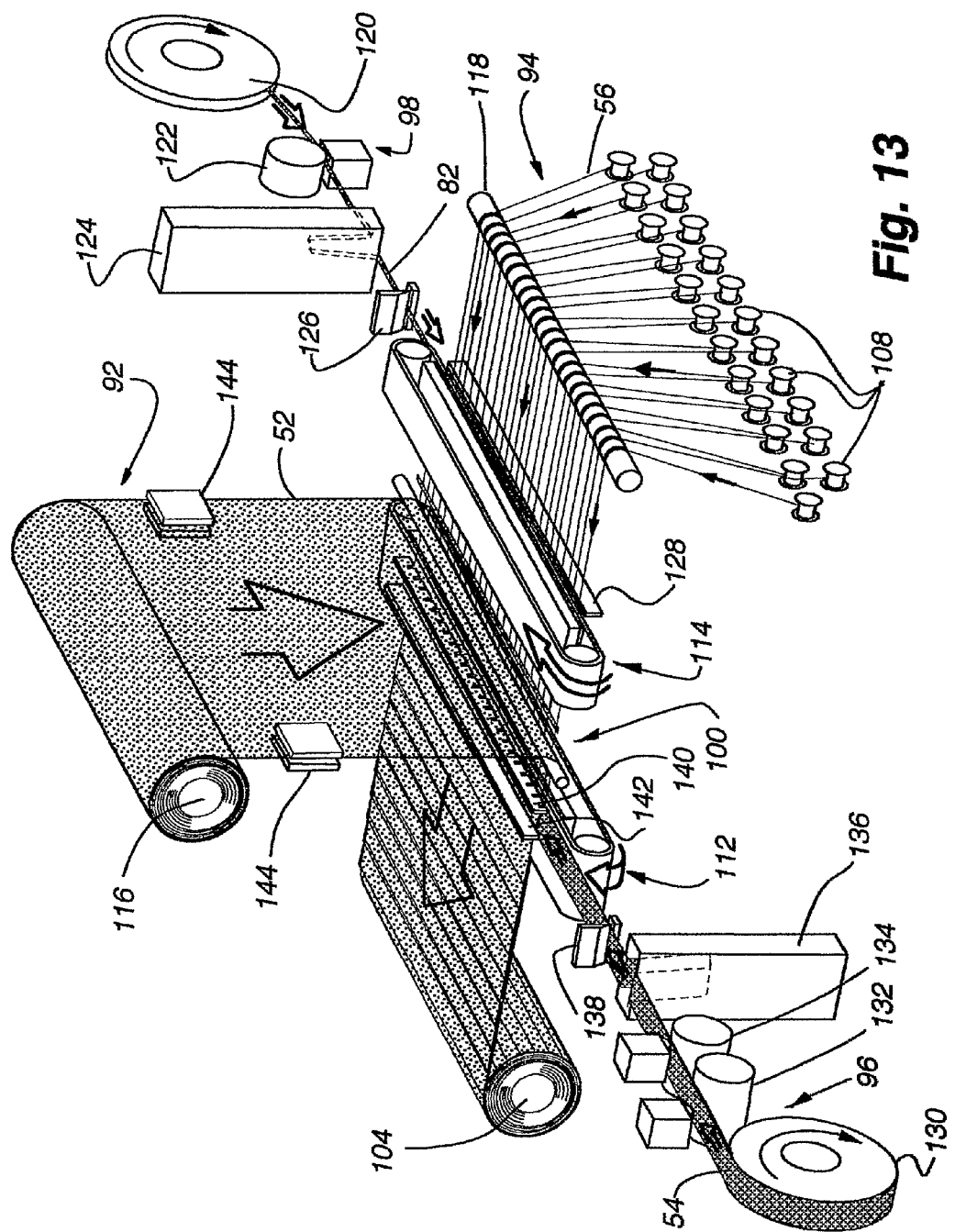
FIG. 13 is a schematic view of the support structure handling assembly, the operating element handling assembly, the tape handling assembly, and the vane handling assembly.
Figure 14:
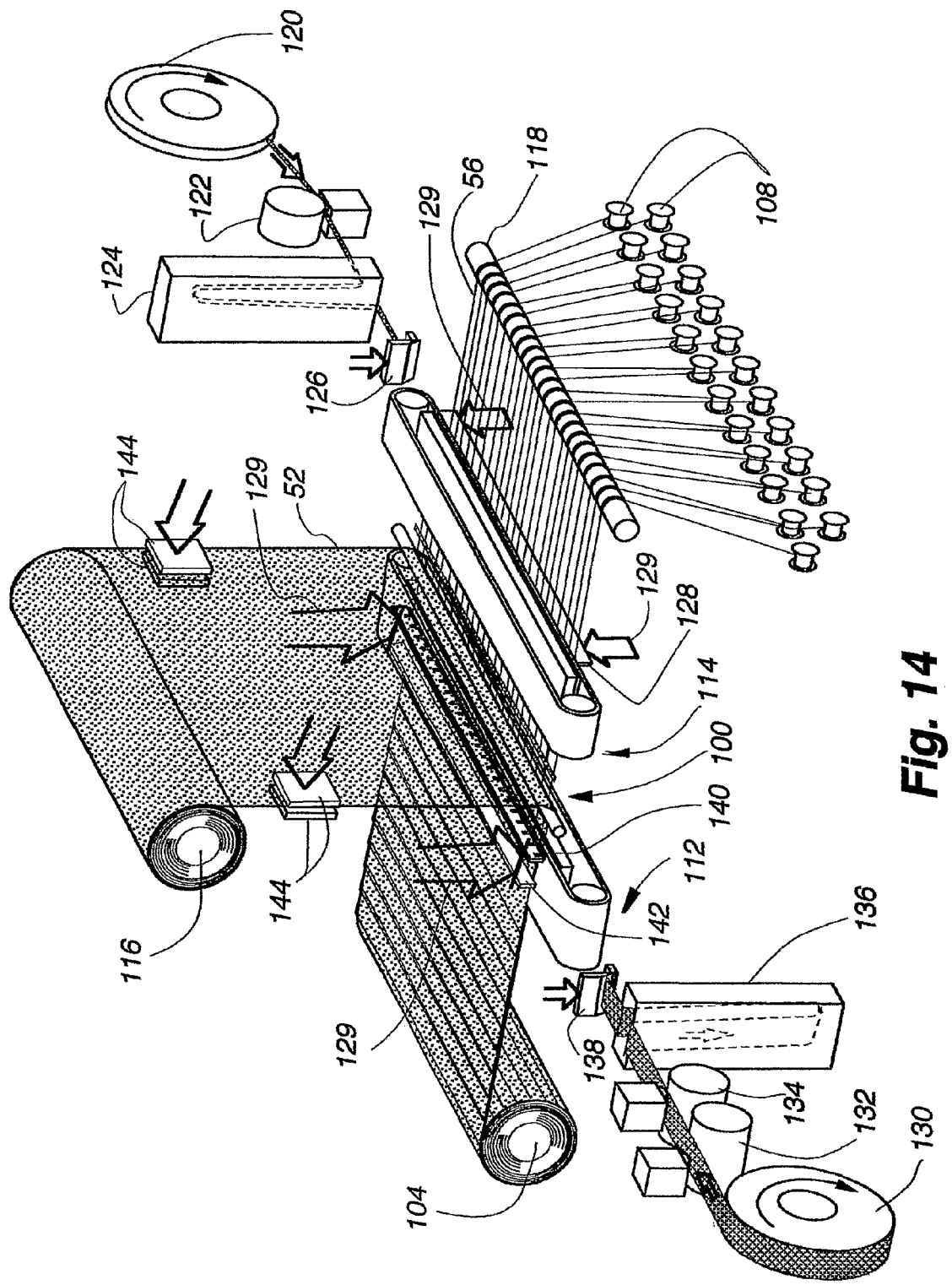
FIG. 14 is similar to FIG. 13, with the assembly components actuated.
Figure 15:
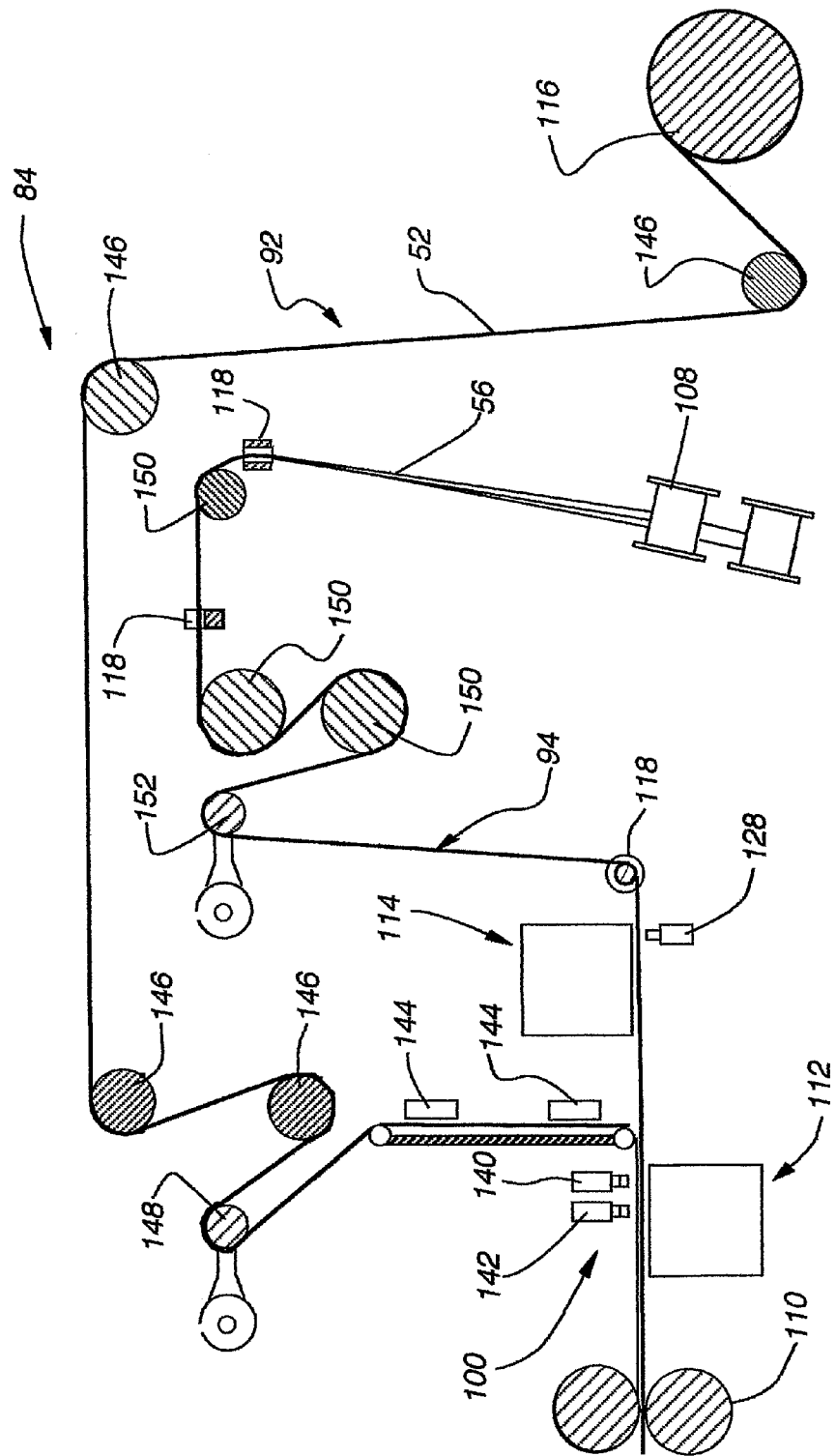
FIG. 15 is a material flow schematic of the support structure and the operating elements in the apparatus of the present invention.

FIGS. 13, 14 and 15 show a schematic view of the support sheer transport assembly 92, the operating element transport assembly 94, the vane transport assembly 96, and the tape transport assembly 98. The support sheer transport assembly 92 shows the feed roll 116 supplying the support sheer 52 into the apparatus 84 through the attachment station 100 and out to the receiving roll 104. The operating element transport assembly 94 shows the plurality of spools 108 from which the operating elements 56 are withdrawn, and a spacer element 118 which shows the spacing of the operating elements 56 prior to being bonded to the tape 82. The operating elements 56 flow into the apparatus 84 parallel to one another for attachment to the tape 82, and then in combination with the tape attach to the bottom tab 74 of the vane 54. The vane transport assembly 96 shows the vane feed roll 130, two adhesive application units 132 and 134 for applying adhesive to the top 72 and bottom 74 tabs on the vane 54, the vacuum accumulator 136, and the shear device 138 for cutting the vane to the proper length. A vacuum transport conveyor 112 is shown and is used to transport the vane across the width of the support sheer. A pair of melt bars 140, 142 are shown above the vane vacuum conveyor 112. The melt bars (or bonding bars where no heating or cooling aspects are utilized) 140, 142 are respectively for attaching the support sheer 52 to the top tab 72 of the vane 54 and the combination of tape 82 and operating elements 56 to the bottom tab 74 of the vane 54, as described in detail below. The slots shown in the front melt bar 140 allow for the operating elements 56 to not be attached to the top tab 72 of the vane 54, as is described in greater detail below.

The tape transport assembly 98 shows the feed roll for the tape 120, the adhesive application station 122 that applies adhesive to the tape 82 as it passes through, the vacuum accumulator 124, the shear mechanism 126, and the vacuum transport conveyor 114. The melt bar 128 for attaching the tape 82 to the operating elements 56 is shown below the tape vacuum conveyor 124.

In FIG. 13, the tape 82 is shown extending from the tape transport assembly 98 (by the vacuum conveyor 114) across the operating elements 56 and prior to attachment to the operating elements. Similarly, the vane 54 is shown extended across the support sheer 52 by the vacuum conveyor 112 and prior to the actuation of the melt bars 140, 142 to attach the vane 54 to the support sheer 52 and the operating elements 56. FIG. 14 shows the schematic after the tape shear mechanism 128 and the vane shear mechanism 138 have been actuated (note arrows 129) and the length of tape 82 and length of vane 54 are properly positioned across the operating elements 56 and support sheer 52, respectively. The arrows 129 show the actuation of the various mechanisms, including the actuation of the shear mechanisms 126 and 138, the tape melt bar 128, and the vane melt bars 140, 142. Also note the optional clamps 144 on the support sheer material 52 to assist in holding it in place during the attachment step. After the shear mechanisms 126 and 138 have been actuated, the movement of the tape 82 and vane 54 material off their feed rollers 120, 130 continues, primarily because the adhesive application is best suited for continuous processing (however, continuous processing of adhesive glue application is not critical to the invention). The length of the tape 82 and vane 54 must be accumulated somewhere until the next section of the length is drawn across the support sheer 52. As described further below, the vacuum accumulators 114, 112 are used to accumulate the length of tape 82 and vane 54 to allow the adhesive applicators to run continuously even though the use of the tape 82 and vane 54 in the apparatus 84 is in discrete lengths.

FIG. 15 is a cross-sectional view schematic lay out of the apparatus 84 of the present invention configured to assemble the shade 50 as described above. The support sheer transport assembly 92 shows the feed roll 114 over four guide rollers 146 in an overarching path to a dancer 148, which is used to adjust the tension in the support sheer 52 as it moves through the apparatus 84. After the dancer, the support sheer moves down through the optional clamp mechanism 144 and around a roller to flow through the attachment station 100. The support sheer 52 is drawn through the apparatus 84 by a pair of nip rollers 110.

The operating element transport assembly 94 is shown with the operating elements 56 being drawn off spools 108 and positioned through at least one spacing element 118, although three are shown in this embodiment in order to adequately position the operating elements precisely with respect to the tape 82 and precisely with respect to the ultimate position on the support sheer 52. The operating elements 56 wind around a few rollers 150, including a dancer 152 for adjusting the tension of the operating elements 52 as they flow through the assembly 84. The vacuum conveyor 114 of the tape transport assembly 98 is shown with the melt bar 128 shown on the opposite side of the operating elements therefrom in order to attach the tape 82 drawn out on the vacuum conveyor 114 of the tape transport assembly 98 across the width of the support sheer 52. The melt bar 128 moves upwardly in this configuration to contact the tape and attach the operating elements 56 to the tape 82. The operating elements 56 in combination with the tape 82 then move to the assembly station 100 where the vane transport assembly 96 has drawn a length of vane 54 across the support sheer 52 and positioned it under the pair of melt bars 140, 142. At the assembly station 100 the pair of melt bars 140, 142 are actuated to move downwardly in this configuration to contact the sheer 52 to attach the top tab 72 of the vane 54 to the support sheer 52 with the right melt bar 140, and to attach the tape 82 and operating elements 56 to the bottom tab 74 of the vane 54 with the left melt bar 142. As one can see, the process flow is continuous with the support sheer 52, the operating elements 56, the vane 54 and the tape 82 being moved in stepped distances to the proper location for processing in the apparatus as described.

Figure 16:
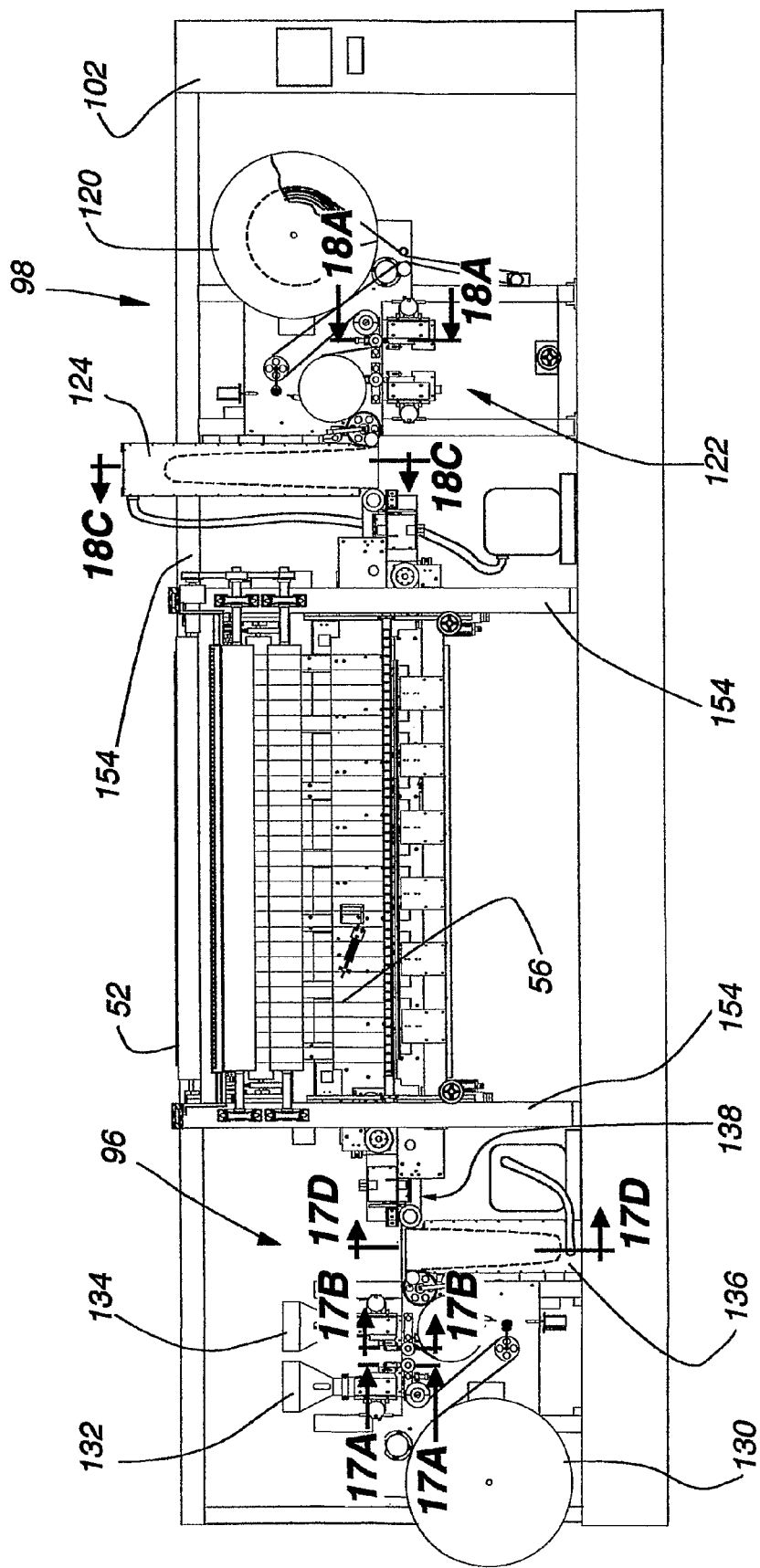
FIG. 16 is an end view of the apparatus of the present invention, but not showing the source roll of the support structure, nor the source spools of the operating elements.

FIG. 16 shows an end view of the apparatus 84 taken as shown from FIG. 12, and does not show the supply spool 116 for the support sheer 52 or the supply spools 108 of operating elements. These features are described elsewhere herein. The vane transport assembly 96 is shown on the left of the central frame 154, the tape transport assembly 98 is shown on the right of the central frame 154, and the operating elements 56 and support sheer 52 move into the apparatus (into the page) between and within the central frame 154.

With respect to the vane transport assembly 96 generally, the supply roll 130 of the vane 54 provides vane material first to a tensioning pulley, then to the adhesive application stations 132, 134. The vane 54 is oriented with the rear tabs 72, 74 facing upwardly for the adhesive application stations to apply a line of adhesive along and on each tab 72, 74 as the vane 54 passes through the adhesive application stations. Once the adhesive has been applied to the upwardly facing tabs 72, 74 on the vane 54, the vane 54 runs through a vacuum accumulator 136 which accumulates the necessary length of the vane 54 for subsequent processing, and applies a constant tension on the vane transport assembly to help ensure that the vane material does not improperly tighten up or become too loose in the next steps. The shear mechanism 138 is positioned near the central frame 154 and is used to cut the vane material 54 at the desired length as part of the lateral transport process. The vane then runs through a nip roller (see FIG. 17E) positioned near the central frame 154. The nip roller pulls the vane 54 from the supply roll 114 and through the adhesive application, and also functions to extend the vane onto the vacuum conveyor 112 in order to extend the vane 54 across the width of the apparatus generally coextensive with the width of the support sheer 52. This extension of the vane 54 transverse across a support sheer 52 is to facilitate further processing of the shade 50 and allow the attachment of the vane 54 to the shade 50 as is described further herein.

The tape transport assembly 98 is shown to the right of the central frame 154 in FIG. 16, and includes the tape supply reel 120, providing tape for the apparatus and the associated process. Generally, the tape is pulled from the supply reel and run through an adhesive application step 122, and then through a vacuum accumulator 124 to help ensure the proper length of tape 82 is available for the next processing step. A shear mechanism 126 is positioned near the central frame 154 and is used to cut the tape 82 at the desired length as part of the lateral transport process. The tape 82 is run through a nip roller (see FIG. 24) positioned near the right central frame 154. The nip roller pulls the tape through the tape transport features, and also functions to help position the tape 82 on the vacuum conveyor 114 to transport the tape 82 laterally across the apparatus 84, generally coextensive with the width of the support sheer 52.

Referring still to FIG. 16 and FIGS. 14 and 15, the operating elements 56 and support sheer 52 flow between the left and right central frame members 154. The support sheer 52 is transported near the top of the central frame on a series of roller assemblies to just prior to the position of lateral insertion point of the vane 54 from the vane transport assembly 96, where the support sheer 52 turns downwardly into the attachment station in the central frame region and is positioned for attachment to the vanes 54 and operating elements 56.

The operating elements 56 are transported at the top of the central frame 154, but below the support sheer 52, also on a series of roller assemblies, to just prior to the lateral insertion point of the tape 82 from the tape transport assembly 98, where it turns downwardly into the central frame region and is positioned for attachment to the tape 82, and subsequently to the vane 54.

Figure 17A:
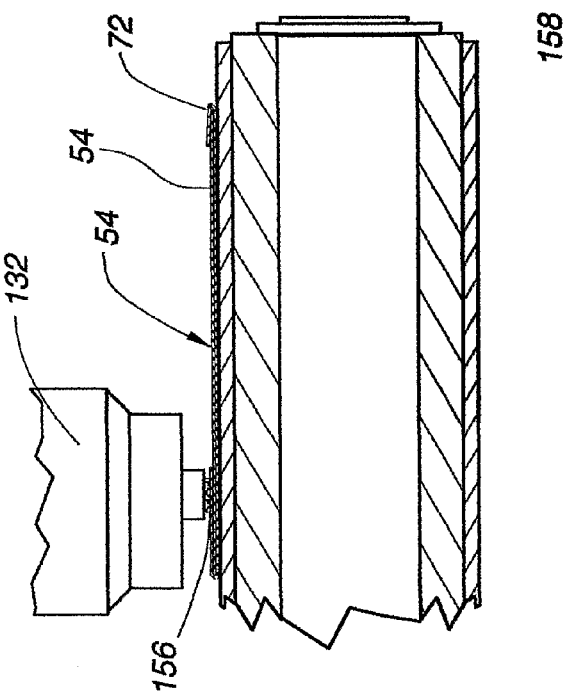
FIG. 17A is a section taken along line 17A-17A of FIG. 16, and shows adhesive being dispensed on the lower tab of a vane.
Figure 17C:
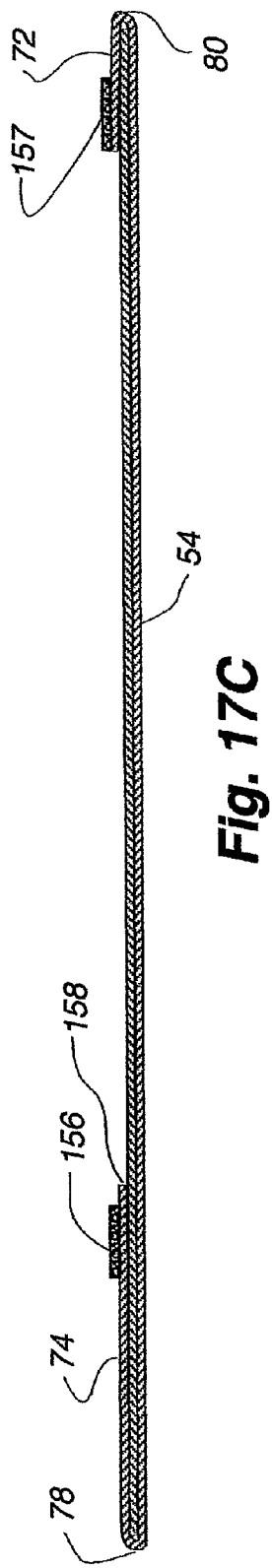
FIG. 17C is a representational cross section of a vane used in the assembly of the retractable shade with collapsible vanes, having adhesive applied to both the upper and lower tab portions.
Figure 17B:
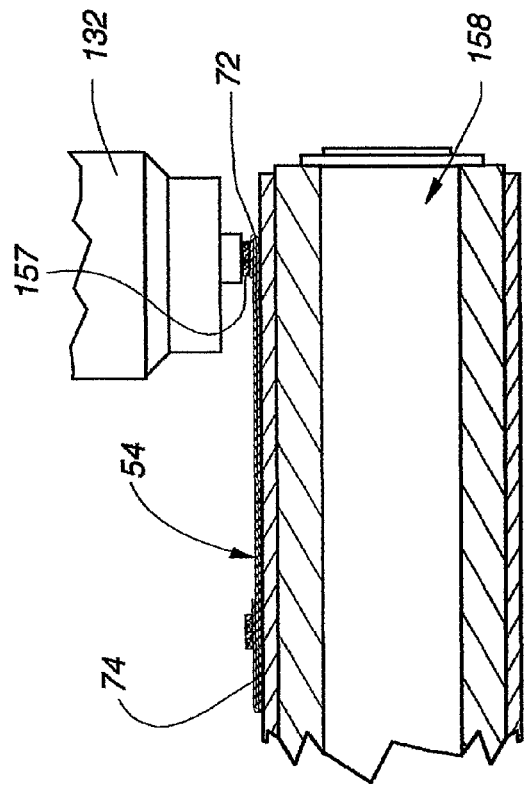
FIG. 17B is a section taken along line 17B-17B of FIG. 16, and shows adhesive being dispensed on the upper tab of a vane.

The operation of the vane transport assembly 96 is shown in FIGS. 17A through 17E. FIG. 17A represents a section taken through the adhesive application station 132 where the adhesive 156 is applied to the bottom tab on the vane. This adhesive is preferably applied in a continuous manner. The adhesive applicator 132 applies the adhesive 156 to the bottom tab 74 as the vane 54 is transported through the adhesive application section over a roller 158. FIG. 17B represents the adhesive application station 134 for applying adhesive 157 to the top tab 72 on the vane 54. The adhesive 157 is preferably applied here continuously also as the vane 54 travels over a roller 158. The end result as shown in FIG. 17C is that the vane 54, which is positioned with the tabs 72, 74 facing upwardly in the vane transport assembly 96, has an application of adhesive 156 positioned on the bottom tab 74, and an application of adhesive 157 positioned on the top tab 72.

It should be noted that in this configuration, the adhesive 156 is applied at a location spaced away from the bottom edge 78, towards the top edge 80, of the vane 54. This positioning of the adhesive allows the lower edge 78 of the vane 54 to overlap the top edge 80 of the adjacent lower vane 54 (see FIG. 1D) when the shade 50 is assembled. As shown in FIG. 17C, the adhesive 156 is positioned closer to the terminal end 158 of the lower tab 74 than it is to the bottom edge 78 of the vane 54.

The adhesive 156, 157 may be applied discontinuously, and can be applied in various cross-sectional shapes, and at various temperatures and viscosity levels, as desired for the particular application. The adhesive 156, 157 may also be applied to different positions on the tabs 74 and 72, respectively, depending on the desired attachment structure and functionality between the vane 54 and the support sheer 52. Various types of adhesive are acceptable, such as hot melt adhesives, urethane, or any adhesive that allows the particular materials to be acceptably bonded together. In one example, the adhesive 157 used on the top tab 72 is EMS Griltex 6E, the adhesive 156 used on the bottom tab 74 is Bostik 4183, hotmelt.

With the adhesive application complete, the vane 54 is fully prepared to be extended laterally across the support sheer 52 for the bonding step at the assembly station 100. Before that lateral extension operation occurs, however, the vane 54 passes through a vacuum accumulator 136 as shown in FIGS. 17D and 17E. The vacuum accumulator 136 stores the appropriate length of vane 54 to allow the adhesive applicators 132, 134 to run continuously, and to keep the vane 54 from becoming loose or too tautly tensioned during the processing. The vacuum accumulator 136 facilitates the extension of the vane 54 across the support sheer 52 to occur accurately and precisely by accumulating the length necessary for the lateral extension step. The vacuum accumulator 136 is basically a chamber having a vacuum pulled below the vane through a vacuum port 160. The vacuum pulls the vane 54 into the vacuum accumulator chamber 136 and helps take up any slack during processing.

For example, the lateral extension of the vane 54 onto the support sheer 52 requires approximately 90 inches of vane 54 to be moved very quickly at precisely indexed periods. This means that after the vane 54 moves through the adhesive application stations 132, 134, it needs to be stored in a manner such that when the next length of the vane is to be laterally extended across the support sheer 52, the vane has been stored in a way that allows the vane to be pulled out of the storage position (i.e., the vacuum accumulator 136) quickly and moved across the support sheer 52 without accelerating the passage of the vane through any earlier step, such as the adhesive application stations 132, 134.

FIG. 17E also shows the sheer mechanism 138 for cutting the vane 54 at the appropriate length and the clamp mechanism 162 (including the advancement cylinder 164) for advancing the free end of the vane 54 onto the vacuum transport system 112 for lateral extension across the support sheer 52. In more detail, as the vane 54 is advanced through the vane transport assembly 96, and after the adhesives 156, 157 have been applied, the vane 54 goes through the vacuum accumulator 136 and through a handling assembly where the clamp mechanism 162 is positioned. The vane 54 passes through the clamp mechanism 162 when the clamp mechanism 162 is in its open position and extends to a nip roller 166 which in conjunction with the vacuum transport 112 (as is described in greater detail below) holds the vane 54 and moves the vane across the width of the support sheer 52. When the appropriate length of the vane 54 has been moved along the vacuum conveyor 112, the shear mechanism 138 is actuated to move downwardly to cut the vane 54. The overhang of the vane 54 off the vacuum conveyor 112 is then moved by the vacuum conveyor to the proper lateral position with respect to the support sheer 52. This aligns the length of the vane 54 with the width of the support sheer 52 for the step of attaching the vane 54 to the sheer and to the operating elements, discussed in greater detail below. Once the length of the vane 54 has been laterally positioned across the support sheer, the free end of the next length of vane is left disengaged from the nip roller 166 and the vacuum conveyor 112.

In order for the free end of the vane 54 to engage the nip roller 166 and the vacuum conveyor 112, the clamp mechanism 162 is actuated to clamp down and secure the vane material, the nip roller 166 is disengaged from the vacuum conveyor 112, and the advancing cylinder 164 is actuated to push the clamp mechanism 162, and thus the free end of the vane 54, past the retracted shear station 138 and engage the vacuum conveyor 112 and the nip roller 166. The nip roller 166 is then moved downwardly to trap the free end against the vacuum conveyor 112 and, along with the vacuum conveyor, to draw the vane 54 out onto the vacuum conveyor. The vacuum conveyor 112 draws a vacuum on the part of the vane 54 overlapping the vacuum conveyor, and in combination with the nip roller 166, pulls the appropriate length of the vane 54 across the width of the support sheer 52. At this point, the process starts over again and the shear mechanism 138 separates the vane 54 from the in-feed vane length and allows the vacuum transport 112 and nip roller 166 to then adjust the proper position of the new section of the vane 54 across the support sheer 52 width.

Once the section of vane 54 is properly positioned across the width of the support sheer 52, the vane section is moved by the nip roller 166 as well as being held by the vacuum of the vacuum conveyor 112. The vacuum conveyor 112 then can control the position of the vane 54 and appropriately move it laterally to align across the width of the support sheer 52 as desired for further processing. The structure and operation of the vacuum conveyor 112 will be described in more detail below. The vane 54 extension across the support sheer 52 width occurs below the support sheer 52 in this particular embodiment, as will be described.

FIGS. 18A through 18D show the operation of the tape transport assembly 98. The tape transport assembly 98 pulls the tape 82 off the supply roll 120 and through an adhesive application station 122. The adhesive 168 is applied to the tape 82 similar to the application of adhesives 156 and 157 to the vane 54. The adhesive 168 is applied continuously, although it may be applied noncontinuously, as desired. The adhesive 168 may be applied having a variety of material characteristics, such as higher or lower viscosity, with various different cross sections as necessary for a particular application. One example of an adhesive suitable for use on the tape 82 is National Starch PUR 7799.

FIG. 18B shows the adhesive 168 once applied to the tape 82. In the operation of the tape transport assembly 98 after the application of the adhesive 168, the tape 82 passes over a cooling cylinder in order to properly condition the adhesive 168 for the next processing steps. Since in the particular embodiment described herein the adhesive 168 is applied to the underside of the tape 82, the tape is preferably twisted to have the adhesive face upwardly and away from the cooling roller as it passes over the cooling roller, and then untwisted so the adhesive continues to extend downwardly from the tape for the balance of the processing. The tape may be a nonwoven, woven, plastic or other suitable material.

Figure 18D:
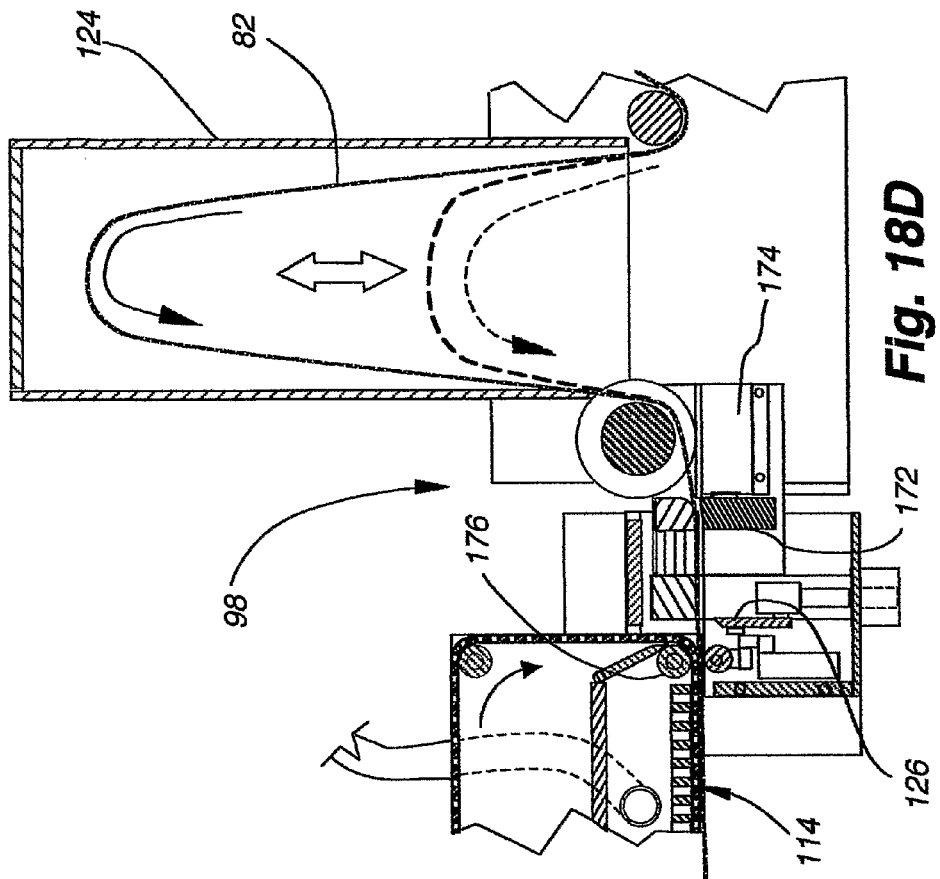
FIG. 18D is a section taken along the line 18D-18D of FIG. 18C.
Figure 18C:
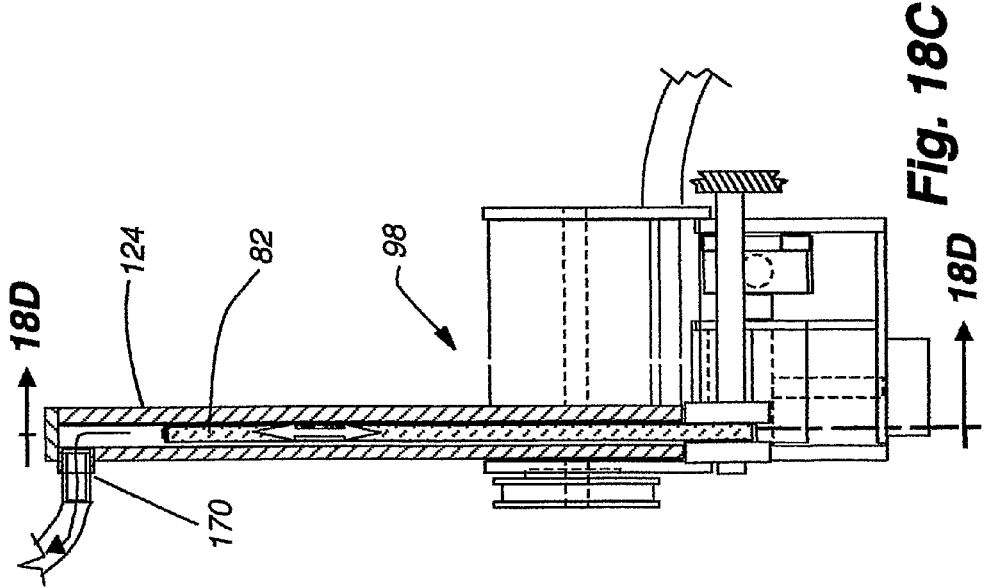
FIG. 18C is a section view taken through line 18C-18C of FIG. 16.

A vacuum accumulator 124 is used in the tape transport assembly 98 similarly to the vane transport assembly 96. As with the vane processing, a length of tape 82 is extended across the width of the support sheer 52 during processing, and thus the tape 82 must be stored up in a way where sufficient length is available for extending across the operating elements while allowing the adhesive application to run continuously (if desired). The use of the vacuum accumulator 124 for the tape 82 solves this problem, as it does for the vane 54. The vacuum accumulator 124 is shown in FIGS. 18C and 18D. The vacuum port 170 draws a vacuum in the vacuum chamber, which in turn draws the tape 82 into the vacuum chamber in order to store the necessary length of tape. A sufficient length of tape is drawn into the vacuum accumulator 124 in order to allow for continuous application of the adhesive and the indexed application of the tape 82 into the apparatus 84 across the width of the operating elements 56, similar to the vane transport assembly 96. The width of the vacuum chamber 124 is the same as or slightly greater than the width of the tape 82.

As with the vane transport assembly 96, the tape transport assembly 98 also includes a shear mechanism 126, along with a clamp mechanism 172 and advancement cylinder mechanism 174 in order to allow the free end of the tape, once sheared, to be extended to the nip roller 176 and onto the vacuum conveyor 114 for the tape. As shown in FIG. 18D, the clamp mechanism 172 and the advancement cylinder 174 are upstream of the shear mechanism 126, so that when the shear mechanism cuts the tape 82 and the section of tape is advanced on the vacuum conveyor 124, the newly formed free end of the tape can be advanced towards the nip roller 176 and for a length onto the vacuum conveyor 114 for pulling the next section of the tape 82 across the operating elements 56. After the shearing occurs and the section of the tape 82 is advanced across the operating elements 56 on the vacuum conveyor 114, the newly formed free end of the tape is advanced to the nip roller 176 and vacuum conveyor 114 in the same manner as described above with the vane transport assembly 96.

FIG. 19 is a section through the length of the apparatus 84 and shows the supply roller 116 for the support sheer 52, the supply spools 108 for the operational elements 56, the cross section of each of the vacuum conveyors 112, 114 for both the tape 82 and the vane 54, the melt bar 128 for attaching the operating elements 56 to the tape 82, as well as the melt bars 140, 142 for the assembly process 100 in the final assembly of the vane 54 to the support sheer 52. Also shown in FIG. 19 is the pair of nip rollers 110 that pull the support sheer 52 and operating elements 56 through the apparatus 84, as well as the take-up reel 104 for the assembled shade 50 once it is finished going through the apparatus 84.

FIG. 19, similar to FIG. 15, shows the respective flow paths for the support sheer 52 as well as the operating elements 56. The central frame structure 154 supports the apparatus and the necessary roller guides for performing the process defined herein. The support sheer 52 travels in a line along its longitudinal dimension, and the operating elements 56 travel concurrently with the support sheer 52. In FIG. 19, the flow of the support sheer 52 as well as the operating elements 56 is from right to left along the length of the central frame structure 154.

The central frame structure 154 is divided into three general sections: source section 178 where the support sheer 52 as well as the operating element materials 56 are stored and drawn from their storage units; an operating section 180 where the support sheer 52 as well as the operating elements 56, the vanes 54 and tape 82 are all assembled together; and then the retrieval section 182 where the assembled shade 54 is received on roller 104. The source section 178 of the central frame 154 of the apparatus 84 is shown on the right in FIG. 19. The source roll 116 of the support sheer 52 is shown attached to the frame 154 and supplies the support sheer 52 into the apparatus 84, as will be described hereinafter. The rack of spools 108 supplying the plurality of operating elements 56 is shown also operably associated with the central frame 154 structure and also in the source section 178 of the central frame structure. As the support sheer 52 and the operating elements 56 wind their way along the central frame structure 154, they both pass from the source section 178 of the central frame to the operating section 180 of the central frame where the operating elements 56 pass through a portion of the tape transport assembly 98 where the tape 82 is attached to the operating elements 56. The vacuum conveyor 114 as well as the melt bar 128 used for attaching the tape 82 to the operating elements 56 are movably associated with the central frame structure 154 to allow for adjustment relative to the tape 82.

Downstream from where the tape 82 is attached to the operating elements 56 is the assembly station 100. At the assembly station 100, the vane 54 is transported laterally across the width of the support sheer 52 by the vacuum conveyor portion 112 of the vane transport assembly 96. The pair of melt bars 140, 142 are positioned in the assembly station 100 for use in the final assembly step. Downstream of the assembly station 100 a nip roller 110 is used to draw the support sheer 52 and operating elements 56 through the apparatus 84 from their respective source structures, through the tape handling assembly 98, through the assembly station 100 and into the third section 182 of the central frame structure, the take-up roller 104. The take-up roller 104 is driven by its own motor to facilitate the take-up of the assembled shade 50.

As shown in FIG. 19, the support sheer 52 extends from the source roll 116 upwardly to the top of the central frame structure 154 and across through a selection of rollers and is inserted into the process flow just upstream of the assembly station 100. The operating elements 56 are drawn from their plurality of source spools 108 upwardly to the top of the central frame structure 154, but below the support sheer 52, and over an assortment of rollers and spacing mechanisms 118 as described later, and is inserted into the process flow just prior to the position of the melt bar 128 used to attach the operating elements 56 to the tape 82. After the tape 82 and operating elements 56 are attached together, the combination of the tape 82 and operating elements 56 is advanced along the process flow to the assembly station 100, where the vane 54 is transported across the width of the support sheer 52, and the tape 82 attached to the operating elements 56 is aligned with the lower tab 74 of the vane 54, and the combination of the support sheer 52, vane 54, and operating elements 56 attached with the tape 82 are assembled together by use of the melt bars 140, 142.

In the apparatus 84, the operating elements 56 in combination with the tape 82 are guided between the vane 54 which is positioned below the operating elements 56 with the tabs 72, 74 facing upwardly, and the support sheer 52 which is positioned above the operating elements 56. This configuration is shown in greater detail below. In using the melt bars 140, 142 at the assembly station 100, this sandwich of materials is secured together to form the operable shade 50 assembly shown in FIGS. 1A through 1E.

Figure 20:
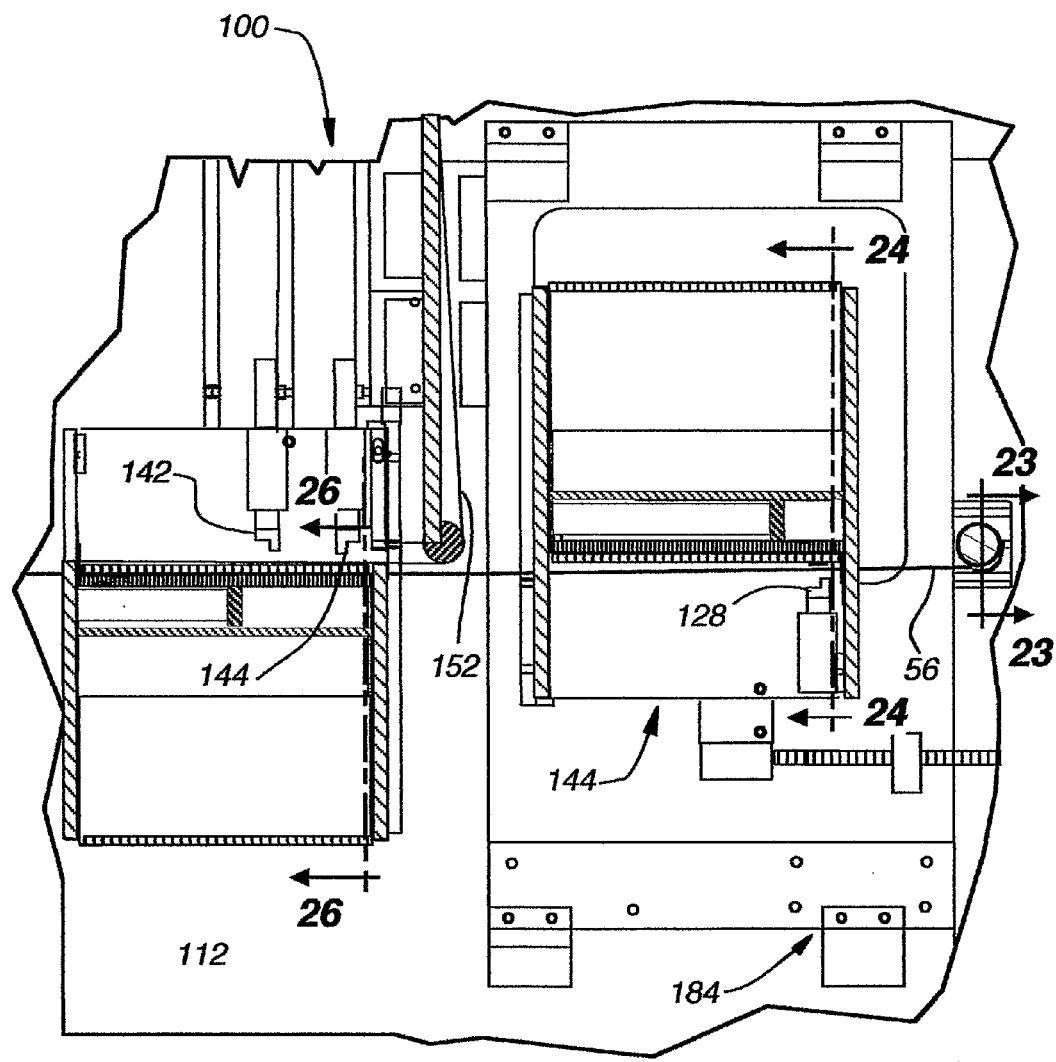
FIG. 20 is an enlarged view of the central portion of FIG. 19, including the vacuum conveyor system for the tape handling assembly and the vacuum conveyor system for the vane handling assembly.

FIG. 20 shows close-up detail of both the tape vacuum conveyor 114 as well as the assembly station 100. At the tape station, which includes the tape conveyor transport 114 and the melt bar 128 for attaching the operating elements 56 to the tape 82, the tape 82 is adhered to the vacuum conveyor 114 via vacuum force for transport across the sheer material and is attached to the operating elements 56 using the melt bar 128. The combination of the operating elements 56 and the tape 82 then advance to the assembly station 100 where the vane 54 is laterally inserted from the vane transport assembly 96 on the vacuum conveyor 112 below the combination of operating element 56 and tape 82, and the support sheer 52 is guided through the assembly station 100 above the combination of the operating elements 56 and tape 82 to form a sandwich of these materials. The activation of the dual melt bars 140, 142 attaches the top 72 and bottom 74 tabs of the vane 54, the operating elements 56, the tape 82 and the support sheer 52 together as described in detail below. After the assembly step in the assembly station 100, the assembled shade product 50 exits the assembly station 100 and is wound up on the receiving roll 104 as described above.

An alignment mechanism 184 for aligning the vacuum advance conveyor 112 for the tape transport assembly 98 is also shown in FIG. 20. The adjustment mechanism 184 is a lead screw type structure that allows the vacuum advance conveyor 114 to be moved relative to the central frame 154 of the apparatus 84 (along the length of the flow of the support shear 52) in order to ensure that the vacuum belt is adequately positioned to apply sufficient suction to the thin tape 82 to be able to advance it across the width of the support sheer 52 as needed. Any type of significant misalignment would cause the tape to not adhere to the vacuum conveyor, and thus not advance appropriately.

Figure 21:
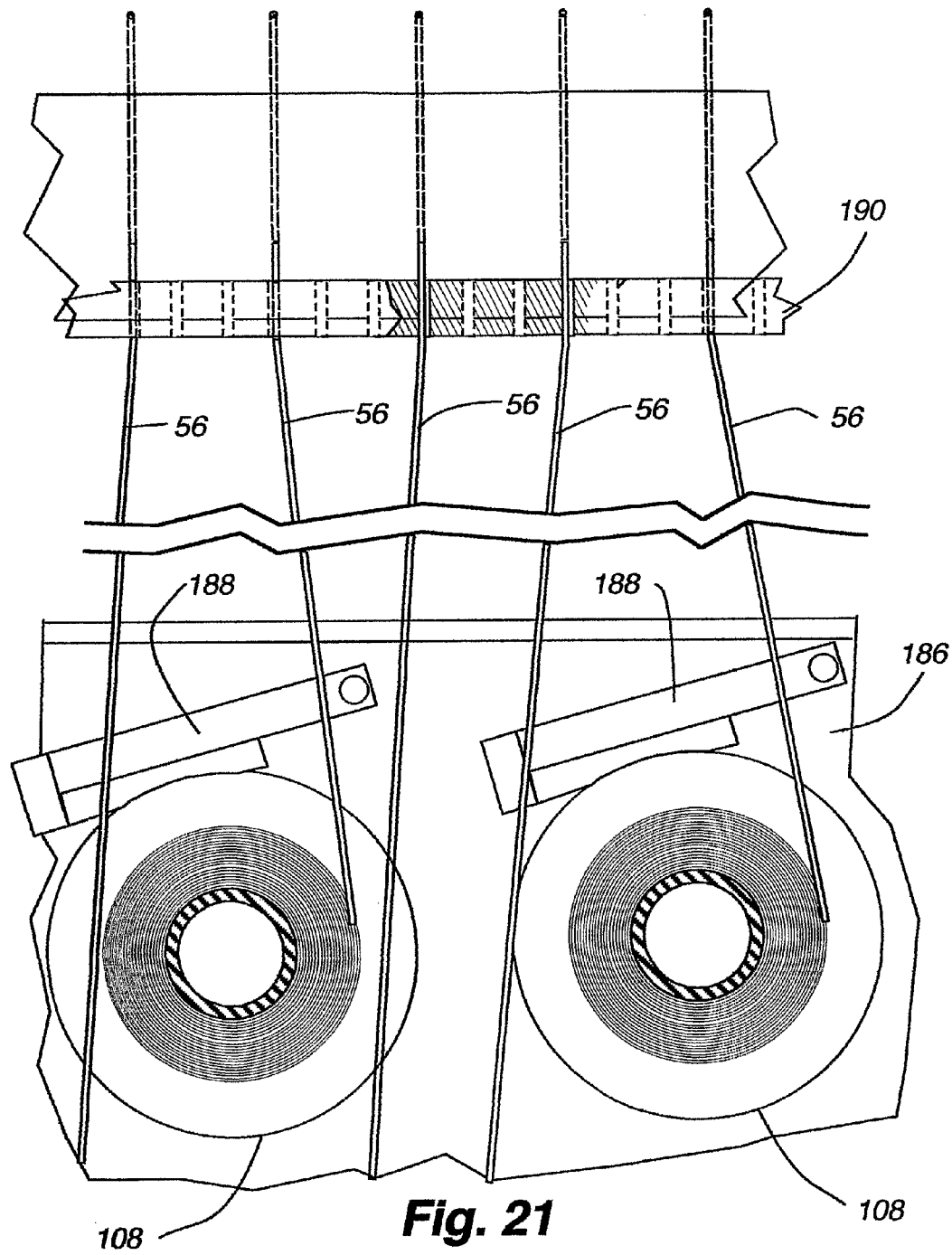
FIG. 21 is a section taken along line 21-21 of FIG. 19.
Figure 22:
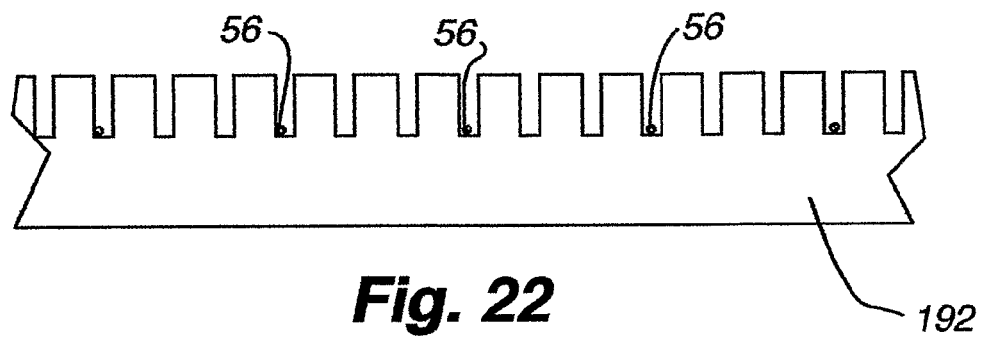
FIG. 22 is a section taken along line 22-22 of FIG. 19.

The operating element transport assembly 96 is shown best in FIGS. 19, 21, 22 and 23. FIGS. 19 and 21 show the spools 108 from which the operating elements 56 are drawn during processing. A plurality of such spools 108 are attached to a panel 186 with the operating elements 56, in this case monofilament line, extending upwardly to an initial comb structure 190 (generally 118) for creating the desired spacing between the monofilament lines. FIG. 21 shows each spool 108 having a tensioner structure 188 associated with it to help ensure that the monofilament line is properly tensioned through the processing and does not become inappropriately loose or tight during the process. In the instant embodiment, the tensioners 188 are weighted bars that lay against the spool 108 rim to create a frictional resistance to the movement of the spool and unwinding of the operating elements 56. The greater the weight, the greater the drag, and the greater the tension. The weighted bars are pivotally attached to the panel 186. Other types of tensioners would suffice.

Figure 23:
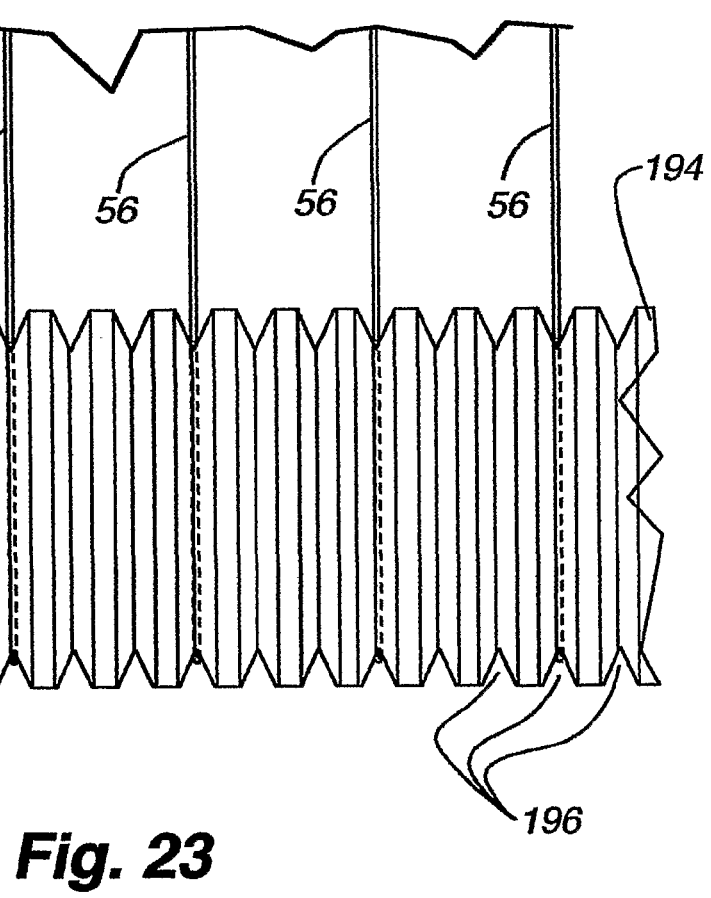
FIG. 23 is a section taken along line 23-23 of FIG. 20.

As the monofilament line extends from each individual spool 108, the monofilament line passes through a first comb mechanism 190 (FIG. 21, or 118 in FIG. 19) which sets the initial spacing for the attachment of the monofilament to the tape 82. The spacing of the monofilament lines through the first comb element 190 does not have to match the ultimate spacing, but primarily is required to keep the monofilament lines in an organized order for the next comb structure 192 through which it passes, shown in FIG. 22. The spacing of the operating elements can vary from product to product made on the instant apparatus and using the described process, and thus the combs have a variety of spacing grooves available. Separate replaceable spacing comb structures can be used also. After passing through the secondary spacing comb 192, the operating elements 56 pass around an adjustable tensioning pulley to help maintain adequate tension in the system and finally pass through the final spacing tool 194, as shown in FIG. 23, before turning right angles and extending into the apparatus 84 for attachment of the operating elements 56 to the tape 82. The final spacing tool 194 as shown is a cylinder having a series of parallel grooves 196 formed circumferentially around the cylinder, with the bottom of each groove forming a relative V-shape for accurate positioning of the operating elements 56. Again, more than one spacing of operating elements can be obtained for different products, so the final spacing tool 194 has a plurality of differently spaced grooves 196 on it to handle the variety of product types. Alternatively, a spacing cylinder having only one groove for each operating element can be employed. It is contemplated that only one spacing comb or roller may be used. After passing over the final spacing roller 194, the operating elements 56 are attached to the tape 82 at longitudinally spaced intervals as described herein.

Figure 24:
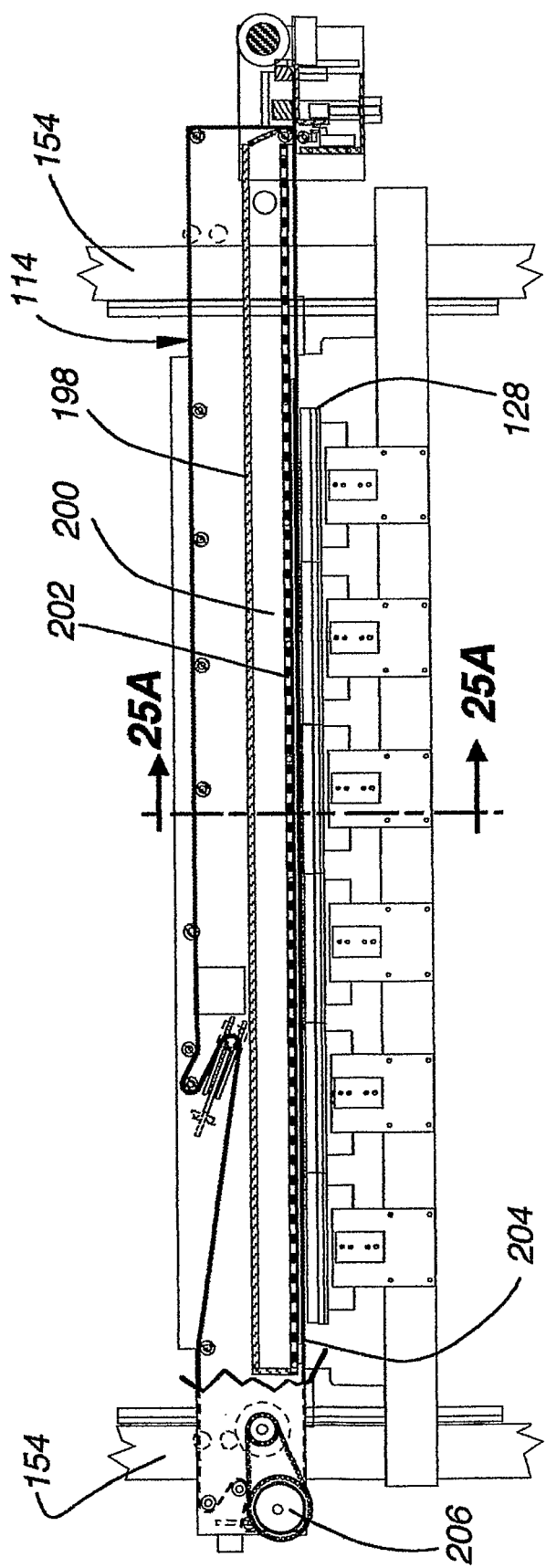
FIG. 24 is a section taken along line 24-24 of FIG. 20.

FIG. 24 shows a section through the vacuum conveyor system 114 used to advance the tape 82 across the width of the support sheer 52, and the melt bar 128 used to attach the tape 82 to the operating elements 56. The vacuum conveyor system 114 is oriented upside down in this instance because the tape 82 has the adhesive 168 positioned on its downwardly facing surface in this apparatus configuration. It is anticipated that the vacuum conveyor system 114 can be oriented in any direction as necessary for handling the tape 82 for any particular design. The vacuum conveyor system 114 includes a housing 198 forming the vacuum chamber 200. The housing 198 has a lower surface 202 which is perforated to allow the vacuum drawn into the vacuum chamber 200 to apply on the vacuum carry belt 204. The vacuum carry belt 204 travels over the perforated surface 202 of the vacuum chamber 200, and itself has apertures formed therein for allowing the vacuum drawn in the vacuum chamber 200 to be applied through the belt 204 to the tape 82. The belt 204 passes over various pulleys and rollers in order to form a continuous loop for use in advancing the carry belt over the vacuum chamber. The carry belt 204 is driven by a drive wheel 206 attached in turn to a motor, and the carry belt also has a tensioning wheel to help ensure that the tension of the belt can be adjusted as necessary for changes or improvements in the process, or for maintenance.

Below the vacuum conveyor 114 (again, in this configuration) is the melt bar 128. The melt bar 128 is used to activate the adhesive on the tape 82, using heat and/or pressure, in order to secure the operating elements 56 to the tape 82. The melt bar 128 is shown as a plurality of shorter segments. This is done to help ensure proper heat levels on each of the individual melt bars. However, it is contemplated that the melt bar can be one long and continuous member, or can be made up of several shorter members, as desired. The melt bar can have a continuous top edge, or a serrated top edge. The key is that the melt bar contact or activate the adhesive 168 at or adjacent to the operating elements 56 to attach the tape 82 to the operating elements 56.

Once the adhesive has been applied to the tape 82 at the adhesive station 122 on the tape transport assembly 198, a length of the tape 82 having adhesive 168 applied to it is advanced into the apparatus 84 and across generally the width of the support sheer 52 by use of the vacuum belt conveyor 114. As shown in FIG. 24, the vacuum belt conveyor 114 pulls the tape 82 from right to left along the vacuum belt conveyor 114. When the correct length of tape 82 has been pulled along the conveyor 114, the shear mechanism 126 is actuated to cut the tape 82, and then the vacuum belt conveyor is advanced again to pull the tape 82 fully into position (i.e., into proper lateral alignment with the width of the support sheer 52).

The vacuum chamber 200 has an evacuation door 208 which allows the vacuum to be quickly dissipated in order to allow the tape 82 and attached operating elements 56 to move through the apparatus 84 to the next position. The melt bar 128 is typically an electrical heater bar, with the heat being created by resistive heating techniques, as is well-known in the art. The melt bar 128 may also be used as a pressure source for pressure activated adhesives. The vacuum conveyor assembly 114 for the tape 82 is mounted on the lead screw adjustment mechanism, as mentioned above, which is in turn attached to the frame 154 to allow the vacuum conveyor 114 to be moved longitudinally with respect to the support sheer 52 and relative to the frame 154 to ensure that the tape 82 lines up with holes in the carry belt 204 and/or as well as holes in the vacuum chamber perforated wall 202 to ensure that the tape 82 is adequately adhered to the carry belt by the vacuum pressure in the vacuum chamber. If the tape 82 is misaligned with the vacuum force to any great extent, it will not advance with the carry belt, as is needed to advance the tape along the length of the carry belt.

FIG. 25A shows a section through the vacuum conveyor system and melt bar 128, and shows the vacuum chamber 200, the vacuum port 170, and the perforated carry belt 204. The perforated carry belt is positioned below the perforated wall of the vacuum chamber and a section of tape 82 having adhesive 168 on its lower face is shown drawn to the vacuum chamber 200 through the carry belt 204 and the perforated plate 202 due to the vacuum pressure within the vacuum chamber. The operating element 56, in this case monofilament line, is shown extending transversely to the tape length (which is also longitudinal with the length of the support sheer 52), with the melt bar 128 positioned below the operating elements 56.

FIG. 25B shows the melt bar 128 in engagement with the operating element 56 and the tape 82 in order to secure the operating element 56 to the tape 82. The melt bar 128 is mounted on a platform 210 and moves up and down as directed by the controlling automation system 102 to adhere the operating elements 56 with the tape 82 at the appropriate time. The electric resistive heater element 212 is shown in the melt bar 128 in both FIGS. 25A and 25B. The spacing of the adjacent tape 82 sections attached to the operating elements 56 as shown in FIG. 25B is designed to be the distance between the lower tab 74 of each adjacent vane 54. This distance may be greater or smaller depending on the width of the vane 54 and the overlap desired with the next lower adjacent vane 54 when in the closed position as described above. As noted above, the heater bar may only apply pressure without heat, or may apply pressure and a cooling temperature.

FIGS. 25C, 25D and 25E show this process in greater detail. The perforated wall 202 of the vacuum chamber 200 as well as the perforated carry belt 204 are shown in FIGS. 25C and 25E, with the tape 82 drawn and adhered to the carry belt 204 by virtue of the vacuum applied through the vacuum chamber. In FIG. 25C the melt bar 128 is not engaging the operating element 56 or the tape 82. In FIG. 25D, a perspective view is shown similar to FIG. 25C to better show the alignment of the tape 82 with respect to vacuum apertures in the carry belt 204, in addition to showing the linear melt bar 128 positioned directly in line with the length of the tape 82 for complete adhesion of the tape 82 to the operating elements 56. FIG. 25E shows the melt bar 128 in contact with the operating elements 56 and the adhesive 168 in order to cause the adhesive and operating elements 56 and tape 82 to engage one another. FIG. 25F is a perspective representation of the cross section shown in FIG. 25E to show the longitudinal alignment of the melt bar 128 with the extension of the adhesive 168 and the tape 82 when in contact therewith. FIG. 25G shows the tape 82 attached with the adhesive 168 to adjacent lengths of operating elements 56 as occurs after this attaching process is performed. In summary, the melt bar 128 is used to attach the tape 82 to each of the one or more operating elements 56. The tape 82 is attached at right angles to the operating elements 56, but could be attached at an angle, depending on the design of the product. The distance between the two adjacent lengths of tape 82 again vary based on the desired distance between the two attached lower ends 78 of the vanes 54 on the support sheer 52.

Figure 26:
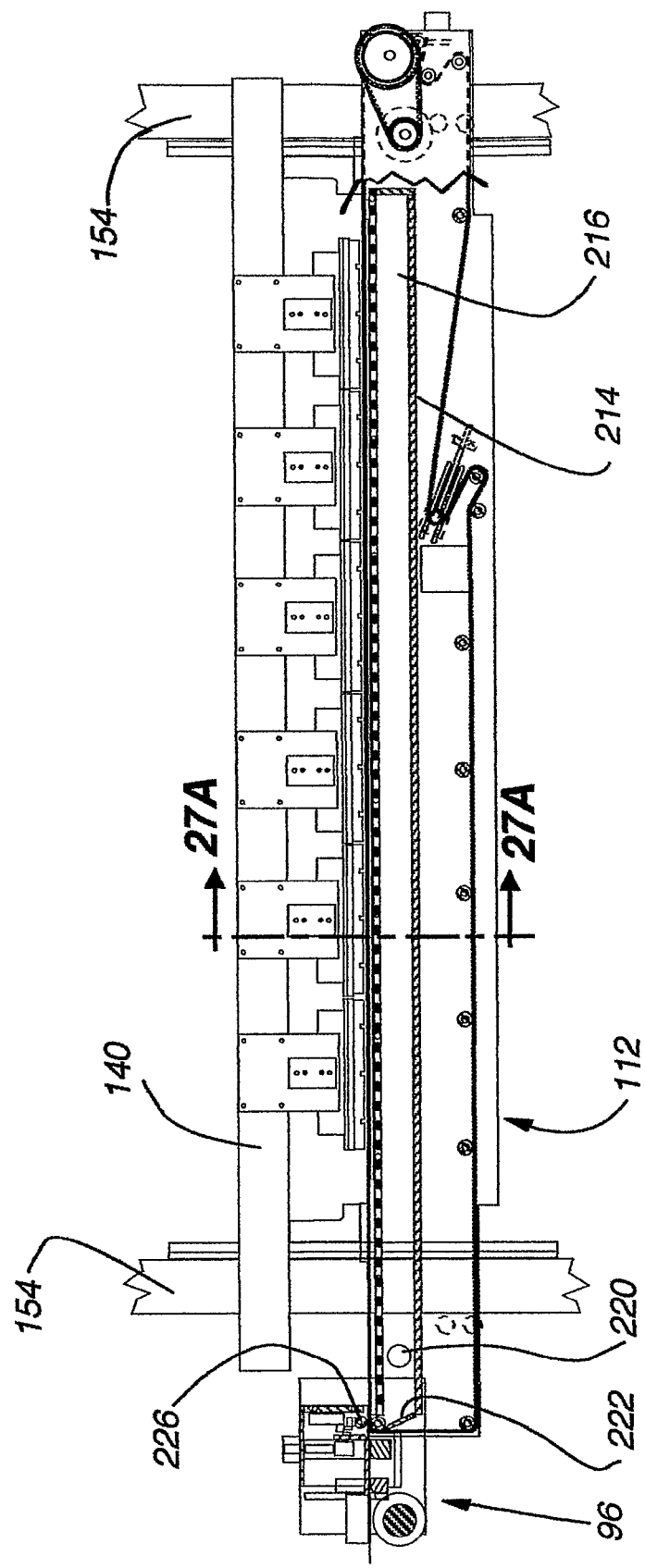
FIG. 26 is a section taken from line 26-26 of FIG. 20.

FIGS. 26 and 27A through 27J show various cross sections through the vane transport assembly 96, as well as the assembly station 100. In particular, FIG. 26 shows a cross section through the vacuum advance conveyor 112 used for the vanes 54, the melt bars 140, 142 used for the attachment of the vane 54 to the support sheer 52 as well as the attachment of the tape 82 to the vane 54. Similarly to the vacuum advance conveyor 112 in the tape transport assembly 98, it is formed by a housing 214 defining a vacuum chamber 216. The upper surface 218 of the vacuum housing 214 is perforated. A port 220 is formed in the side of the vacuum housing 214 in order to allow the evacuation of air from the vacuum housing to create the vacuum.

One wall of the vacuum chamber 216 is a door 222 used to break the vacuum quickly and to allow the support sheer 52 to be advanced to the next position. This allows the vacuum to be turned on and off quickly to allow the advancement of the support sheer with the attached vane 54 and operating elements 56. A carry belt 224 extends along the perforated upper wall 218 of the vacuum chamber 216, the carry belt 224 being perforated itself in order to allow the application of the vacuum from within the vacuum chamber 216 to whatever is on the carry belt 224, in this case the vane 54. The carry belt 224 is driven by a drive roller 226, and also includes a tensioner roller in order to adjust and ensure that adequate tension is applied to the carry belt. The shear mechanism 138, clamp mechanism 162 and advance cylinder 164 are shown at the left end of the vacuum conveyor 112, and were described above with respect to the vane transport assembly 96. The melt bar 140 as shown in this configuration is formed of a plurality of shorter melt bars. The melt bar 140 may be one continuous melt bar or may be a plurality of shorter melt bars as shown. Electric conductive heating is utilized to heat each melt bar although other means of heating or cooling the melt bars are contemplated as dictated by the type of adhesive used. The melt bars may be used for applying pressure only, with no heating or cooling characteristics employed. The melt bar selectively moves up and down with respect to the top surface of the conveyor system 112 to contact the sandwiched materials passing therebetween. The three materials used in forming the shade of the present invention pass between the melt bars 140, 142 (not shown) and the carry belt 224, best seen in FIG. 27A. The support sheer 52 passes closest to the melt bars 140, 142, then the tape 82, the operating element 56, and the vane 54 on the bottom. The tape 82 is only under one (142) of the two melt bars, as there is a second melt bar 140, as is shown in FIG. 27A, and described in more detail below.

Figure 27A:
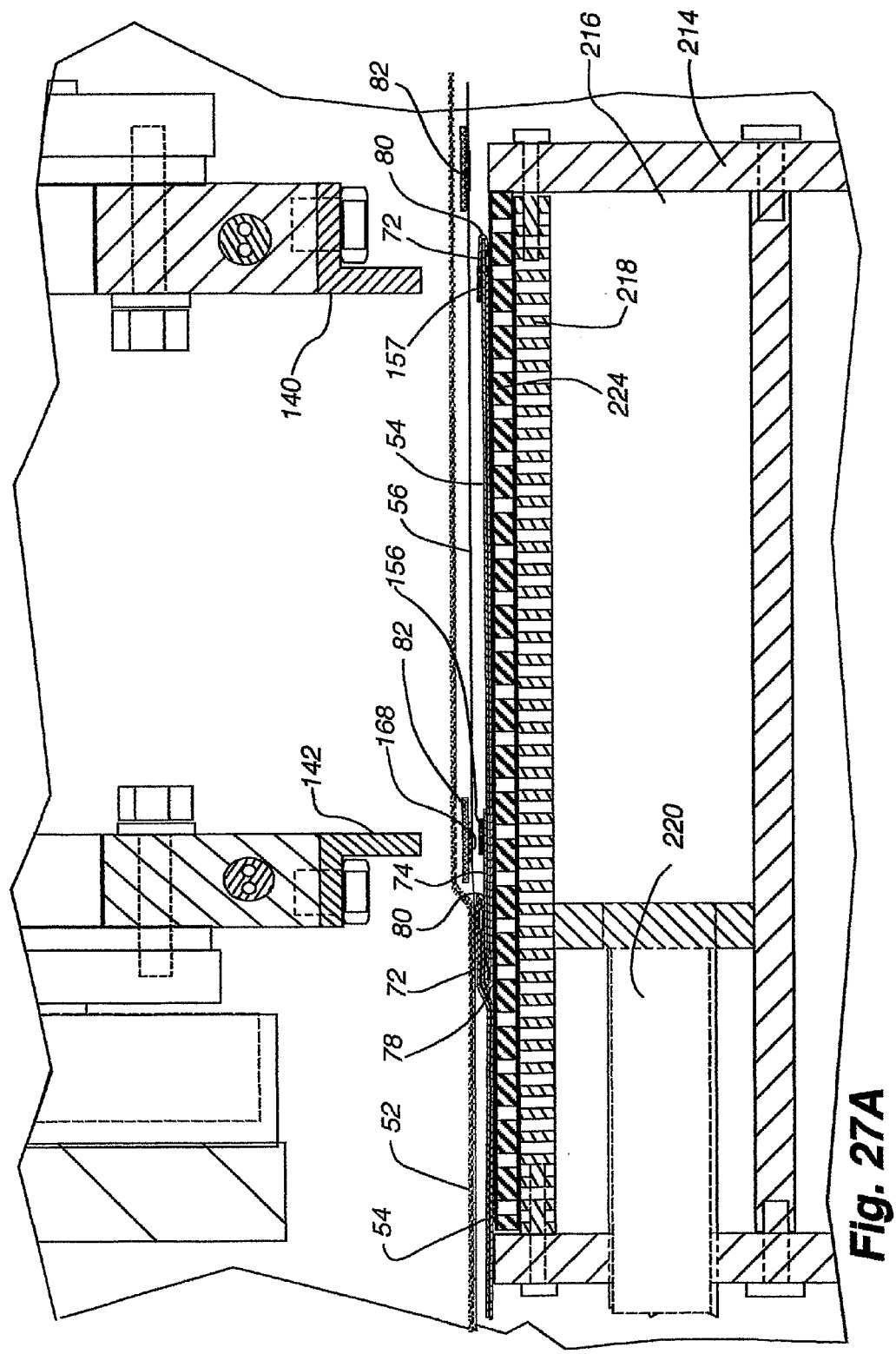
FIG. 27A is a section taken along line 27A-27A of FIG. 26.

As shown in FIG. 27A, between the front or first melt bar 140 and the carry belt 224 is the support sheer 52, the operating element 56, and the top tab 72 of the vane 54. Between the rear or second melt bar 142 and the carry belt 224 is the support sheer 52, the tape 82, the operating element 56, and the bottom tab 74 of the vane 54. The two melt bars 140, 142 are spaced with respect to one another to be precisely the same distance as between the top tab 72 and the bottom tab 74 of the vane, and more precisely between the top adhesive line 157 and the bottom adhesive line 156 of the vane 54.

As described above, the vane 54 is pulled across the width of the support sheer 52 by the vacuum conveyor 112. Generally, a portion of a free end of the vane 54 is attached by a vacuum to the vacuum conveyor and also passes through the nip rollers 166 near the shear mechanism 138. To draw the vane 54 across the width of the support sheer 52, the carry belt 224 advances to the right as configured in FIG. 26 until the proper length of vane 54 has been drawn by the vacuum conveyor 112, as measured from the shear mechanism 138. The shear mechanism 138 then cuts the vane 54 and the carry belt 224 advances to pull the vane 82 entirely within the apparatus 84 and align from lateral edge to lateral edge to the support sheer 52, and generally from end to end of the melt bars 140, 142.

After the melt bars 140, 142 have been actuated to attach the sheer 52, tape 82, operating elements 56 and vane 54 together, which will be described in more detail below, the free end of the next length of vane is advanced by the clamp mechanism 162 and advancement cylinder 164 to engage the nip roller 166 and be pushed onto the vacuum advance conveyor 112, which in turn will adhere to the vane 54 by its vacuum, and pull the next length of vane 54 out to repeat the process just described.

FIG. 27A shows both melt bars 140, 142 and the meeting of materials after passing over and along the vacuum conveyor 112. The vacuum chamber 216 positioned at the bottom of FIG. 27A shows the vacuum chamber spanning approximately the width of the vane 54 and encompassing both melt bar positions. The vacuum conveyor 112, however, only need be as wide as necessary to adequately hold the vane for movement. Just prior to passing underneath the melt bar positions, all of the materials used to form the shade 50 of the present invention are brought together in the apparatus, as described above. The materials travel at the same speed so that they are properly aligned and the movement of these materials is indexed so that they are stopped at a proper position below, or adjacent, both melt bars 140, 142. Melt bar 140 attaches the top tab 72 of the vane 54 to the support sheer 52 while not attaching the operating elements to the vane or the sheer, and melt bar 142 attaches the tape 82, and the operating elements to the bottom tab 74 of the vane 54, but not the tape 82 to the support sheer 52. In FIG. 27A all the materials are in position for the actuation of the melt bars 140, 142 to make the aforementioned attachments. The bottom edge 78 of the vane 54 overlaps the top edge 80 of the lower adjacent vane 54.

Figure 27B:
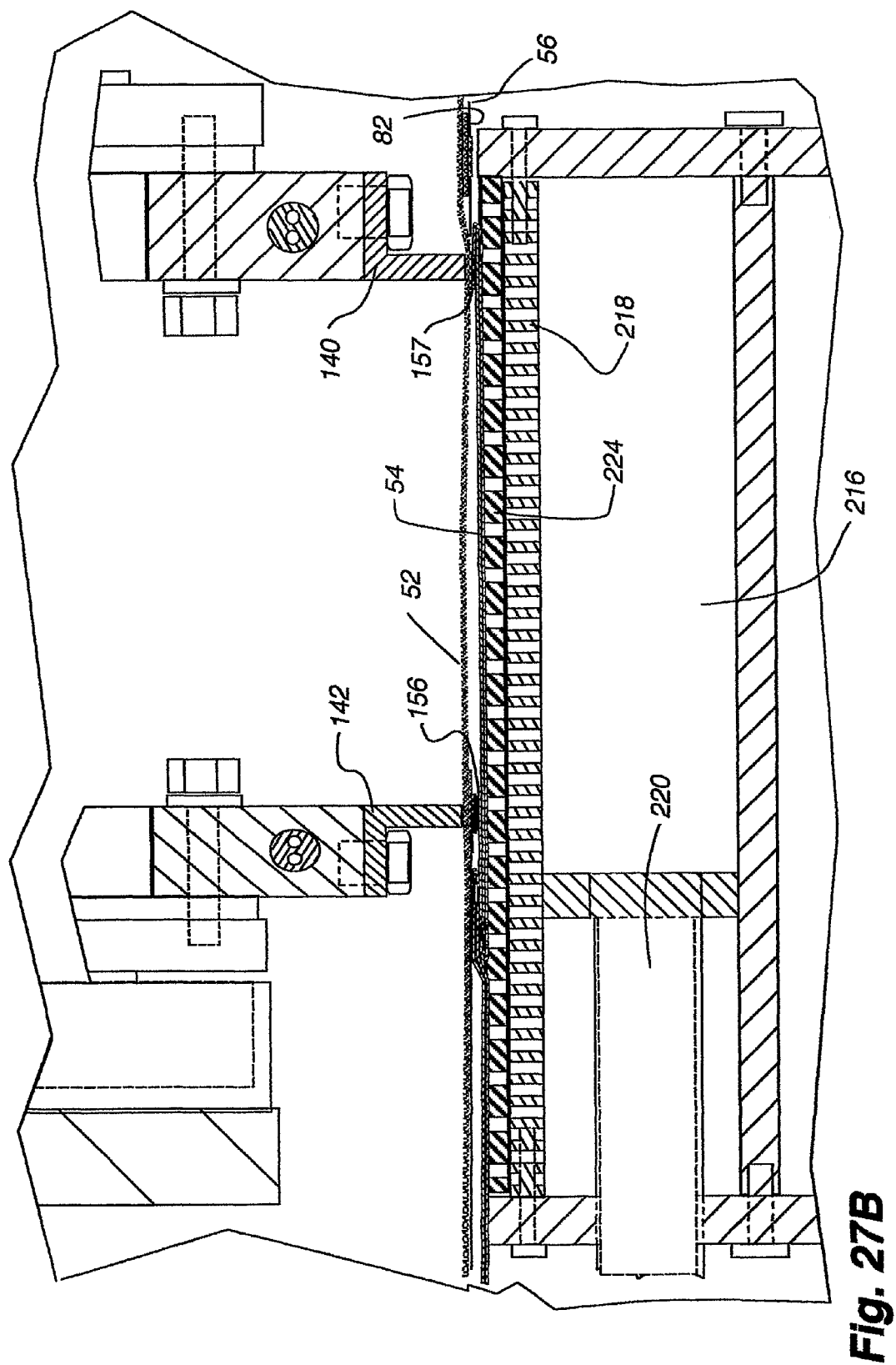
FIG. 27B is similar to FIG. 27A, but showing the melt bars in engagement with the vane during the final assembly step.
Figure 27D:
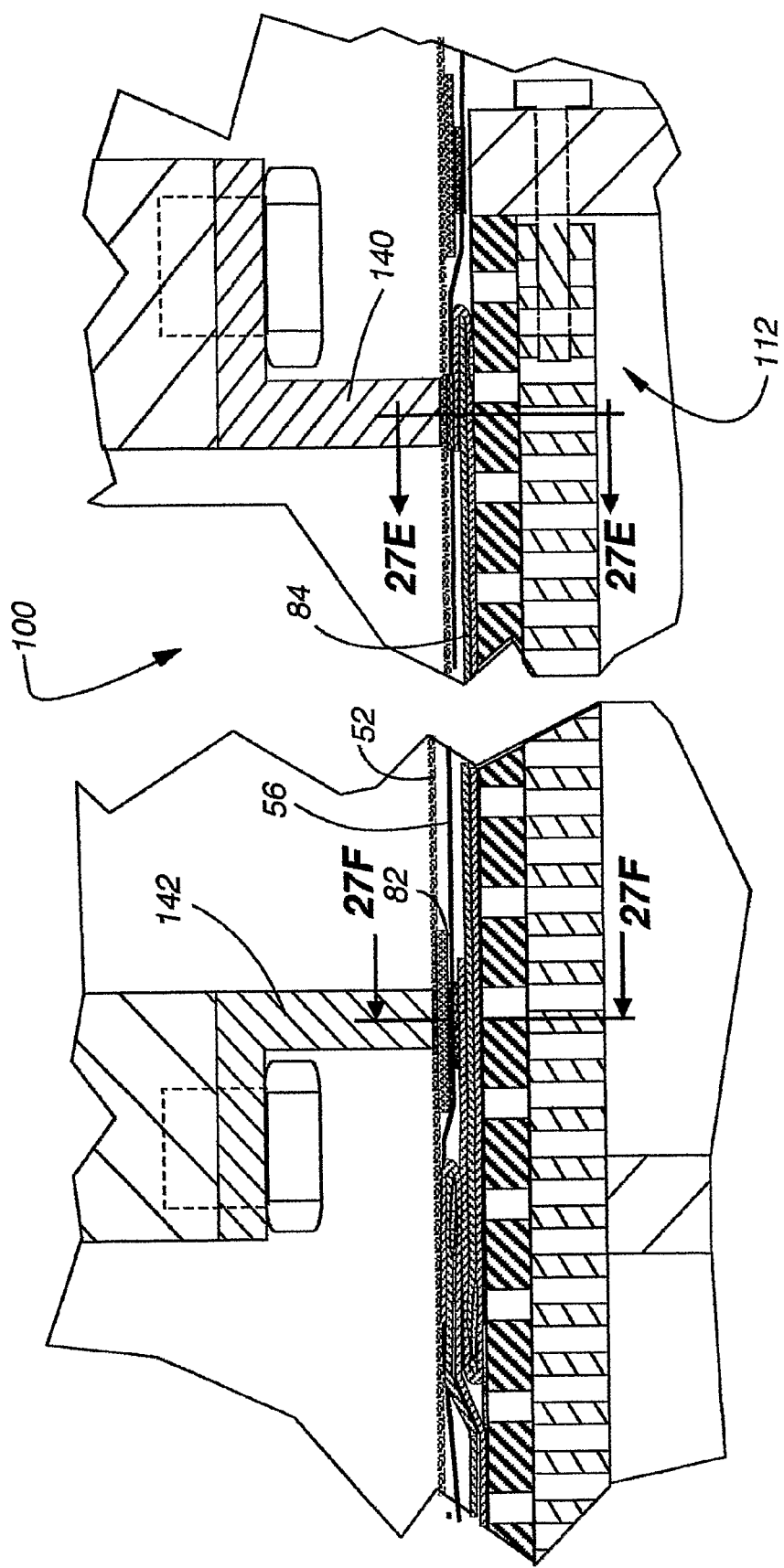
FIG. 27D is a partial enlarged view of FIG. 27B.

FIG. 27B shows the melt bars 140, 142 in actuation during the attachment process. Melt bar 140 attaches the top tab 72 of each vane 54 to the support sheer 52 with gaps in the melt bar 140 positioned over each of the operating elements 56 to allow the operating elements 56 to be able to move relative to the sheer and the vane through those gaps. Melt bar 142 attaches the tape 82 to the bottom tab 74 of that particular vane 54 to effectively attach the operating elements 56 to the bottom of each vane 54. The tape 82 is impervious to the adhesive, and therefore, keeps the tape 82 from being adhered to the support sheer 52. As best shown in FIG. 14, at the time the attachment operation takes place, the two optional clamps 144 are actuated to hold the support sheer 52 in a stable position and keep it from unnecessarily and undesirably advancing prematurely. FIGS. 27C and 27D are close-ups of the section shown in FIGS. 27A and 27B, respectively. FIG. 27C shows the assembly station 100 and the position of the sandwiched materials prior to the final attachment process using the two melt bars 140, 142. The support sheer 52 is closest to the melt bars 140, 142 with the combination of the tape 82 attached to the operating elements 56 just underneath the support sheer 52. The tape 82 attached to the operating elements 56 is only suspended under one of the melt bars 142 (in this orientation the left melt bar shown in FIG. 27C). The vane 54 is held on top of the vacuum conveyor 112. The vane 54 is positioned with the tabs 72, 74 pointed upwardly with the adhesive strips 157, 156, respectively, formed thereon.

In FIG. 27D, as the melt bars 140, 142 are actuated, they each come down in alignment with the respective adhesive strips 158. With respect to the melt bar 140, the melt bar contacts the support sheer 52, the operating elements 56, and the adhesive 168, 157, and compresses all these against the top tab 72 of the vane 54. There are gaps formed in the melt bar 140 so that the regions of the melt bar aligned with the operating elements 56 do not cause the adhesive 157 to adhere to the operating elements 56, thus allowing the operating element 56 to have a free sliding relationship between the support sheer 52 and the top tab 72 of the vane 54. With respect to melt bar 142, the left melt bar moves downwardly in alignment with the adhesive 156, 168 to contact the support sheer 52, the tape 54, and the adhesive 168 on the bottom side of the tape 82 and the adhesive 156 on the lower tab 74 of the vane 54. The melt bar 142 causes the tape 82 to adhere to the lower tab 74 of the vane 54 with the operating elements 56 captured between the two. While this melt bar 142 is continuous, it could have gaps in all locations but for where the operating elements 56 are secured to the bottom of the vane 54, if desired. Also, the adhesive 156 on the bottom tab 74 may not be necessary since the adhesive 168 on the tape 82 may be sufficient to attach the tape 82 and operating elements 56 to the bottom tab 74. After this step, the melt bars 140, 142 are retracted and the support sheer clamps 144 are retracted, and all of the materials are indexed so the next vane 54 is advanced into position, with the tabs 72, 74 and properly aligned under the melt bars, and adhesive strips the operating elements and tape are aligned over the bottom tab 74 of the vane 54 for the process to repeat.

FIG. 27E shows how the operating elements 56 are positioned between the support sheer 52 and the adhesive 157 on the vane 54, but not attached to the adhesive on the vane 54 such that the operating elements 56 can move along the longitudinal length of the support sheer 52 in order to actuate the bottom edge 78 of each vane 54. In effect, the gaps 161 in the melt bar 140 shown in FIG. 27E surround each of the operating elements 56 to ensure that the adhesive 157 does not adhere to the operating elements 56. The layers from top to bottom between the melt bar 140 and the carry belt 224 are: support sheer 52, adhesive 157, and three layers of vane (in the top tab) 72.

Figure 27F:
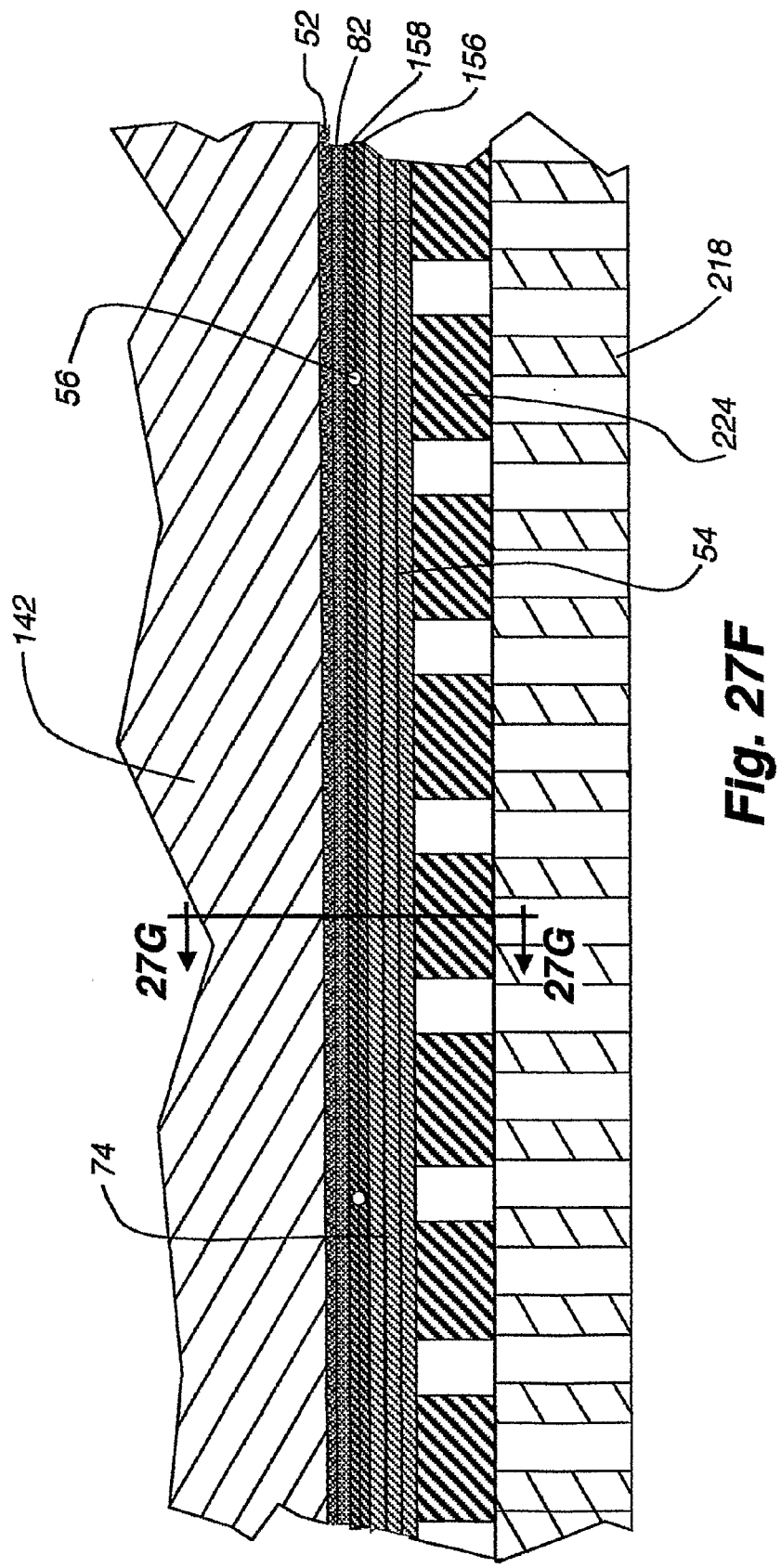
FIG. 27F is a section taken along line 27F-27F of FIG. 27D.

FIG. 27F shows the operating elements secured between the tape 82 and the bottom tab 74 of the vane 54, but the tape 82 not attached to the support sheer 52. The layers from top to bottom between the melt bar 142 and the carry belt 224 are: the support sheer 52, the tape 82, and two layers of adhesive 156, 168, and three layers of material (in the bottom tab 74).

Figure 27G:
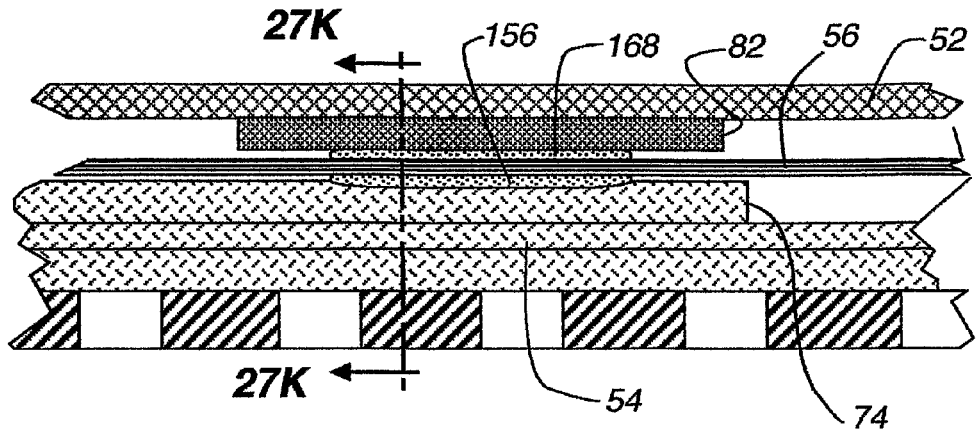
FIG. 27G is a section taken along line 27G-27G of FIG. 27F.

FIG. 27G shows the operating element connected between the bottom tab 74 of the vane 54 and the tape 82, with the tape 82 not attached to the support sheer 52, similar to FIG. 27F, but from a different perspective. In this way, the operating element is fixedly attached to the bottom tab 74 of the vane 54 to cause the movement of the operating element 56 to actuate the vertical upwardly or downwardly movement of the bottom edge 78 of each vane 54 relative to the top edge 80. The layers are the same as shown in FIG. 27F.

Figure 27H:
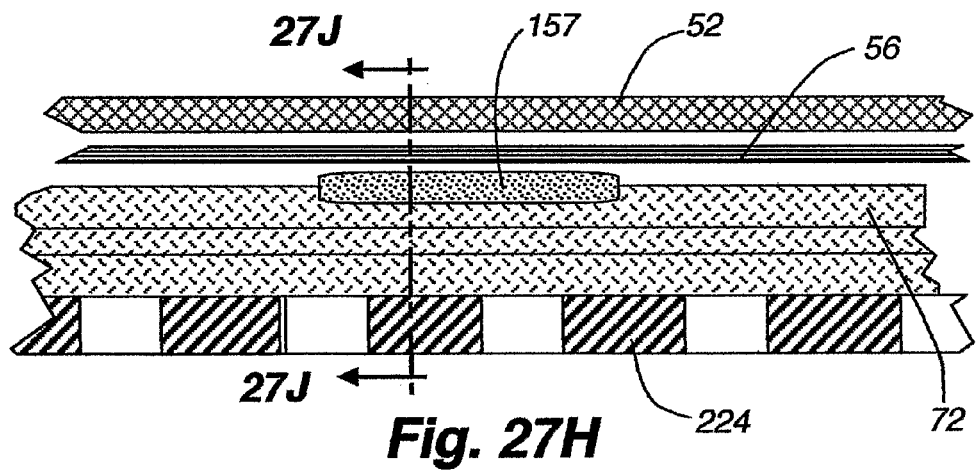
FIG. 27H is a section taken along line 27H-27H of FIG. 27E.

FIG. 27H is a section through the top tab 72 of the vane 54 and shows the operating element 56 not attached between the adhesive 157 on the top tab 72 of the vane 54 and the support sheer 52, similar to that shown in FIG. 27E, but from a different perspective. This occurs where there is a gap in the melt bar 140 that attaches the top tab 172 of the vane 54 to the support sheer 52. This shows that the operating element 56 can move relative to the support sheer 52 and the top tab 72 of the vane 54. The space shown between the operating element and the adhesive may or may not be present. If it is not present, the operating element 56 is still able to slide between the adhesive 157 and the support sheer 52. The layers are the same as shown in FIG. 27E.

Figure 27I:
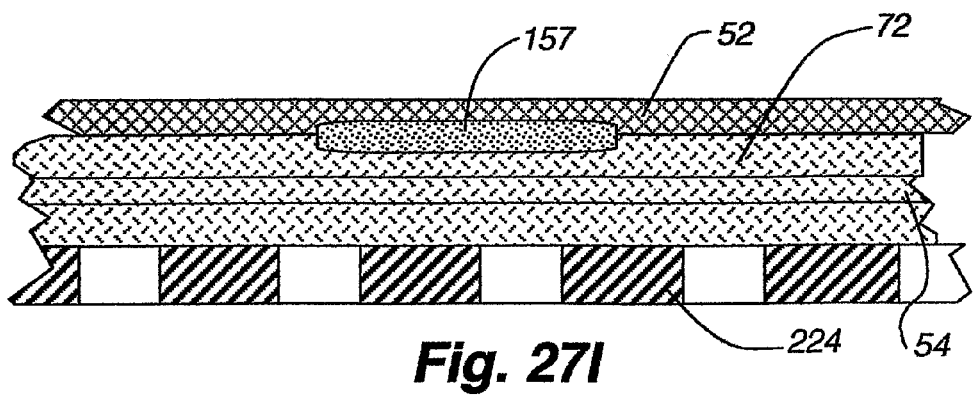
FIG. 27I is a section taken along line 27I-27I of FIG. 27E.

FIG. 27I shows a portion of the top tab 72 of the vane 54 where the top tab 72 of the vane is secured to the support sheer 52, with no operating element 56 passing therethrough. This occurs between the channels or gaps 161 formed in the melt bar 140.

FIG. 27J is a cross section showing the operating element 56 not being embedded in the adhesive 157 positioned between the support sheer 52 and the top tab 72 of the vane 54. This facilitates movement between the operating element 56 and the support sheer 52.

FIG. 27K shows the adhesive 168 and 156 fastening the operating element 56 to the tape 82 and the bottom tab 74 of the vane 54, with the tape 82 not attached to the support sheer 52. The layers are the same as those shown in FIG. 27F. The tape 82 may not be necessary if another barrier is provided to keep the adhesive 156 from adhering to the support sheer 52. For instance, if the support sheer was Teflon coated where the adhesive contacted it at this step in the process, no attachment between the bottom 74 of the vane and the sheer would occur, then the bottom of the vane would still be able to move relative to the support sheer 52.

In operation, the apparatus and associated method facilitates the combination of the support sheer 52, the operating elements 56, the tape 82 and the vanes 54 to form the operable vane mechanism on a shade structure. The apparatus indexes the support sheer 52 along its length while at the same time applying adhesive 168 to the bottom side of the tape 82, as well as advancing the operating elements 56 at the proper spacing longitudinally with respect to and in conjunction with the movement of the support sheer 52 through the apparatus 84. The apparatus 84 also coordinates the application of the adhesive 157, 156 to the top 72 and bottom 74 tabs of the vane 54, respectively, for use in attaching it appropriately to the support sheer 52 at the assembly station 100. The apparatus 84 brings the incoming materials together in the proper orientation to allow one attachment step using two melt bars 140, 142 to complete the assembly of the vane 54 onto the support sheer 52.

It is contemplated that the operating elements 56 may not be fixedly attached to every vane 54. The operating elements 56 may be fixedly attached to only selected vanes, such as every other vane 54 or every third vane 54, or randomly. The operating elements 56 would then slide or move relative to each vane they are not attached to, and only operate the vanes that they are attached to. This structure would require that the attachment of the operating elements to the vane be selectively modified to not attach the operating elements to the vane. This may occur either at the step where the tape is attached to the operating elements, where tape is utilized in the process, or at the assembly station, where tape is not utilized in the process.

The arrangement and alignment of the apparatus described herein for producing these retractable collapsible shades can include the vane transport assembly 96 and tape transport assembly 98 being on a common side of the apparatus, and/or more than one transport assembly along either side of the apparatus in the event a more complex shade is manufactured, and/or the up and down orientation of the transport assemblies can be reversed or modified depending on the particular design of the product being manufactured.

Figure 28A:
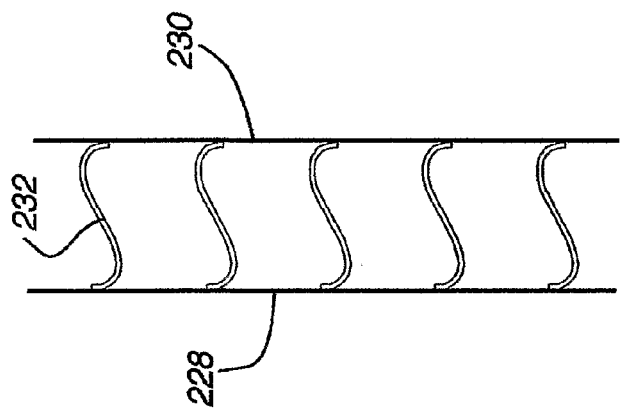
FIG. 28A is a representational cross section of another window covering able to be manufactured with the inventive apparatus and associated method.
Figure 28B:
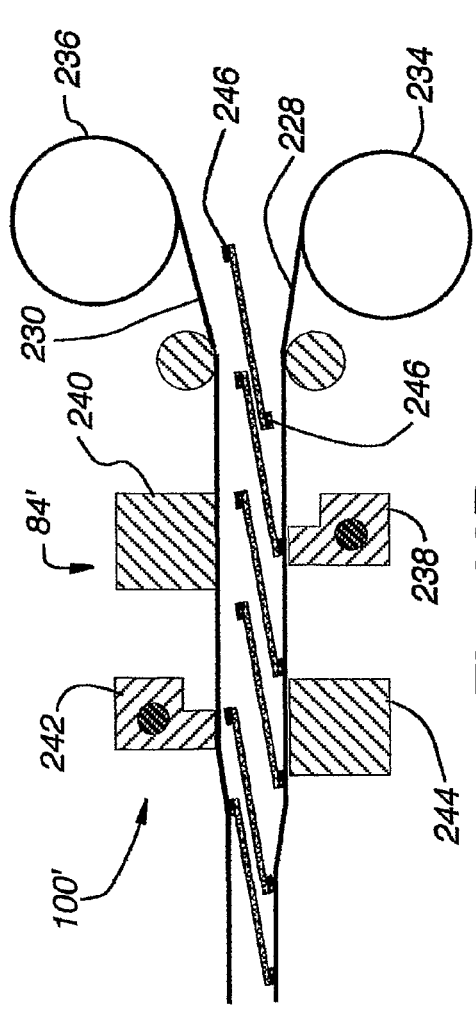
FIG. 28B is a representative schematic of the apparatus of the present invention for use in manufacturing a different window covering.
Figure 28C:
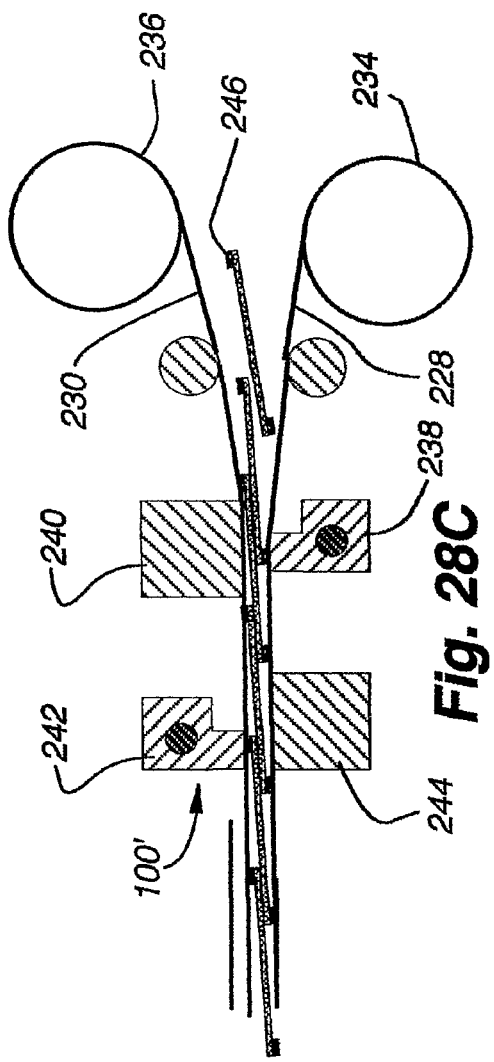
FIG. 28C is a schematic view of an additional embodiment of the apparatus of the present invention further showing the manufacture of the different window covering of FIG. 28B.

An alternative embodiment of the apparatus 84' and related method of the present invention is shown in FIGS. 28A through 28C. The apparatus 84' is configured here to manufacture the Silhouette® brand shade, as shown in FIG. 28A. The Silhouette® brand shade has a front sheet 228 and a rear sheet 230, with vanes 232 operably attached therebetween. The vanes 232 are each attached at their upper outer edges to the front sheet 228, and at their lower outer edges to the rear sheet 230. When the front 228 and rear 230 sheets are moved relative to one another along their respective longitudinal lengths, each vane 232 is caused to rotate about a vane lateral longitudinal axis to transition between an open position to a closed position, as is known.

The schematic layout for the apparatus 84' of the instant invention configured to manufacture the Silhouette® brand shade is show in FIG. 28B. There are two feed rolls 234, 236, one for each of the front 228 and rear 230 sheets, to supply the sheet material. A lower melt bar 238 is positioned below the co-extensive sheets with an associated backing block 240 positioned on the opposite side of the sheets therefrom. An upper melt bar 242 is positioned above the co-extensive sheets with an associated backing block 244 positioned oppositely thereof below the sheets. In this configuration, after the upper and lower sheets are fed into the attachment region 100', the vane 232 is positioned in between and laterally across width of the sheets 228, 230. The vane 232 can be positioned between the sheets manually, or by a extending/retracting mechanism that inserts the vane laterally into position between the sheets but does not itself remain between the sheets. Prior to insertion between the sheets, each vane 228 has an adhesive 246 applied to the portion of the vane 250 to be attached to the adjacent sheet.

As shown in FIG. 28C, when the vane 232 is in the correct location along the length of the sheets, and properly positioned as desired with respect to the previously attached adjacent vane, the melt bars 238, 242 are actuated to cause the adhesive 246 to adhere the respective edge of the vane 232 to the respective adjacent sheet to form the Silhouette® shade. The adhesive bonds the edge of the vane 232 to the sheet positioned on the opposite side of the adhesive, and not the sheet positioned on the opposite side of the vane from the adhesive. This can be achieved in any number of ways, including having the vane be made of a material that keeps the adhesive from passing through the material and causing the vane to adhere to the opposite sheet. The vanes 232 can be positioned to have overlapping edges, as shown in FIG. 28B, or can be positioned without overlapping edges. As with the support sheet mentioned above, the support sheet in this embodiment can also be cords or strips of material or fabric, as opposed to a full width sheet. For instance, a full width sheet can be used on one side and cords or strips on the other. Once formed, the shade is wound onto an uptake reel and further processed.

The apparatus of the present invention can also be configured to produce the product shown in FIG. 29A. The shade has a pleated support sheet 246, forming a zigzag shape between creases 248 or ridges extending in alternating directions from the plane of the support sheet. A vane 250 is attached just above and extending outwardly and downwardly from each ridge 248. The support sheet can be retracted upwardly to collect the vanes 250 together in a bunch.

This configuration of the apparatus 84'' is shown in FIG. 29B. A feed roll 252 supplies the pleated support sheet 246 into the attachment section 100''. In the attachment section 100'', an upper vacuum conveyor 254, such as those described elsewhere herein, move a vane 250 laterally across the sheet material 246 into the desired location on the upper side of the sheet. A lower vacuum conveyor 256 similarly moves a vane 250 laterally across the sheet material 246 into the desired location on the lower side of the sheet. Each vane 250 has an adhesive 258 applied to the top edge of the vane that is to be attached to the sheet material 246. In this configuration, each vane is positioned relative to the locations of the creases 248 to be attached to the sheet 246 adjacent to and just above each crease. The location of each crease 248 is known and the apparatus is programmed to advance the sheet material 246 a sufficient amount to allow for the proper positioning of the vane 250 relative to the crease 248. As shown in FIG. 29B, each vane may overlap the next adjacent lower vane.

Once the respective vanes are properly positioned, the melt bars 260, 262 are actuated to cause the adhesive to attach the top edge of the vane to the sheet material 246. The adhesive 258 does not attach to the bottom edge of the vane 250 on the other side of the sheet material 246. This can be accomplished in any number of ways, such as but not limited to, by having the sheet material be impermeable to the adhesive, or by having the bottom edge of the vane be Teflon coated (or the like).

The sheet material 246 can be an unpleated sheet, and the vanes 250 can have more, less or no overlap built in, based on the positioning of the vanes 250 on the sheet prior to the attachment step. The support sheet material 246 can also be cords or strips, as desired.

In another embodiment of the invention, the vane transport assembly can include the apparatus necessary to actually form the vane in the vane transport assembly as opposed to having a feed roll of the vane already formed. This is described in more detail below.

Figures 30A, 30B:
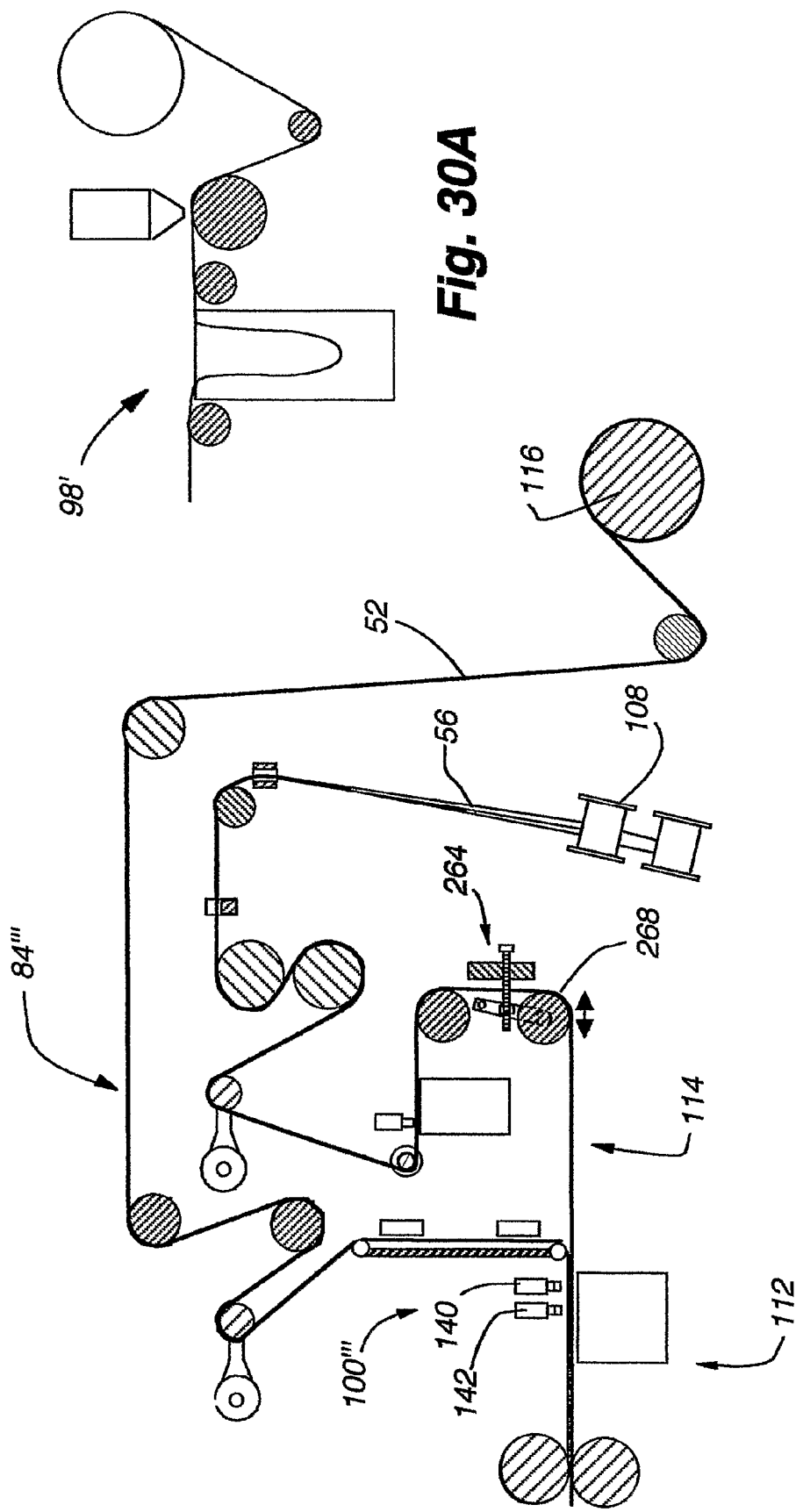
FIG. 30A is a schematic view of an adhesive application station for applying the adhesive to the top surface of the tape.
FIG. 30B is a schematic view of an alternative embodiment of the apparatus of the present invention showing an adjustable roller for providing relative movement of the operative elements with respect to the vane prior to the final assembly step.

In another embodiment 84''', an adjustment feature 264 is employed to allow the adjustment of the tape 82 alignment, when attached to the operating elements 56, with the adhesive on the lower tab 74 of the vane 54. In some configurations of the apparatus, adhesive is applied to the top surface of the tape, which requires the tape 54 and attached operating elements 56 to be re-oriented prior to passing into the assembly station 100''' for connection to the vane 54 and support sheer 52. FIG. 30A shows an adhesive dispenser 266 in a tape handling assembly 98' similar to that described above, with the adhesive dispenser applying adhesive to the top of the tape 82. FIG. 30B shows a schematic flow diagram of an alternative embodiment of the apparatus 84''' where the tape 82 is attached to the operating elements 56 from above the operating elements. The orientation of the tape 82, and importantly the adhesive on the tape, is reversed going around roller 268 to provide the appropriate orientation for the attachment of the tape 82 and operating elements 56 to the vane 54 and support sheer 52 in the assembly station 100''', as described above.

The alignment of the tape 82 and its adhesive with respect to the bottom tab 74 on the vane 54 is important for adequate bonding. One way to adjust this alignment is by moving roller 268 towards and away from the assembly station 100''' by the lead screw adjustment mechanism 264, as shown. The movement of roller 268 towards and away from the assembly station 100''' affects the distance traveled by the operating elements 56 to reach the assembly station 100''', and thus allows for adjustment of the alignment of the tape 82 with the lower tab 74 of the vane 54. If roller 268 is adjusted to move away from the assembly station, then the tape 82 will effectively be retarded, or in other words move upstream, from the lower tab 74. If roller 268 is adjusted to move toward the assembly station, then the tape will effectively be advanced, or move downstream, from the lower tab 74. The adjustment of any roller to increase or decrease the length of travel of the operating elements upstream of the assembly station can create this adjustment effect.

Figure 31:
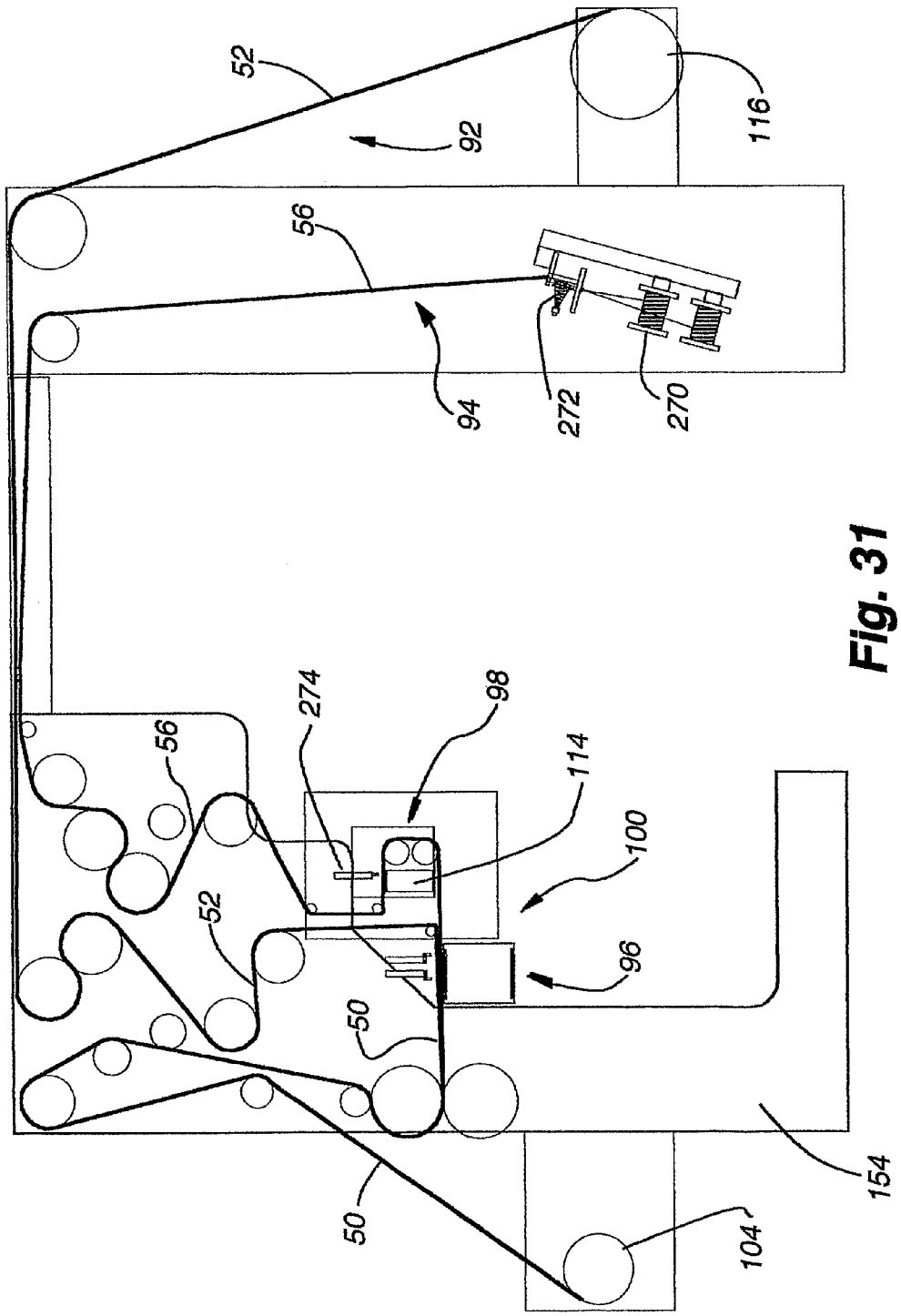
FIG. 31 is schematic view of an alternative embodiment of the apparatus of the present invention, showing the material flows and bonding operation stations.
Figure 32:
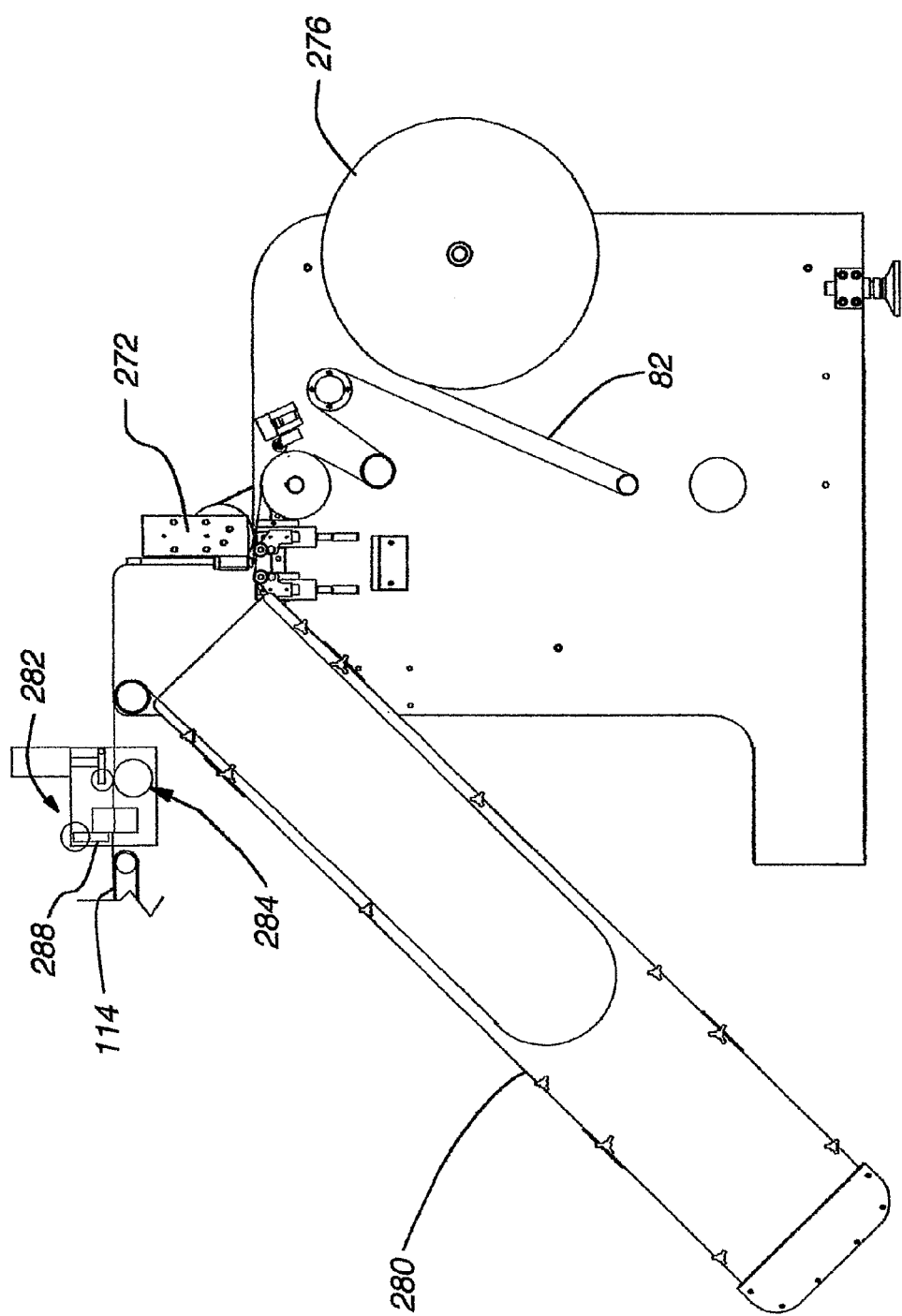
FIG. 32 is a view of a portion of one embodiment of the tape transport or handling assembly, including the supply reel, glue station, accumulator, shear station, and a portion of the tape vacuum conveyor.

FIG. 31 shows a schematic orientation of the apparatus similar to that shown in FIG. 30b. Similar to the other embodiments described herein, the support sheer 52 is fed from a sheer transport assembly 92 into the attachment assembly station 100. The operating elements 56 are fed to the attachment assembly station 100 from the operating transport assembly 94. The vanes 54 are fed to the attachment assembly station 100 by the vane transport station 96. The tape 82 (see FIG. 34) is fed to the attachment assembly station 100 by the tape transport assembly 98. Similar to previously described embodiments of the apparatus, the vane transport assembly and tape transport assembly extend generally orthogonally from the apparatus, and are thus not shown in detail in FIG. 31. Central frame 154 supports the various transport systems to allow convergence in the attachment assembly station 100.

Referring still to FIG. 31, the operating element transport system 94 includes a plurality of spools of operating elements mounted to form a rack. Each spool 270 of operating element 54 passes through a tensioner 272 to help maintain the operating element feed tension at the right level for processing.

Also shown in FIG. 31, the tape transport assembly 98 is oriented so that the tape is secured to the top of the tape vacuum conveyor 114 and the melt or bonding bar 274 moves from above the vacuum conveyor 114 to attach the operating elements 56 to the tape 82. This orientation permits the tape 82 to be carried on the top surface of the conveyor 114 and work with gravity to help keep the tape 82 positioned firmly on the conveyor belt without relying on the vacuum pressure of the vacuum conveyor solely to hold the tape 82 to the conveyor belt, as is required when the tape 82 is held to the bottom of the conveyor belt, as shown in earlier embodiments. The vacuum belt on the vacuum conveyor 114 may have a slight groove 265 formed in its upper surface for the tape to ride in. This slight groove, approximately 0.020 inches deep and the same or slightly larger width than the tape 82, helps align the tape 82 on the conveyor belt to help insure that the tape 82 is adequately acted upon by the vacuum pressure, and for accurate positioning for bonding to the operating elements 56 and ultimately to the bottom tab 74 of the vane 54.

Continuing with FIG. 31, the completed product 50 exits the assembly station 100 and is guided to a relatively higher point on the central frame 154 to extend at a downward angle to take up roller 104. This angled output from the central frame 154 to the output roller 104 facilitates a better inspection of the finished product for quality and completeness.

An embodiment of the tape transport assembly 98 is shown in FIGS. 32 through 38. This tape transport assembly may be utilized on the embodiments of the apparatus 84 shown earlier, and specifically with that shown in FIG. 31. The tape 82 is unwound off of a feed roller 276 and passes over a few guide rollers to the glue station 278, where a glue is applied to the tape, as described above. The glue used on the top tab 72 may be different than that used on the bottom tab 74. On the top tab, hotmelt adhesive, such as EMS Griltex 6E is used to attach the top tab to the support sheer. On the backer, reactive hot melt adhesive such as National Starch Polyurethane Resin (PUR) 7799.

The tape 82 then passes through an accumulator 280, as described above with respect to other embodiments of the tape transport assembly 98. In this embodiment, the accumulator 280 pulls the tape 82 downwardly, since the tape is inserted into the apparatus 84 on the top surface of the vacuum conveyor with the glue facing upwardly.

The shear assembly 282 in this embodiment includes a cutting blade and nip rollers to cut the tape 82 after the appropriate length as been moved by the vacuum conveyor 114 to be attached to the operating elements 56. After the shear assembly 282 cuts the tape, the vacuum conveyor works to transport the cut length of tape the rest of the way into the apparatus to be in the proper position for bonding to the operating elements 56, as described elsewhere herein. The free end of the tape 82 left in the shear apparatus is fed onto the end of the conveyor belt by the nip roller 284. The vacuum conveyor 114 is close enough to the shear station for the free end of the tape 82 to span from the shear station onto the vacuum conveyor 114 to allow the next length of tape to be pulled on the vacuum conveyor 114 by vacuum engagement. The vacuum belt 286 may have a frictional surface to assist in adequately gripping the tape. The vacuum belt 286 may have an alignment groove in its surface, as mentioned above.

Figure 33:
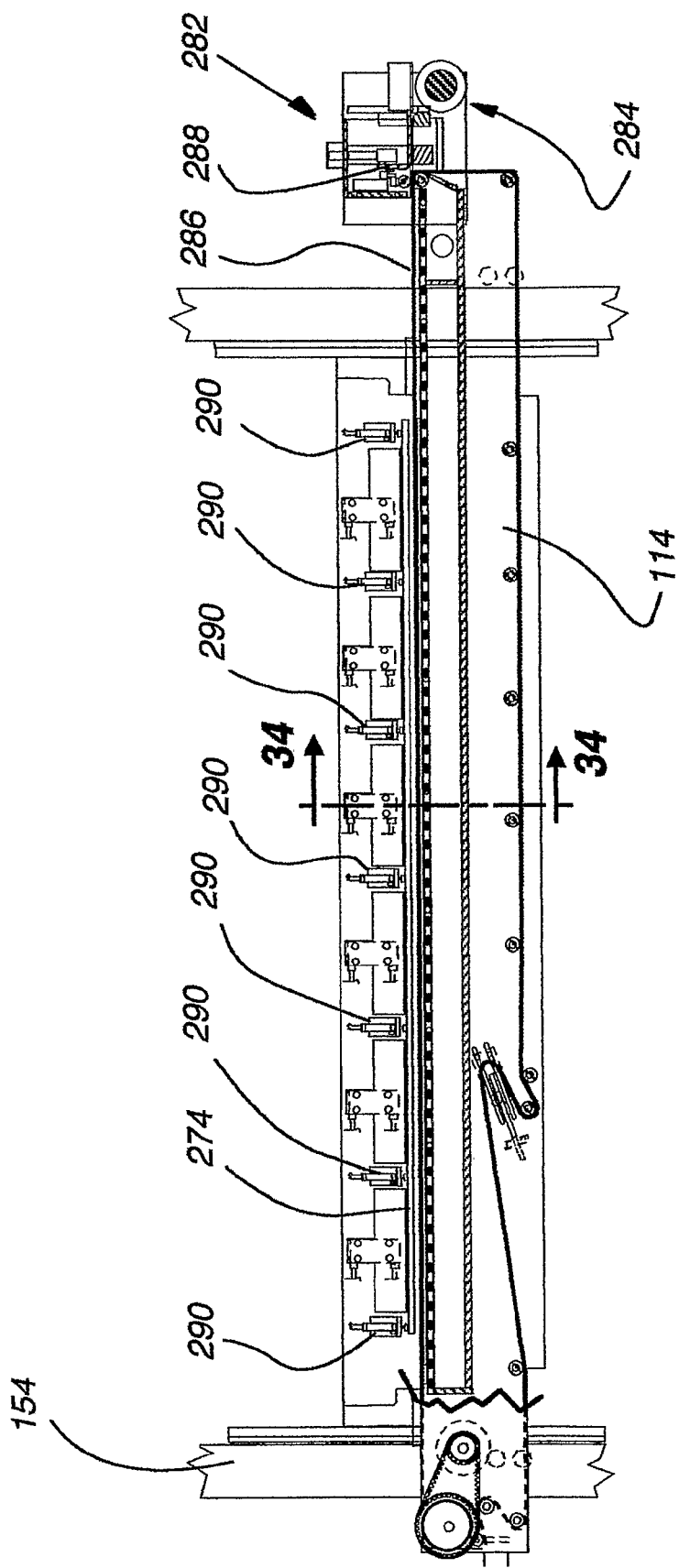
FIG. 33 is a representative section view of the tape vacuum conveyor and shear station of the tape transport assembly.

FIG. 33 shows an embodiment of a vacuum conveyor 114 similar to that structure shown in FIG. 24. In FIG. 33, however, the vacuum conveyor 114 is oriented to have the vacuum belt 286 receive and engage the tape 82 on the top surface of the vacuum conveyor 114. The tape shear station 282 is close to one end of the vacuum conveyor to allow for efficient transfer of the tape 82 from the accumulator 280 onto the vacuum conveyor. The bonding bar 274 is positioned above the vacuum conveyor 114 and moves downwardly to contact the operating elements 56 and cause them to contact the glue on the operating elements, as generally described elsewhere herein.

The bonding bar 274 contacts the glue on the tape 82 and can sometimes become at least partially engaged with the glue sufficient to cause difficulty in disengaging the bonding bar from the glue when it withdraws upwardly from the tape 82. This issue is resolved by a series of push rods 290 utilized in conjunction with the bonding bar 274. The push rods 290 engage the operating elements 56 and hold them against the conveyor belt 286 while the bonding bar 274 disengages from the tape 82. This allows the bonding bar 274 to pull away from the glue without drawing the combination of the operating elements 56 and tape 82 with the bonding bar 274 as it withdraws upwardly. Any or all of the bonding bars in any of the embodiments described herein may be coated with a non-stick substance, such as PTFE (Teflon) in order to make them easier to clean, and to help keep them from sticking to the material and the adhesives with which the bonding bars come into contact.

Figure 36:
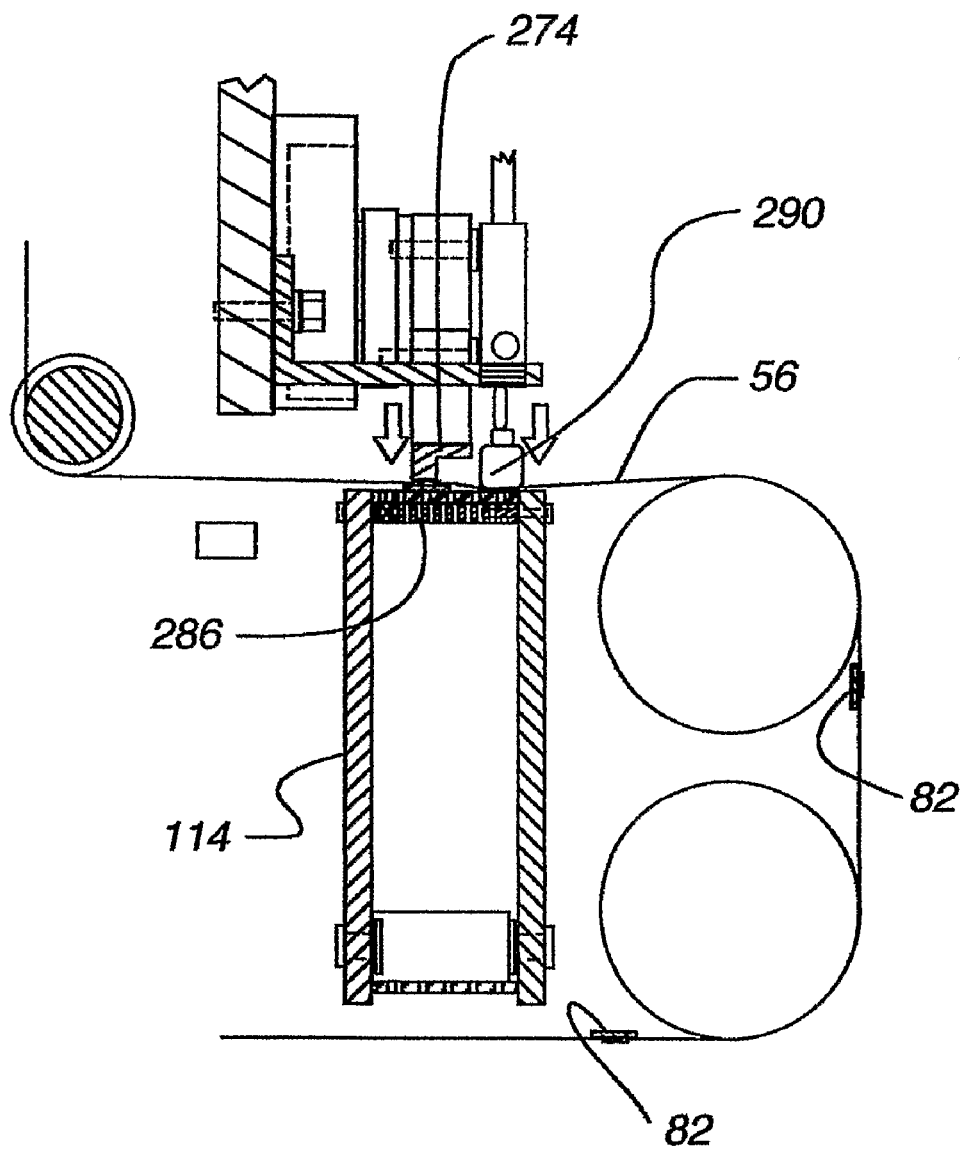
FIG. 36 is a representative section similar to FIG. 34, and shows one position of the push rod and bonding bar structure used for attaching the operating element to the tape.
Figure 38:
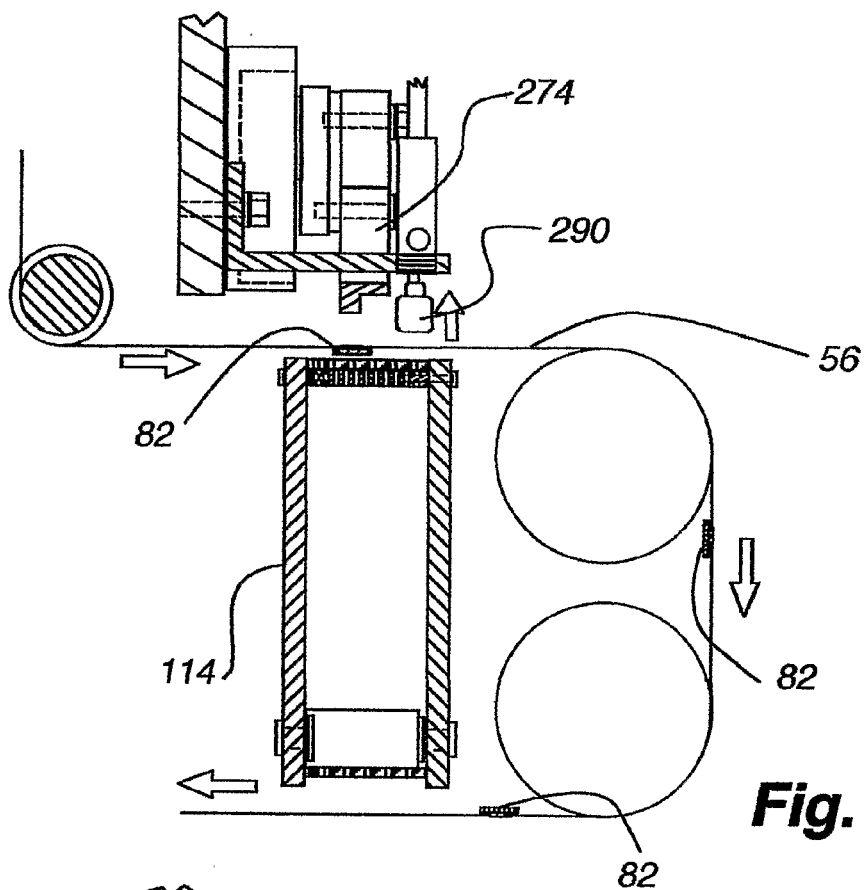
FIG. 38 is a representative section similar to FIG. 34, and shows one position of the push rod and bonding bar structure used for attaching the operating element to the tape.
Figure 37:
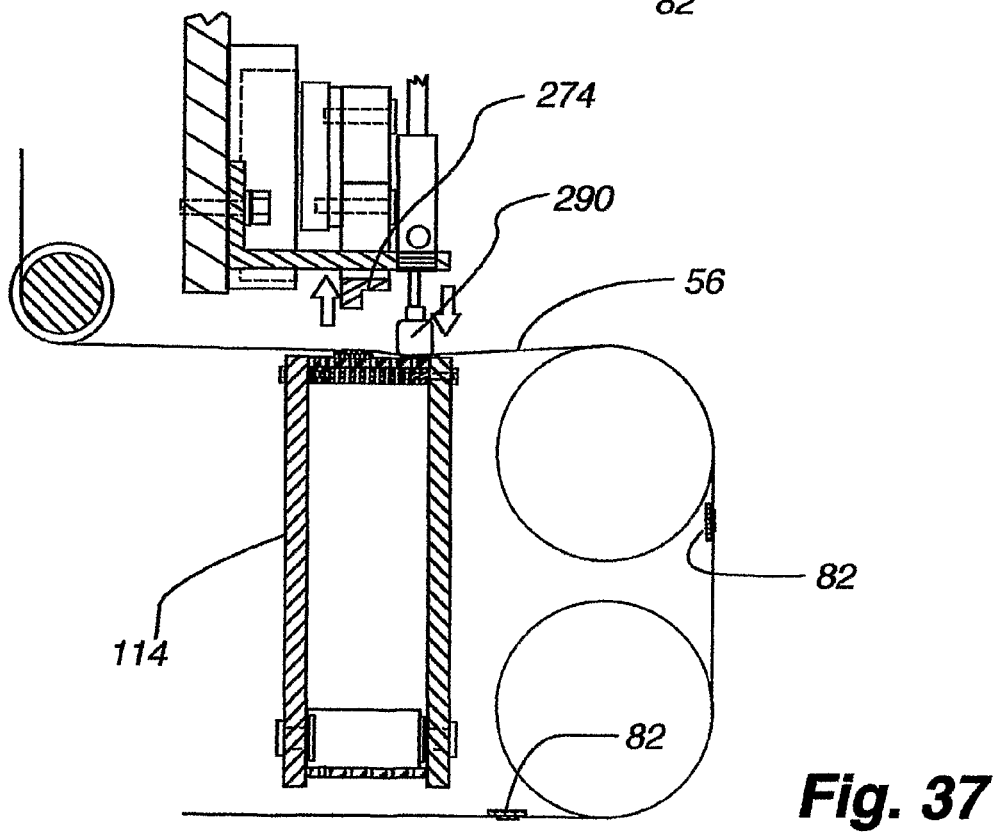
FIG. 37 is a representative section similar to FIG. 34, and shows one position of the push rod and bonding bar structure used for attaching the operating element to the tape.

FIGS. 34 through 38 show the sequence steps of the bonding bar 274 and pushrods 290 in this process. In FIG. 34, the bonding bar 274 and push rod 290 are both withdrawn prior to the step of the bonding bar 274 causing the engagement of the operating element 56 with the tape 82. FIG. 35 shows the bonding bar 274 moved down to engage the operating element 56 and push it into engagement with the glue on the tape 82. FIG. 36 shows the push rod 290 having moved downwardly, while the bonding bar 274 is still in the downward position, to engage the operating elements 56 but not the tape 82. FIG. 37 shows that while the pushrod 290 is in the downward position, the bonding bar 274 moves upwardly away from the operating elements 56. If the glue had adhered to the bonding bar 274, the pushrod 290 keeps the combination of the tape 82 and the operating element 56 from following the pushrod 290 upwardly. Once the bonding bar 274 has disconnected from the engagement position with the operating elements 56 and tape 82, the push rod 290 withdraws away from the operating elements 56 in preparation for the next cycle, as shown in FIG. 38.

The movement of the push rod 290 relative to the bonding bar 274 may vary from that described above so long as the push rod 290 at some point facilitates the separation of the bonding bar 274 from the tape 82 and operating elements 56. The push rods 290 may be controlled discretely, or may be ganged together for movement in unison, and can be driven mechanically, hydraulically, pneumatically, or electrically. Preferably the push rod 290 contacts the operating elements alone 56, but the push rods 290 may be designed to contact the tape 82 and/or glue too. The use of the push rod 290 may be implemented at this step regardless of the orientation of the vacuum conveyor and direction of movement of the bonding bar.

Figure 39:
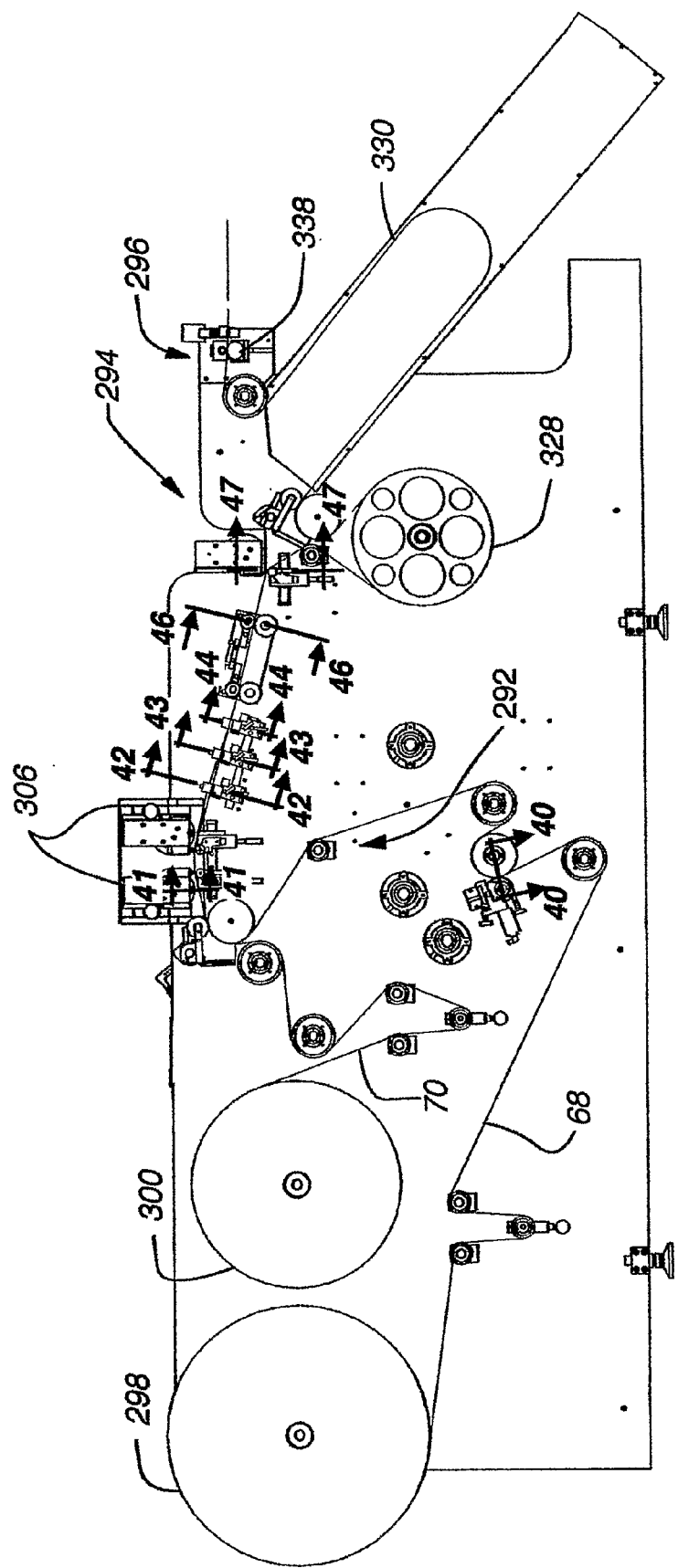
FIG. 39 is a view of a portion of an embodiment of the vane transport or handling assembly, including material supply reels, crimping wheels, glue stations, folding forms, cooling reel, accumulator and shear station.

An embodiment of the vane transport station 96 is shown in FIG. 39. This vane transport station may be utilized on the embodiments of the apparatus 84 shown earlier, and specifically with that shown in FIG. 31. One primary distinction of this vane transport station 96 is the fact that the vane 54 is formed in the station, as opposed to being pre-formed and provided on a supply roll, as earlier described. Also, the glue application and shear stations may be modified. For instance, the shear station for the tape 82 may use a scissors type shear, while the vane may use a guillotine shear. They both may use the same shear station type.

In the vane transport assembly shown in FIG. 39, there is a vane assembly section 292, glue application stations 294, and a shear station 296. In the vane assembly section, two feed supply rolls 298 and 300 provide the two separate pieces of the vane 54 that are assembled together. The primary feed supply roll 298 provides the material for the outer or front portion 68 of the vane 54 as described above with respect to FIG. 1A-1E, and the secondary feed supply roll 300 provides the material for the rear portion or liner 70.

The liner 70 and front portion or fact material 68 of the vanes pass through a series of conditioning and tensioner rollers. While not required for adequate function of the vane as described herein, the tension of the liner and vane is important to control precisely to keep the difference in stretch, shrinkage, and other characteristics of the two materials from negatively impacting primarily the aesthetics of the shade. For instance, if not properly tensioned, the liner may cause the face 68 to wrinkle or distort. If the tension is properly balanced, then liner 70 and face 68 may be attached together with minimal distortion of the vane. The tensioning of the face 68 and liner 70 paths may be manual or automatic. If automatic, it may be by a tensioning control system such the Cygnus model made by Mag Power.

Figure 40:
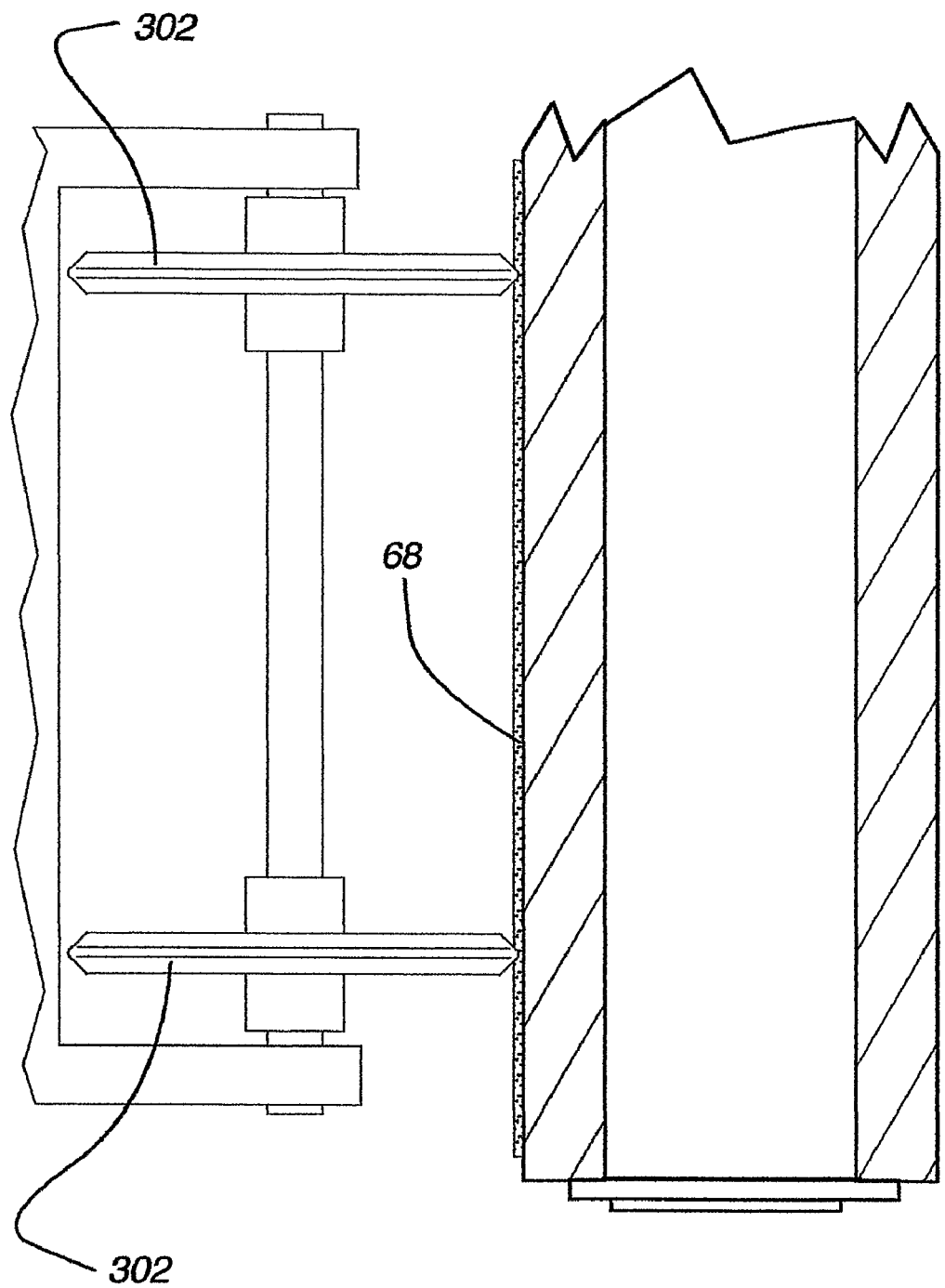
FIG. 40 is a section taken along line 40-40 of FIG. 39.

The outer portion 68 passes between a pair of crease wheels 302 and a support roller in order to crease a fold-line along either edge of the outer portion material 68. See FIG. 40. The crease wheels 302 make an indentation in the material about which the material 68 folds as it goes through the folding angle forms, as described in more detail below. Each crease wheel 302 may have a relatively sharp outer periphery, such that when engaged against the front portion 68 of the vane material under load it forms a fold line (indentation) 304 (see FIG. 41). Fold lines 304 are formed as shown in FIG. 40, and delineate the outer portion 70 into the top tab 72, lower tab 74, and front side 270.

The front portion 68 and rear portion 70 are brought together at a mid portion of the vane transport assembly 96 such that the rear portion or liner is positioned between the fold lines of the front portion 68. This merger of the two materials is done by aligning their respective rollers so that when brought into contact with one another, the rear portion 70 is properly positioned relative to the front portion 68. See FIG. 41.

Figure 44:
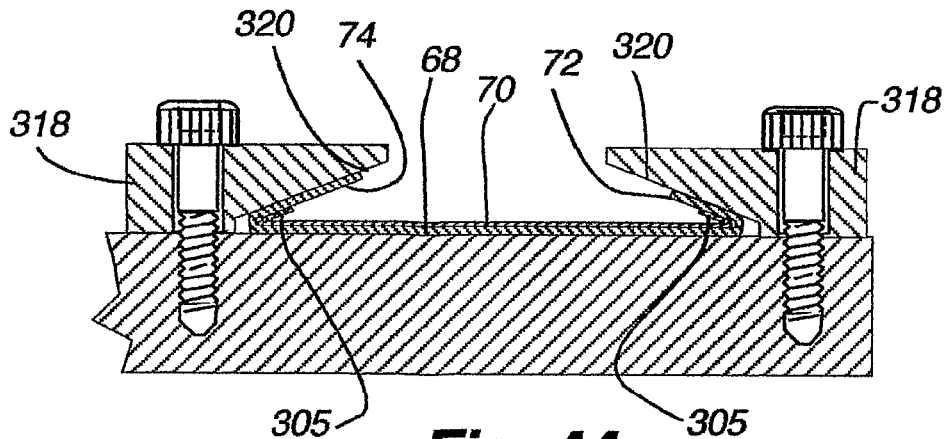
FIG. 44 is a section taken along line 44-44 of FIG. 39.
Figure 45:
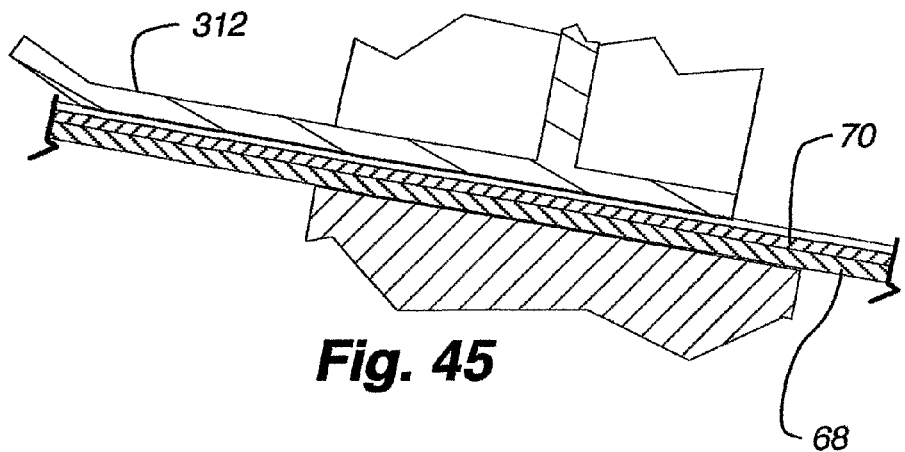
FIG. 45 is a section taken along line 45-45 of FIG. 42.
Figure 46:
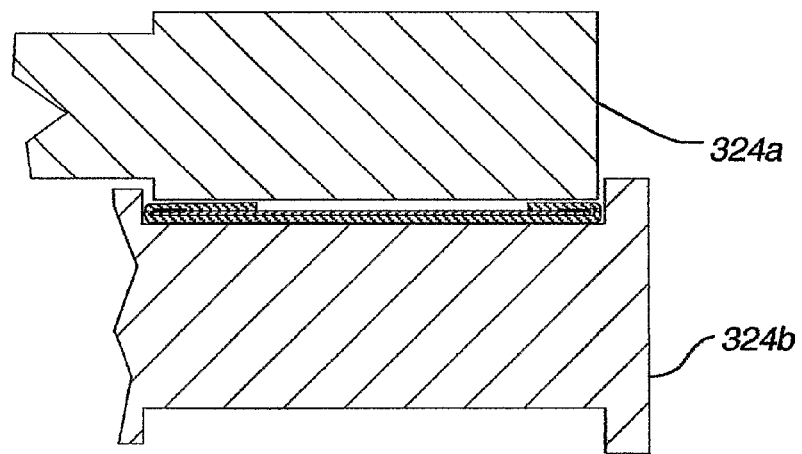
FIG. 46 is a section taken along line 46-46 of FIG. 39.

After the front and rear portions are brought together, a glue line 305 is applied, by glue applicators 306, to front portion 68 just exterior of the indentation lines 104 onto both tabs 72 and 74. When folded, this placement of the glue strips facilitates attaching the tabs 72 and 74 to the liner 70. Alternatively, the glue strip may be applied to the liner or rear portion 70 near its outer edges to adhere the rear portion 70 to the front portion 68 when the front portion is folded. See FIGS. 39 and 41. The edges of the front portion 70 are then folded along the fold lines by running the vane material through a set of angle forms, as shown in FIGS. 42 through 45, and then through a pinch roller as shown in FIG. 46. FIG. 42 shows the edges, or tabs 72 and 74, folded up along the fold lines 304 in the first form 308. The tabs 72 and 74 fold at the angle of the sidewalls 310 of the form 308, in this example a right angle is formed by each wall 310 of the form 308. A retainer 312 may be used in each of the forms to keep the material between the fold lines 304 from moving upward substantially, which provides a smooth fabric movement through the forms. See FIG. 45 showing the retainer of the first form.

Figure 41:
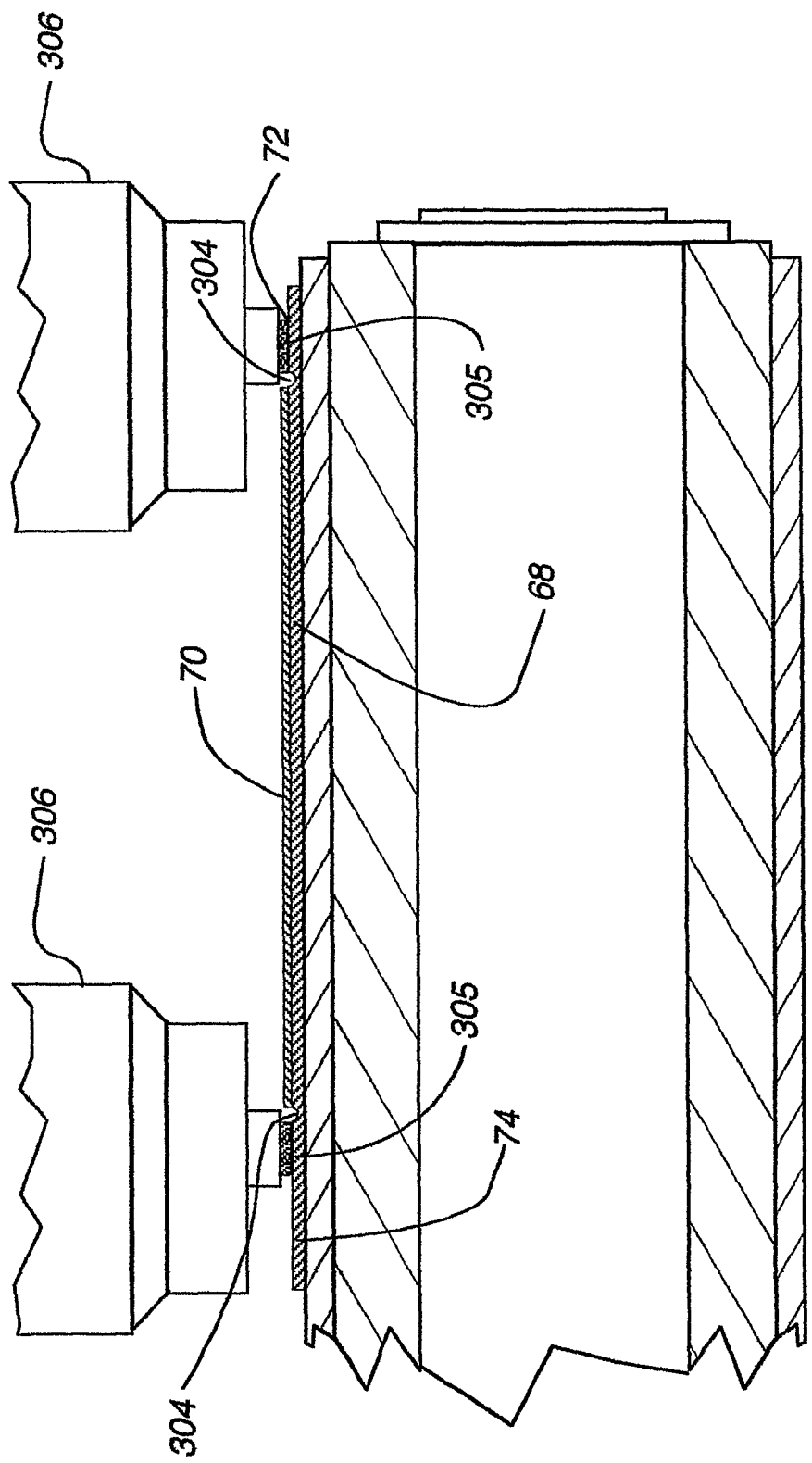
FIG. 41 is a section taken along line 41-41 of FIG. 39.
Figure 42:
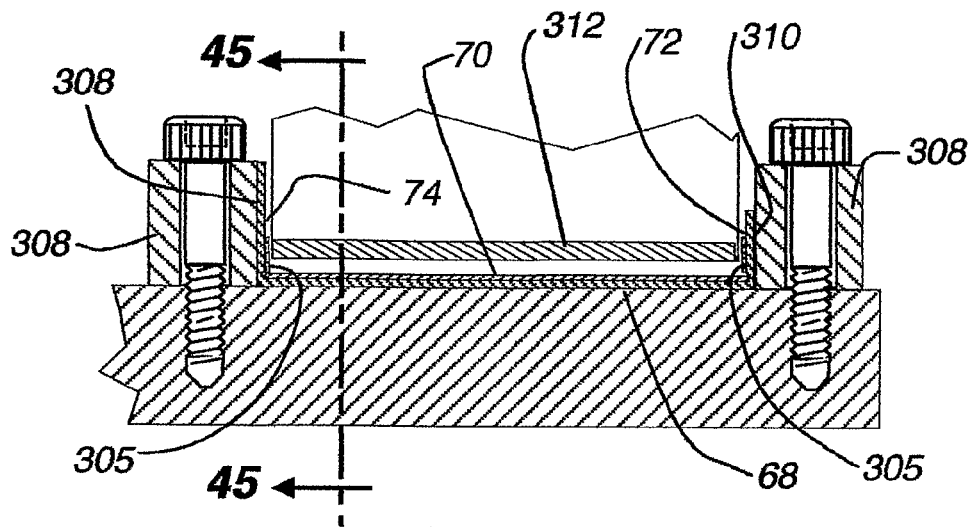
FIG. 42 is a section taken along line 42-42 of FIG. 39.
Figure 43:
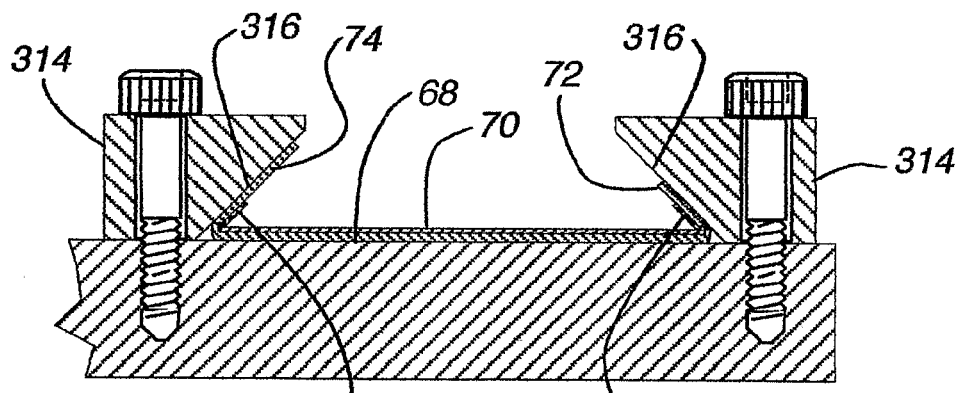
FIG. 43 is a section taken along line 43-43 of FIG. 39.

FIG. 43 shows an angle form 314 subsequent to the form shown in FIG. 41, where the sidewalls 316 fold tabs 72, 74 at a more acute angle along the fold lines 304. Again, the acute fold angle is dictated by the sidewalls 316 of the form 314. FIG. 44 shows an angle form 318 subsequent to the form 314 shown in FIG. 43, with walls 320 forming even more acute fold angles along the fold lines 304. At this point, the glue lines are beginning to cause the top tab 72 and bottom tab 74 to adhere to the rear portion 70 to secure the front portion 68 to the rear portion 70 along or adjacent to the fold lines 304.

FIG. 46 shows the vane 54 extending through a pinch roller set 324a and 324b to complete the formation of the vane 54 and the adherence of the front 68 and rear 70 portions together by the glue positioned between them. At this point the vane is prepared for application of a glue strip, shearing to the proper length, and insertion into the assembly station.

Figure 47:
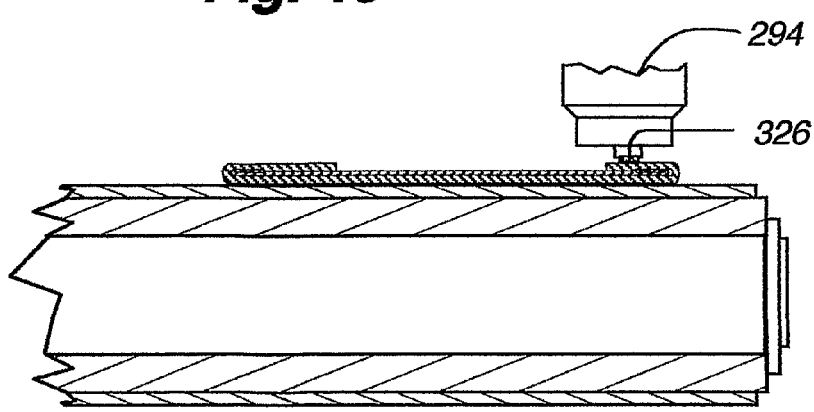
FIG. 47 is a section taken along line 47-47 of FIG. 39.

Subsequent to the completion of the folding and formation of the vane 54, a glue strip 326 is positioned on the upper tab 72 for use in connecting the upper or top tab to the support shear 52, as described above and again below. Unlike earlier embodiments, in the configuration shown in FIG. 47, no glue line is needed on tab 74 since the glue on the tape 82 is sufficient to attach the lower tab 74 to the tape 92 and operating elements 56. It is contemplated that a glue line on the bottom tab 74 could be added if necessary. The vane 54 at this point passes around a large pulley 328 with the intent of cooling the glue on the top tab 72 to prepare it for processing. The pulley 328 is large in order to keep the vane from creasing or distorting along is length, especially along the folded edges. The vane wraps around pulley 328 with the glue strip contacting the pulley to flatten the profile of the glue strip. The flat profile of the glue strip on the top tab 72 helps facilitate the movement of the operating element(s) over the glue strip in the assembled shade. If the glue strip protrudes too much, the operating element may have a difficult time moving freely past the top tab during operation, which can affect the performance of the shade function. After the cooling pulley 328, the vane 54 is received in an accumulator 330 as described above, and then passes through the shear station 296.

Similar to the shear station 282 for the tape transport assembly 98, the shear station 296 for the vane transport assembly 96 herein described works to shear or cut the vane 54 at the appropriate length to allow the vane section to be drawn into the assembly station 100 by the vane vacuum conveyor 112. The end of the vane vacuum conveyor 112 is positioned close to the shear station 296 so that the free end of the vane 54 can be pushed by nip rollers 328 through the open shear station to engage the conveyor belt on the vane vacuum conveyor 112, and through vacuum pressure be pulled along the vacuum conveyor 112. After the shear step, the vacuum conveyor 112 moves the length of vane 54 further into the assembly station 100 to the proper position for the bonding steps as described elsewhere herein.

Figure 48:
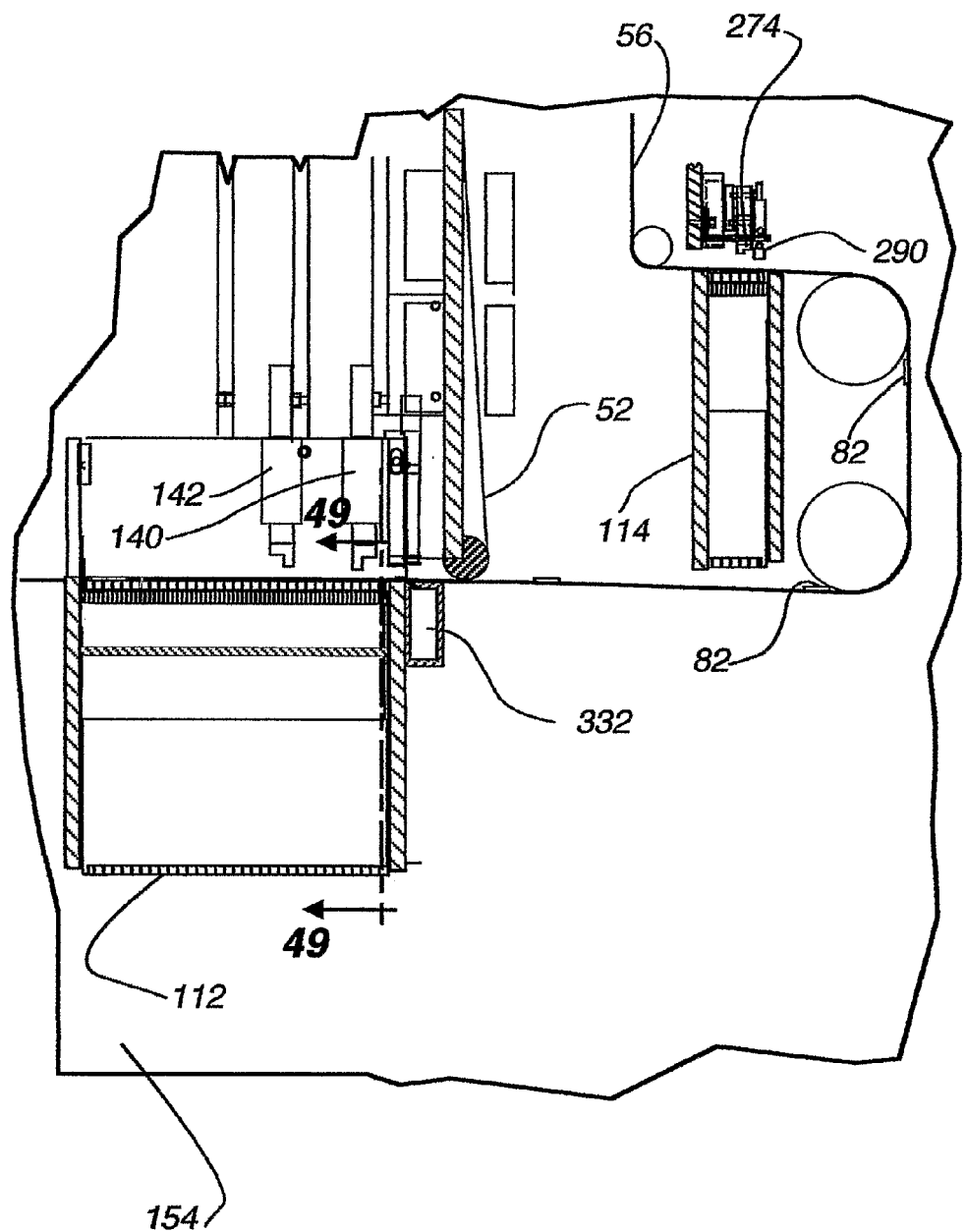
FIG. 48 is a representative section of the assembly station, including the tape and vane vacuum conveyors, the bonding bar for attaching the tape to the operating elements, and the bonding bars for attaching the combined tape and operating elements to the vane, and the support structure to the vane.

FIG. 48 shows the assembly station 100 of the embodiment shown in FIG. 31. The tape 82 is attached to the operating elements 56 at the vacuum conveyor 114. As described with respect to previous embodiments, after the operating elements 56 are attached to the tape 82, the support shear 52 is brought into the assembly station 100 above the tape 82 (on the opposite side of the tape 82 from the glue on the tape 82), and the vane 54 is inserted, by the vane conveyor 112, below the combination of the operating elements 56 and the tape 82. Bonding bars 140 and 142 are positioned above the sandwiched materials, and as described above, bonding bar 142 is for bonding the combination tape 82 and operating elements 56 to the lower tab 74 of the vane 54. Bonding bar 140 is for bonding the top tab of the vane 54 to the shear while allowing the operating elements 56 to pass through that bonding structure.

Figure 49:
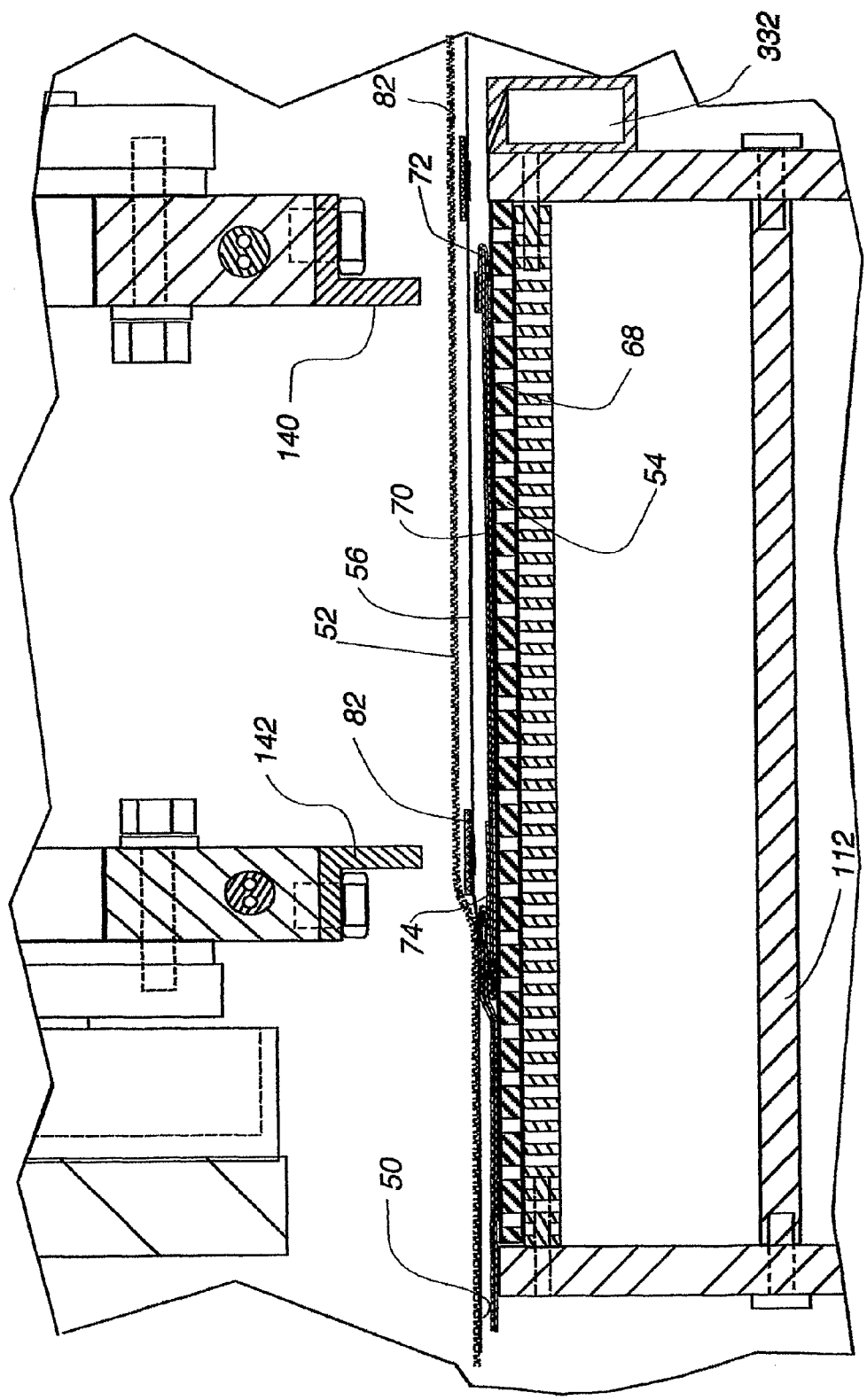
FIG. 49 is a section taken along line 49-49 of FIG. 48, and shows the sandwiched materials before the bonding step takes place.

FIG. 49 is a cross section taken from FIG. 48 and shows the vane 54, tape 83, operating elements 56 and support shear 53 positioned in the assembly station 100 and ready for attachment. At this position, both bonding bars 140 and 142 are lowered to engage the sandwiched materials below them. Regarding the bonding bar 142, the tape 82 is attached with the operating elements 56 to the bottom tab 74. The sheer 52 is not attached to the tape 82 since the tape 82 is impermeable to glue. In this embodiment, no glue strip is needed on the bottom tab 74 of the vane 54 since the glue on the tape 82 is sufficient to attach the tape 82, operating elements 56 and lower tab 74 together. Regarding bonding bar 140, the bonding bar attaches the support sheer 52 to the top tab 72 of the vane 54 in all places but for where the operating elements 56 pass the top tab 72. The bonding bar has gaps at the locations of the operating elements 56. The bonding bar may be heated, or may be room temperature or cooled. The bonding bars 140, 142 (and/or 274) may apply pressure only to cause adhesion between the respective materials, or a combination of pressure and heat or cooling may be applied.

FIG. 50 is a representational cross section similar to FIG. 49 but shows the materials after the bonding bars have bonded the materials together as described above. FIG. 50 shows the vane 54 attached to the sheer 52, with the operating elements 56 positioned there between after the bonding step. In this embodiment, an air knife 332 on or adjacent to the vacuum conveyor 112 may be actuated to create air pressure in the direction of the arrows. The air pressure biases the assembled shade off the surface of the conveyor 112 to allow the next vane 54 to be run along the conveyor under the assembled shade for the next vane attachment step, and to help keep the recently attached vane 54 from catching as the support sheer is advanced for the attachment of the next vane 54 to the support sheer 52 and operating elements 56.

The accumulators described above for accommodating the length of vane and tape for extending quickly along the vacuum conveyors in the respective vane transport and tape transport stations are vacuum accumulators. Vacuum accumulators have several advantages, such as being compact. However, it is contemplated that different accumulator structures could be implemented for each of the tape and vane transport structures. For instance, a staging vacuum conveyor sufficient to accommodate the desired length of tape or vane could be positioned between the shear station and the existing vane or tape vacuum conveyor, 112 or 114 respectively. With this additional staging vacuum conveyor acting as an accumulator, the entire length of the tape or vane portion required for the next attachment step in the assembly station 100 can be held ready for use. When this tape or vane portion is needed, it is transferred to the vacuum conveyor in the assembly station 100 and a new length of tape or vane is drawn onto the staging vacuum conveyor. This would take up more space than the vacuum accumulator, but would also avoid the risk of entanglement, twisting or distorting such as by wrinkling, that may exist in using vacuum accumulators. Other structures and methods for staging the next vane or tape portion for use in assembling the shade may also be used.

A variety of embodiments and variations of structures and methods are disclosed herein. Where appropriate, common reference numbers were used for common structural and method features. However, unique reference numbers were sometimes used for similar or the same structural or method elements for descriptive purposes. As such, the use of common or different reference numbers for similar or the same structural or method elements is not intended to imply a similarity or difference beyond that described herein.

The terms "adhesive" and "glue" are used interchangeably and are meant to include any heat or pressure responsive product capable of adhering or attaching woven and non-woven natural and artificial fabrics together and are meant to be interpreted as synonymous with one another unless their individual meaning is clearly intended. Double-sided sticky tape is contemplated as being included in the definition of "adhesive" or "glue," with the application of the melt bars being used to simply apply pressure as opposed to pressure and/or heat. The "breaks" in the adhesive in the top of the vane to allow the operating element to slide therewithin can be formed by the double-sided sticky tape having a break in its adhesion qualities at the same location as the operating element passes through that connection point. Further, adhesive is considered to include mechanical bonding between two objects, such as stapling, zipping, or using Velcro to attach any of the shade elements together. For instance, as shown in FIG. 52, at least one staple 376 could be used to attach the at least one operating element 56 to the active portion (such as the lower edge in the embodiments above) of the vane 54. In FIG. 52, the tape 82 is shown being attached to the vane 54 and the operating element 56. The tape 82 is not necessary, as the staple 376 may be used to attach the operating element 56 directly to the vane 54. Other mechanical attachment or bonding means may be utilized in a similar manner to attach the vane to the shear, or any of the shear elements together.

Further, and in addition to the use of adhesive described above to create the bond or attachment of the vane to the support sheer, the vane to the operating elements, or the operating elements to the tape, other means of operable attachment may be implemented. For instance, the attachment means may include, but are not limited to, sonic or ultrasonic welding (using the appropriate well known materials), ultrasonic sealing, induction melting, infrared curing, or hot-melt bonding. Ultrasonic horns may be employed for the ultrasonic bonding options above. Mechanical types of attachment may also be employed as attachment means, such as sewing, stapling, and using Velcro or zippers. The different types of operable attachment means described herein are considered an operable bond or attachment, and may replace the use of adhesive as described above. The adhesives used on the top and bottom tabs, if any, may not necessarily be the same adhesive type.

Adhesives may also be replaced by, or used in conjunction with, bi-component fibers used in the support sheet, the vane, or the operating elements. For instance, no adhesive would be needed where the operating element 56 could selectively adhere to the bottom tab, and not the top tab. This may be done using an extruded bi-component filament 370 with a high-melt polypropylene as a core 372, and a low-melt polypropylene as a sheath 374 to the core, as shown in cross section in FIG. 51. The bonding bar for the bottom tab on the vane may be at a temperature to melt the low melt polypropylene sheath to cause the filament to bond to the bottom tab of the vane, while the bonding bar for the top tab does not exceed the low melt temperature so that the fiber does not adhere to the top tab of the vane. A backer (such as tape 82) may or may not be required, depending on the ability of the support shear to not attach to the bi-component filament. Other types of selectively bondable materials or products may also be utilized.

Similarly, the vane or support shear could have bi-component portions with designed melt characteristics to selectively adhere to the operating elements and/or the support sheer, but not bond to the operating element at the top tab 72 to allow the operating element to move relative to the top tab 72 of the vane and the support shear. In this last configuration, there would be no need for adhesive applicators to apply adhesive to the top tab 72, or to bottom tab 74.

The finished shade product may require a curing process to cure the adhesives properly. For instance, some of the adhesives referenced above require the shade to be cured at a temperature of greater than approximately 80 degrees F., at a relative humidity of approximately greater than 50%, for a time period of approximately 24 hours. Other cure processes may be used depending on the adhesive used, as well as other aspects of the assembly process.

The vacuum conveyors used to transport both the vane and the tape include a belt which may be made of at least partially silicone or other similar material. The vacuum conveyors may function with or without the use of vacuum pressure to secure the vane or tape to the conveyor. The surface of the belt has a frictional surface sufficient to engage the vane or tape and advance it along the conveyor without the use of vacuum pressure.

The bonding bars described herein for the attachment of the operating elements to the tape, or the combination of the operating elements and tape to the top or fixed edge of the vane, or the operating elements to the bottom or movable edge of the vane, may operate in any orientation.

The above embodiments assemble a shade that operates with the vanes in a lateral or horizontal orientation while relying on gravity to pull the operating elements downwardly so that the vanes can move from the contracted (See FIG. 1C) to the extended position (See FIG. 1A). The shade product may be designed and manufactured to operate with the vanes oriented vertically or anywhere between vertically and horizontally. Necessary modifications would be required to replace the role played by gravity in the embodiments described herein. For instance, a spring system may be used to actuate the operating elements sufficient to return the shade from the contracted position to the extended position. The support sheer would need to have a spring system also functioning to keep the support sheer extended during use. In an embodiment where the vane orientation was vertical, the shade would retract laterally to one side or the other. Vane actuation may cause the individual vanes to contract laterally to one side or the other, depending on design.

The references herein to "up" or "top", "bottom" or "down", "lateral" or "side", and "horizontal" and "vertical", as well as any other relative position descriptor are given by way of example for the particular embodiment described and not as a requirement or limitation of the shade or the apparatus and method for assembling the shade. For instance, in an embodiment of the shade where the vanes are oriented vertically, the top tab or portion of the vane 72 may become a side portion, and the bottom tab or portion 74 of the vane may become an opposite side portion. Likewise, in an embodiment of the shade where the vanes are oriented horizontally but upside down relative to the embodiments described herein (with the movable portion of the vane moving downwardly to contract and upwardly to extend relative to FIGS. 1A, B, and C), the top tab 72 may become the bottom tab, and bottom tab 74 that moves relative to the support sheer may become the top tab.

In a further embodiment, it is contemplated that the vane may be attached to the support shear at a location between its edges, with one other portion of the vane being attached to at least one operating element to cause actuation of that one other portion. A second other portion of the vane, such as on the opposite side of the bonding line of the vane to the support shear from the first other portion, may also be attached to at least one other operating element to cause actuation of that second other portion independent of the movement of the first portion. This embodiment may be implemented t least in a shade application where the vanes extend laterally or vertically.

The apparatus and associated method in accordance with the present invention has been described with reference to particular embodiments thereof. Therefore, the above description is by way of illustration and not by way of limitation. Accordingly, it is intended that all such alterations and variations and modifications of the embodiments are within the scope of the present invention as defined by the appended claims.

What is claimed is:

1. A method of making a covering for an architectural opening, said method comprising:
    providing a support structure having a length and a width, and having at least one operating element extending along at least a part of said length of said support structure, said operating element being movable relative to said support structure;
    providing at least one vane having a length defining a first portion and a second portion, said length of said vane extending across said width of said support structure;
    adhering by pressure said first portion of said at least one vane discontinuously along a first line of engagement;
    adhering by pressure said second portion of said at least one vane to said at least one operating element; wherein said second portion moves relative to said first portion by moving said at least one operating element;
    the at least one operating element and the at least one support structure are positioned on one side of the at least one vane; and
    said at least one operating element is slidingly received between said first portion and said support structure.

2. The method of claim 1, wherein said support structure is a sheet of pliable material.

3. The method of claim 1, wherein said support structure is a narrow length of material.

4. The method of claim 1, wherein said support structure is a cord.

5. The method of claim 1, further comprising:
operably attaching said first portion to said support structure while leaving said operating element movable along the length of said support structure.

6. A method of making a covering for an architectural opening comprising:
moving a first material having a width;
moving a second material along with said first material, said second material exposing at least a portion of said first material;
providing a third material adjacent said first and second materials, said third material having a length defining a first portion and a second portion, said length of said third material extending across said width of said first material;
adhering by pressure said first portion of said third material to said second material; and
adhering by pressure said second portion of said third material discontinuously along a first line of engagement of said exposed portion of said first material;
wherein movement of said second material relative to said first material causes said first portion of said third material to move relative to said second portion; and
wherein the first and second materials are positioned on one side of said third material and said second material is slidingly received between said second portion of said third material and said first material.

7. A method as defined in claim 6, wherein said third material is inserted laterally relative to said first and second materials.

8. The method of claim 1, further comprising:
attaching a strip across said at least one operating element;
attaching said strip and said at least one operating element to said second portion of said at least one vane.

9. The method of claim 1, wherein:
said first portion is an upper portion of said at least one vane folded over so that a front surface of said at least one vane is operably attached to said support structure.

10. An apparatus as defined in claim 1, wherein said support structure is a flexible sheet.

11. An apparatus as defined in claim 1, wherein said support structure is a plurality of strips operably attached together.

12. An apparatus as defined in claim 11, wherein said plurality of strips are operably attached along sides extending generally along the length of the support structure.

13. An apparatus as defined in claim 12, wherein said plurality of strips are attached together along said sides.

14. An apparatus as defined in claim 11, wherein said plurality of strips are operably attached along sides extending generally transverse to the length of the support structure.

15. An apparatus as defined in claim 14, wherein said plurality of strips are attached together along said sides.

16. An apparatus of claim 1, wherein said support structure is at least one strip narrower than said at least one vane.

17. An apparatus of claim 16, wherein said support structure is at least two strips, each of said at least two strips narrower than said at least one vane, and spaced apart along the length of said at least two said strips.

18. A method as defined in claim 1, wherein said first portion is an upper portion, and said second portion is a lower portion.

19. The method of claim 1, wherein adhering by pressure said first portion of at least one vane discontinuously along said width of said support structure includes selectively activating an adhesive to said first portion by a bonding bar.

20. The method of claim 19, wherein the bonding bar includes gaps aligned with discrete locations of said portion to discontinuously apply pressure to said adhesive on said first portion.

21. The method of claim 1, wherein the adhering operations further include heat in addition to pressure.

* * * * *

UNITED STATES PATENT AND TRADEMARK OFFICE
CERTIFICATE OF CORRECTION

PATENT NO. : 8,171,640 B2
APPLICATION NO. : 11/573231
DATED : May 8, 2012
INVENTOR(S) : Wendell B. Colson et al.

Page 1 of 1

It is certified that error appears in the above-identified patent and that said Letters Patent is hereby corrected as shown below:

In the Claims

Claim 7, column 37, line 28, delete "A method as defined in" and insert --The method of--;
Claim 10, column 38, line 1, delete "An apparatus as defined in" and insert --The method of--;
Claim 11, column 38, line 3, delete "An apparatus as defined in" and insert --The method of--;
Claim 12, column 38, line 6, delete "An apparatus as defined in" and insert --The method of--;
Claim 13, column 38, line 10, delete "An apparatus as defined in" and insert --The method of--;
Claim 14, column 38, line 12, delete "An apparatus as defined in" and insert --The method of--;
Claim 15, column 38, line 15, delete "An apparatus as defined in" and insert --The method of--;
Claim 16, column 38, line 17, delete "An apparatus" and insert --The method--;
Claim 17, column 38, line 19, delete "An apparatus" and insert --The method--; and
Claim 18, column 38, line 23, delete "A method as defined in" and insert --The method of--.

Signed and Sealed this
Thirtieth Day of June, 2015

Michelle K. Lee
*Director of the United States Patent and Trademark Office*